United States Patent
Yasukawa et al.

(10) Patent No.: US 8,778,509 B2
(45) Date of Patent: Jul. 15, 2014

(54) ORGANIC ELECTROLUMINESCENCE ELEMENT, DISPLAY DEVICE AND LIGHTING DEVICE

(75) Inventors: Noriko Yasukawa, Tokyo (JP); Eisaku Katoh, Tokyo (JP); Tomohiro Oshiyama, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1340 days.

(21) Appl. No.: 12/064,517

(22) PCT Filed: Aug. 28, 2006

(86) PCT No.: PCT/JP2006/316825
§ 371 (c)(1),
(2), (4) Date: Feb. 22, 2008

(87) PCT Pub. No.: WO2007/029533
PCT Pub. Date: Mar. 15, 2007

(65) Prior Publication Data
US 2009/0140639 A1    Jun. 4, 2009

(30) Foreign Application Priority Data
Sep. 1, 2005    (JP) .................................. 2005-253229

(51) Int. Cl.
*H01L 51/54* (2006.01)
*C09K 11/06* (2006.01)

(52) U.S. Cl.
USPC ........... 428/690; 428/917; 313/504; 313/506; 257/E51.044; 548/103

(58) Field of Classification Search
None
See application file for complete search history.

(56) References Cited

U.S. PATENT DOCUMENTS

| | | | |
|---|---|---|---|
| 2001/0019782 A1* | 9/2001 | Igarashi et al. | 428/690 |
| 2002/0063516 A1* | 5/2002 | Tsuboyama et al. | 313/504 |
| 2003/0068536 A1* | 4/2003 | Tsuboyama et al. | 428/704 |
| 2005/0123792 A1* | 6/2005 | Deaton et al. | 428/690 |
| 2005/0249970 A1* | 11/2005 | Suzuri et al. | 428/690 |
| 2006/0204787 A1* | 9/2006 | Sano et al. | 428/690 |

FOREIGN PATENT DOCUMENTS

| | | |
|---|---|---|
| JP | 2002332292 | 11/2002 |
| JP | 2003081988 | 3/2003 |
| JP | 2005053912 | 3/2005 |
| JP | 2005272411 | 10/2005 |
| JP | 2006213686 | 8/2006 |
| WO | 2004085450 | 10/2004 |
| WO | WO 2004/095889 A1 * | 11/2004 |
| WO | 2006098209 | 9/2006 |

OTHER PUBLICATIONS

Arnold B. Tamayo, et al, Synthesis and Characterization of Facial and Meridional Tris-cyclometalated Iridium (III) Complexes, Journal of the American Chemical Society, Jun. 2003, vol. 125, No. 24, pp. 7377-7387.

Arnold B. Tamayo, et al. Cationic Bis-cyclometalated Iridium (III) Diimine Complexes and Their Use in Efficient Blue, Green, and Red Electroluminescent Devices, Inorganic Chemistry, Nov. 2005, vol. 44, No. 24, pp. 8723-8732.

Japanese Office Action for Japanese Application No. 2007-534334 (4 pages) and English language translation thereof (5 pages), dated Apr. 27, 2012.

* cited by examiner

*Primary Examiner* — Marie R. Yamnitzky
(74) *Attorney, Agent, or Firm* — Lucas & Mercanti, LLP

(57) ABSTRACT

An organic electroluminescence element comprising at least an emission layer sandwiched between an anode and a cathode, wherein the emission layer comprises a metal complex having a partial structure represented by Formula (1):

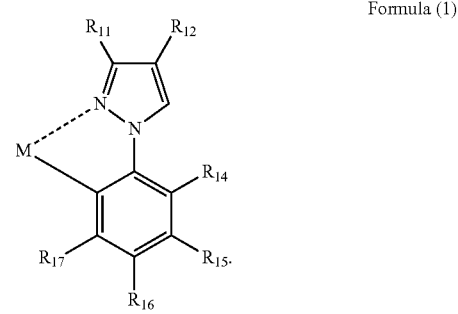

Formula (1)

12 Claims, 3 Drawing Sheets

LIGHT

ORGANIC ELECTROLUMINESCENCE ELEMENT, DISPLAY DEVICE AND LIGHTING DEVICE

TECHNICAL FIELD

The present invention relates to an organic electroluminescent element, a display device and a lighting device.

BACKGROUND

Conventionally, an emission type electronic display device includes an electroluminescence display (hereinafter, referred to as an ELD). A constituent element of ELD includes such as an inorganic electroluminescent element and an organic electroluminescent element (hereinafter, referred to as an organic EL element). An inorganic electroluminescent element has been utilized as a flat light source, however, requires a high voltage of alternating current to operate an emission element. An organic electroluminescent element is an element provided with a constitution comprising an emission layer containing a emitting substance being sandwiched with a cathode and an anode, and an exciton is generated by an electron and a positive hole being injected into the emission layer to be recombined, resulting emission utilizing light release (fluorescence•phosphorescence) at the time of deactivation of said exciton; the emission is possible at a voltage of approximately a few to a few tens volts, and an organic electroluminescent element is attracting attention with respect to such as superior viewing angle and high visual recognition due to a self-emission type as well as space saving and portability due to a completely solid element of a thin layer type.

However, in an organic electroluminescence in view of the future practical application, desired has been, development of an organic EL element which efficiently emits at a high luminance with a low electric consumption.

In Japanese Patent No. 3093796, a slight amount of a fluorescent substance has been doped in a stilbene derivative, distyrylarylene derivative or a tristyrylarylene derivative, to achieve improved emission luminance and a prolonged lifetime of an element. Further, there are known such as an element having an organic emission layer comprising a 8-hydroxyquinoline aluminum complex as a host compound which is doped with a slight amount of a fluorescent substance (for example, JP-A 63-264692 (hereinafter, JP-A refers to Japanese Patent Publication Open to Public Inspection No.)) and an element having an organic emission layer comprising a 8-hydroxyquinoline aluminum complex as a host compound which is doped with quinacridone type dye (for example, JP-A 3-255190).

In the case of utilizing emission from an excited singlet as described above, since a generation ratio of a singlet exciton to a triplet exciton is 1/3, that is, a generation probability of an emitting exciton species is 25% and a light taking out efficiency is approximately 20%, the limit of a quantum efficiency (next) of taking out is said to be 5%.

However, since an organic EL element which utilizes phosphorescence from an excited triplet has been, reported from Princeton University (M. A. Baldo et al., Nature vol. 395, pp. 151-154 (1998)), researches on materials exhibiting phosphorescence at room temperature have come to be active.

For example, it is also disclosed in A. Raldo et al., Nature, vol. 403, No. 17, pp. 750-753 (2000), and U.S. Pat. No. 6,097,147.

Since the upper limit of internal quantum efficiency becomes 100% by utilization of an excited triplet, which is principally 4 times of the case of an excited singlet, it may be possible to achieve almost the same ability as a cooled cathode ray tube to attract attention also for an illumination application.

For example, in such as S. Lamansky et al., J. Am. Chem. Soc., vol. 123, p. 4304 (2001), many compounds mainly belonging to heavy metal complexes such as iridium complexes have been synthesized and studied.

Further, in aforesaid, A. Baldo et al., Nature, vol. 403, No. 17, pp. 750-753 (2000), utilization of tris(2-phenylpyridine) iridium as a dopant has been studied.

In addition to these, M. E. Tompson et al., at The 10th International Workshops on Inorganic and Organic Electroluminescence (EL'00, Hamamatsu), have studied, to utilize $L_2Ir(acac)$ such as $(ppy)_2Ir(acac)$ as a dopant, Moon-Jae Youn. Og., Tetsuo Tsutsui et al., also at The 10th International Workshops on Inorganic and Organic Electroluminescence (EL'00, Hamamatsu), have studied utilization of such as tris (2-(p-tolyl)pyridine)iridium $(Ir(ptpy)_3)$ and tris(benzo[h] quinoline)iridium $(Ir(bzq)_3)$ (herein, these metal complexes are generally referred to as orthometalated iridium complexes.).

Further, in also the aforesaid, S. Lamansky et al., J. Am. Chem. Soc., vol. 123, p. 4304 (2001), studies have been carried out to prepare an element utilizing various types of iridium complexes.

Further, to obtain high emission efficiency, Ikai et al., at The 10th International Workshops on Inorganic and Organic Electroluminescence (EL'00, Hamamatsu) utilized a hole transporting compound as a host of a phosphorescent compound. Further, M. E. Tompson et al. utilized various types of electron transporting materials as a host of a phosphorescent compound doped with a new iridium complex.

An orthometalated complex provided with platinum instead of iridium as a center metal is also attracting attention. With respect to these types of complexes, many examples having a characteristic ligand are known (for example, refer to Patent Documents 1-5 and Non-Patent Document 1.).

In any case, emission luminance and emission efficiency are significantly improved compared to conventional elements because the emitting light arises from phosphorescence, however, there has been a problem of a poor emission lifetime of the element compared to conventional elements. It is hard to achieve an emission of a short wavelength and an improvement of an emission lifetime of the element for a phosphorescent emission material provided with a high efficiency. At present state, it cannot be achieved a level of a practical use.

With respect to shortening of emission wavelength, heretofore, there have been known introduction of an electron attracting group such as a fluorine atom, a trifluoromethyl group, or a cyano group as a substituent group into phenylpyridine, and introduction of a ligand of such as picolinic acid or of a pyrazabole type. However, when an emission wavelength is shortened to achieve blue color by utilizing these substitution effects, a high efficiency may be achieved while emission lifetime will be greatly deteriorated, which requires further improvement to overcome the trade-off relationship.

There are known some iridium complexes containing a ligand having a specific partial structure combining two carbon atoms of two five membered ring. However, in the disclosed compounds, at least one of the five membered rings is condensed with other ring. In addition, there are disclosed only the use for a red emission element (refer to Patent Document 11.)

[Patent Document 1] JP-A 2002-332291
[Patent Document 2] JP-A 2002-332292

[Patent Document 3] JP-A 2002-338588
[Patent Document 4] JP-A 2002-226495
[Patent Document 5] JP-A 2002-234894
[Patent Document 6] WO 02/15645
[Patent Document 7] JP-A 2003-123982
[Patent Document 8] JP-A 2002-117978
[Patent Document 9] JP-A 2003-146996
[Patent Document 10] WO 04/016711
[Patent Document 11] JP-A 2003-252888
[Non-patent Document 1] Inorganic Chemistry, 41 {12}, 3055-3066 (2002)
[Non-patent Document 2] Applied Physics Letters, 79, 2082 (2001)
[Non-patent Document 3] Applied Physics Letters, 83, 3813 (2003)
[Non-patent Document 4] New Journal of Chemistry, 26, 1171 (2002)

DISCLOSURE OF THE INVENTION

Problems to be Solved by the Invention

An object of this invention is to provide an organic EL element material with a controlled emission wavelength which has high emission efficiency and long emission lifetime, a lighting device and a display device.

An object of the present invention described above has been achieved by the following constitutions.

Means to Solve the Problems

1. An organic electroluminescence element incorporating at least an emission layer sandwiched between an anode and a cathode, characterized in that the emission layer incorporates a metal complex having a partial structure represented by Formula (1).

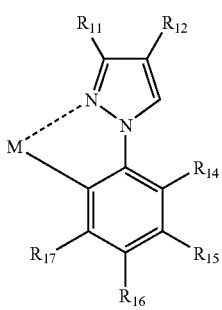

Formula (1)

wherein $R_{11}$ and $R_{12}$ each represent a substituent, provided, that each of $R_{11}$ and $R_{12}$ may be the same or different from each other; $R_{14}$-$R_{17}$ each represent a hydrogen atom or a substituent, provided that each of $R_{14}$-$R_{17}$ may be the same or different from each other; and M represents a metal of the 8th-10th groups of the periodic table.

2. An organic electroluminescence element incorporating at least an emission layer sandwiched between an anode and a cathode, characterized in that the emission layer incorporates a metal complex having a partial structure represented by Formula (2).

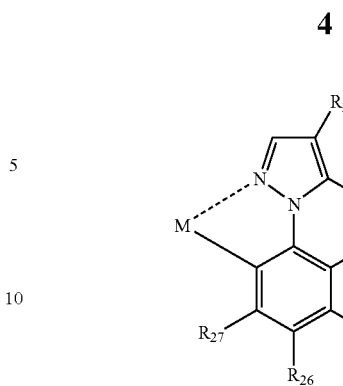

Formula (2)

wherein $R_{22}$ and $R_{23}$ each represent a substituent, provided that each of $R_{22}$ and $R_{23}$ may be the same or different from each other; $R_{24}$-$R_{27}$ each represent a hydrogen atom or a substituent, provided that each of $R_{24}$-$R_{27}$ may be the same or different from each other; and M represents a metal of the 8th-10th groups of the periodic table.

3. An organic electroluminescence element incorporating at least an emission layer sandwiched between an anode and a cathode, characterized in that the emission layer incorporates a metal complex having a partial structure represented by Formula (3).

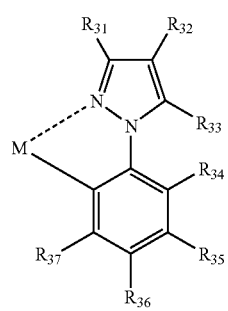

Formula (3)

wherein $R_{31}$ and $R_{33}$ each represent a substituent, provided that each of $R_{31}$ and $R_{33}$ may be the same or different from each other; $R_{34}$-$R_{37}$ each represent a hydrogen atom or a substituent, provided that each of $R_{34}$-$R_{37}$ may be the same or different from each other; and M represents a metal of the 8th-10th groups of the periodic table.

4. An organic electroluminescence element incorporating at least an emission layer sandwiched between an anode and a cathode, characterized in that the emission layer incorporates a metal complex having a partial structure represented by Formula (4).

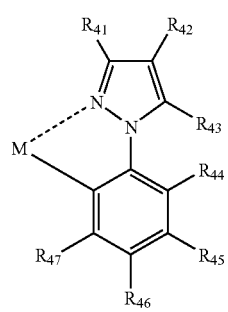

Formula (4)

wherein $R_{41}$-$R_{47}$ each represent a hydrogen atom or a substituent, provided that at least one of $R_{41}$-$R_{47}$ represents —$CHR^{11}R^{12}$, —$CH_2R^{13}$, a cycloalkyl group, —$CF_3$, an alkoxy group, or an aryloxy group, wherein $R^{11}$-$R^{13}$ each represent a substituent; and M represents a metal of the 8th-10th groups of the periodic table.

5. An organic electroluminescence element incorporating at least an emission layer sandwiched between an anode and a cathode, characterized in that the emission layer incorporates a metal complex having a partial structure represented by Formula (5).

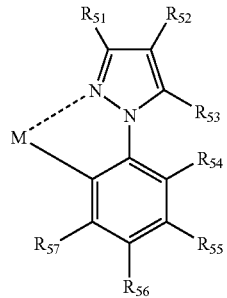

Formula (5)

wherein $R_{51}$-$R_{57}$ each represent a hydrogen atom or a substituent, provided that at least one of $R_{51}$-$R_{54}$ represents a cyano group; and M represents a metal of the 8th-10th groups of the periodic table.

6. An organic electroluminescence element incorporating at least an emission layer sandwiched between an anode and a cathode, characterized in that the emission layer incorporates a metal complex having a partial structure represented by Formula (6).

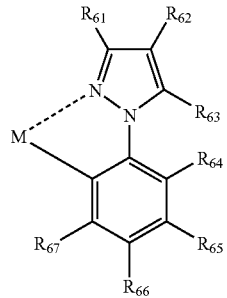

Formula (6)

wherein $R_{61}$$R_{67}$ each represent a hydrogen atom or a substituent, provided that at least one of $R_{64}$-$R_{67}$ represents —$NR^{14}R^{15}$, wherein $R^{14}$ and $R^{15}$ each represent a substituent; and M represents a metal of the 8th-10th groups of the periodic table.

7. An organic electroluminescence element incorporating at least an emission layer sandwiched between an anode and a cathode, characterized in that the emission layer incorporates a metal complex having a partial structure represented by Formula (7).

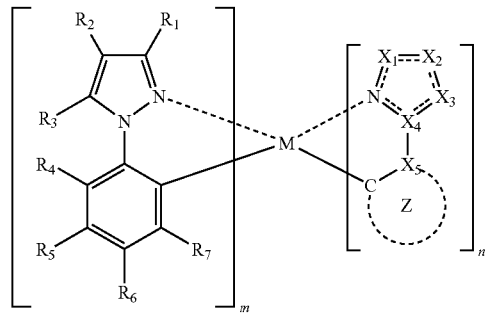

Formula (7)

wherein $R_1$-$R_7$ each represent a hydrogen atom or a substituent; $X_4$ and $X_5$ each represent a carbon atom or a nitrogen atom, provided that each of $X_4$ and $X_5$ may be the same or different from each other; $X_1$-$X_3$ each represent $CR^8$, a nitrogen atom, or $NR^9$, wherein $R^8$ and $R^9$ represent a hydrogen atom or a substituent; Z forms a five-membered ring or a six-membered ring together with C and $X_5$; M represents a metal of the 8th-10th groups of the periodic table; m represents an integer satisfying $3 \geq m \geq 1$; n represents an integer satisfying $2 \geq n \geq 1$; and m+n represents a valence number of the metal M.

8. The organic electroluminescence element, described in any one of items 1-7, wherein the metal M represents iridium or platinum.

9. The organic electroluminescence element, described in any one of items 1-8, wherein the emission layer further incorporates a derivative having a ring structure, in which at least one of the carbon atoms of a hydrocarbon ring constituting a carboline derivative or a carboline ring of the carboline derivative is substituted with a nitrogen atom.

10. The organic electroluminescence element, described in any one of items 1-9, wherein a positive hole inhibition layer is provided as a constituent layer between the emission layer and the cathode, provided that the positive hole inhibition layer incorporates a derivative having a ring structure, in which at least one of the carbon atoms of a hydrocarbon ring constituting a carboline derivative or a carboline ring of the carboline derivative is substituted with a nitrogen, atom.

11. The organic electroluminescence element, described in any one of items 1-10, wherein a positive hole transport layer is provided as a constituent layer between the anode and the emission layer, and further an intermediate layer is provided between the positive hole transport layer and the emission layer.

12. The organic electroluminescence element, described in item 11, wherein the intermediate layer incorporates an emission host which is incorporated in the emission layer.

13. A display device characterized by incorporating the organic electroluminescence element described in any one of items 1-12.

14. A lighting device characterized by incorporating the organic electroluminescence element described in any one of items 1-12.

Effects of the Invention

This invention has enabled to provide an organic EL element material for and an organic EL element, and it has been achieved to provide an organic EL element, a lighting device and a display device having high emission efficiency and long emission lifetime utilizing said organic EL element material.

Figure 1:
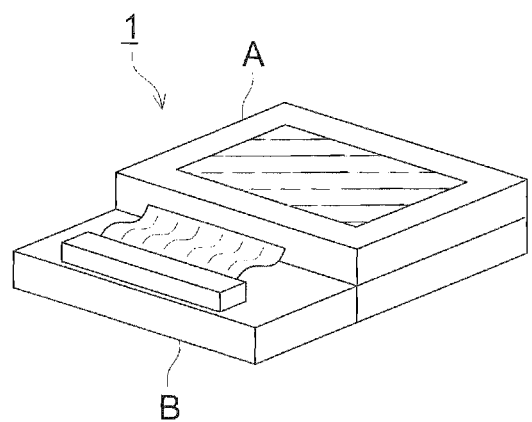
FIG. 1 is a schematic drawing to show an example of a display device constituted of an organic EL element.

DESCRIPTION OF SYMBOLS 1 display
3 pixel
5 scanning line
6 data line
7 electrical power line
10, 101 organic EL element
11 switching transistor
12 operating transistor
13 capacitor
A display section
B control section
107 glass substrate having a transparent electrode
106 organic EL layer
105 cathode
102 glass cover
108 nitrogen gas
109 desiccant

BEST MODES TO CARRY OUT THE INVENTION

In the organic EL element material of the present invention, molecular designing of an organic EL element material for use in an organic EL element has been realized via the embodiment set forth by any one of items (1)-(8). Further, by use of the organic EL element material, there has been provided an organic EL element exhibiting high emission efficiency and having a prolonged emission lifetime, lighting equipment, and a display device.

Each of the constituent elements of the present invention will now be detailed successively.

The inventors of the present invention, as a result of their diligent investigation on the problems, have found that via an organic electroluminescence element incorporating, as an organic EL element material, a metal complex having a specific partial structure represented by Formulas (1)-(6) or a metal complex represented by Formula (7), an emission life was substantially prolonged which has been a critical problem in conventional blue light-emitting metal complexes, whereby compatibility of emission efficiency and an emission life has been realized.

<<Metal Complex>>

As an organic EL element material according to the organic EL element of the present invention, there will now be described a metal complex having a partial structure represented by Formulas (1)-(6) or having an interchangeable isomer thereof as a partial structure, as well as a metal complex represented by Formula (7).

In Formula (1), $R_{11}$ and $R_{12}$ represent a substituent, which each may differ or be the same. The substituent includes an alkyl group (for example, a methyl group, an ethyl group, a propyl group, an isopropyl group, or a tert-butyl group), a cycloalkyl group (for example, a cyclopentyl group or a cyclohexyl group), an alkenyl group (for example, a vinyl group or an allyl group), an alkynyl group (for example, an ethynyl group), an aryl group (for example, a phenyl group or a 2,6-dimethylphenyl group), a heteroaryl group (for example, a furyl group, a thienyl group, a pyridyl group, a pyridazyl group, a pyrimidyl group, a pyrazyl group, a triazyl group, an imidazolyl group, a pyrazolyl group, a thiazolyl group, a quinazolyl group, or a phthalazyl group), a heterocyclic group (for example, a pyrrolidyl group, an imidazolydyl group, a morpholyl group, or an oxazolydyl group), an alkoxy group (for example, a methoxy group or an ethoxy group), a cycloalkoxy group (for example, a cyclopentyloxy group or a cyclohexyloxy group), an aryloxy group (for example, a phenoxy group or a naphthyloxy group), an alkylthio group (for example, a methylthio group or an ethylthio group), a cycloalkylthio group (for example, a cyclopentylthio group or a cyclohexylthio group), an arylthio group (for example, a phenylthio group or a naphthylthio group), an alkoxycarbonyl group (for example, a methyloxycarbonyl group or an ethyloxycarbonyl group), an aryloxycarbonyl group (for example, a phenyloxycarbonyl group or a naphthyloxycarbonyl group), a sulfamoyl group (for example, an aminosulfonyl group, a methylaminosulfonyl group, or a dimethylaminosulfonyl group), an acyl group (for example, an acetyl group or an ethylcarbonyl group), an acyloxy group (for example, an acetyloxy group or an ethylcarbonyloxy group), an amido group (for example, a methylcarbonylamino group, an ethylcarbonylamino group, or a dimethylcarbonylamino group), a carbamoyl group (for example, an aminocarbonyl group, a methylaminocarbonyl group, a dimethylaminocarbonyl group), a ureido group (for example, a methylureido group or an ethylureido group), an amino group (for example, an amino group, an ethylamino group, a dimethylamino group, or a diphenylamino group), a halogen atom (for example, a fluorine atom, a chlorine atom, or a bromine atom), a fluorinated hydrocarbon group (for example, a fluoromethyl group or a trifluoromethyl group), a cyano group, a nitro group, a hydroxyl group, a mercapto group, and a silyl group (for example, a trimethylsilyl group). These groups may further be substituted.

$R_{14}$-$R_{17}$ represent a hydrogen atom or a substituent, which each may differ or be the same. As the substituent, for example, substituents, exemplified in describing $R_{11}$ and $R_{12}$, are cited. M represents a metal of the 8th-10th groups of the periodic table of the elements, but preferably represents iridium, platinum, ruthenium, or rhodium, more preferably iridium or platinum.

In Formula (2), $R_{22}$-$R_{23}$ represent a substituent, which each may differ or be the same. As the substituent, for example, substituents, exemplified in describing $R_{11}$ and $R_{12}$, are cited. $R_{24}$-$R_{27}$ represent a hydrogen atom or a substituent, which each may differ or be the same. As the substituent, for example, substituents, exemplified in describing $R_{11}$ and $R_{12}$, are cited. M represents a metal of the 8th-10th groups of the periodic table of the elements, but preferably represents iridium, platinum, ruthenium, or rhodium, more preferably iridium or platinum.

In Formula (3), $R_{31}$-$R_{33}$ all represent a substituent, which each may differ or be the same. As the substituent, for example, substituents, exemplified in describing $R_{11}$ and $R_{12}$ of Formula (1), are cited. $R_{34}$-$R_{37}$ represent a hydrogen atom or a substituent, which each may differ or be the same. As the substituent, for example, substituents, exemplified in describing $R_{11}$ and $R_{12}$ of Formula (1), are cited. M represents a metal of the 8th-10th groups of the periodic table of the elements, but preferably represents iridium, platinum, ruthenium, or rhodium, more preferably iridium or platinum.

In Formula (4), $R_{41}$-$R_{47}$ represent a hydrogen atom or a substituent. As the substituent, for example, substituents, exemplified in describing $R_{11}$ and $R_{12}$ of Formula (1), are cited. Herein, at least one of $R_{41}$-$R_{47}$ represents —$CHR_{11}R_{12}$, —$CH_2R^{13}$, a cycloalkyl group (for example, a cyclopentyl group or a cyclohexyl group), a trifluoromethyl group, an alkoxy group (for example, a methoxy group or an ethoxy group), or an aryloxy group (for example, a phenoxy group or a naphthyloxy group). $R_{11}$-$R_{13}$ represent a substituent, including, for example, an alkyl group and an aryl group. M represents a metal of the 8th-10th groups of the periodic table of the elements, but preferably represents iridium, platinum, ruthenium, or rhodium, more preferably iridium or platinum.

In Formula (5), $R_{51}$-$R_{57}$ represent a hydrogen atom or a substituent. As the substituent, for example, substituents, exemplified in describing $R_{11}$ and $R_{12}$ of Formula (1), are cited. Herein, at least one of $R_{51}$-$R_{54}$ represents a cyano group. M represents a metal of the 8th-10th groups of the periodic table of the elements, but preferably represents iridium, platinum, ruthenium, or rhodium, more preferably iridium or platinum.

In Formula (6), $R_{61}$-$R_{67}$ represent a hydrogen atom or a substituent. As the substituent, for example, substituents, exemplified in describing $R_{11}$ and $R_{12}$ of Formula (1), are cited. Herein, at least one of $R_{64}$-$R_{67}$ represents —$NR^{14}R^{15}$. $R^{14}$ and $R^{15}$ represent a substituent, including, for example, an alkyl group or an aryl group. M represents a metal of the 8th-10th groups of the periodic table of the elements, but preferably represents iridium, platinum, ruthenium, or rhodium, more preferably iridium or platinum.

In Formula (7), $R_1$-$R_7$ represent a hydrogen atom or a substituent. As the substituent, for example, substituents, exemplified in describing $R_{11}$ and $R_{12}$ of Formula (1), are cited. $X_4$ and $X_5$ represent a carbon, atom or a nitrogen atom, which each may differ or be the same. $X_1$-$X_3$ represent $CR^8$, a nitrogen atom, or $NR^9$, wherein $R^8$ and $R^9$ represent a hydrogen atom or a substituent. As the substituent, for example, substituents, exemplified in describing $R_{11}$ and $R_{12}$ of Formula (1), are cited. Z forms a five-membered ring or a six-membered ring together with C and $X_5$. As the five-membered ring, cyclopentane, furan, thiophene, pyrrole, imidazole, pyrazole, oxazole, and thiazole are cited, all of which may be further substituted. As the five-membered ring, cyclohexane, benzene, and pyridine are cited, all of which may be further substituted.

Further, m represents an integer satisfying 3≥m≥1; n represents an integer satisfying 2≥n≥1; and m+n represents a valence number of the metal M. M represents a metal of the 8th-10th groups of the periodic table of the elements, but preferably represents iridium, platinum, ruthenium, or rhodium, more preferably iridium or platinum.

There will now be described specific examples of the metal complex having a partial structure represented by Formulas (1)-(6) or having an interchangeable isomer thereof as a partial structure, as well as the metal complex represented by Formula (7), but these examples do not limit the scope of the present invention.

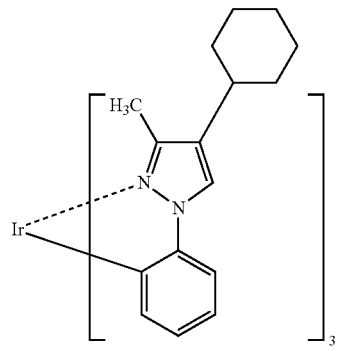

1-1

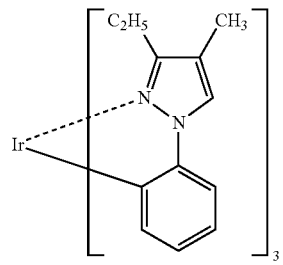

1-2

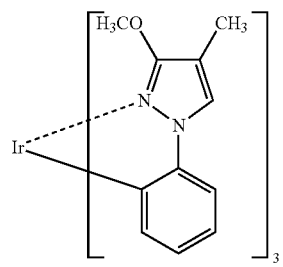

1-3

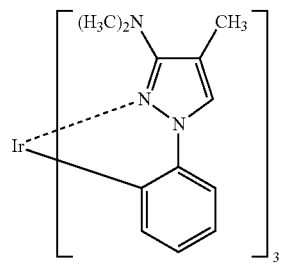

1-4

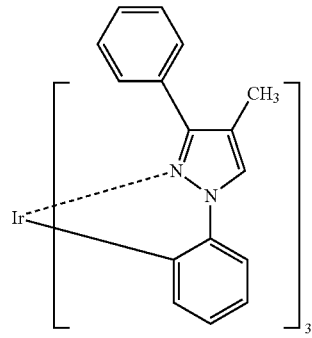

1-5

1-6
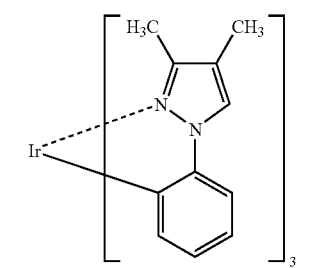
1-7
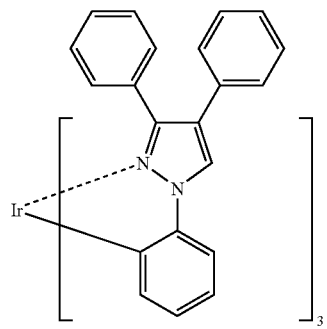
1-8
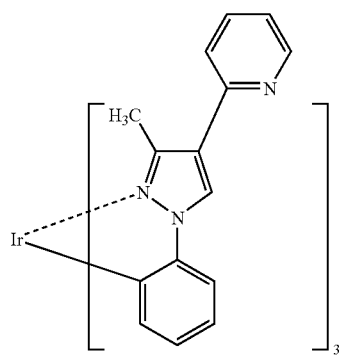
1-9
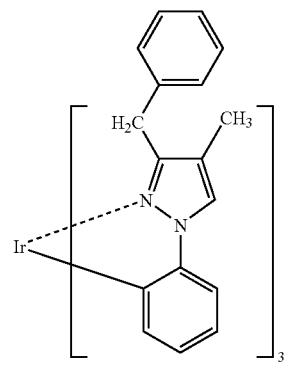
1-10
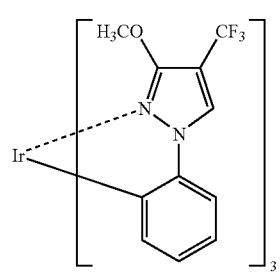
1-11
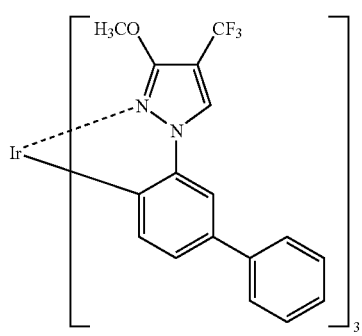
1-12
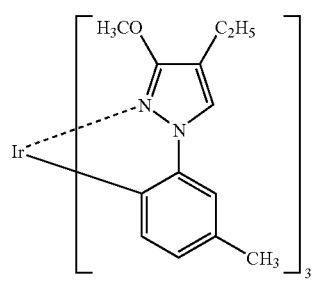
1-13
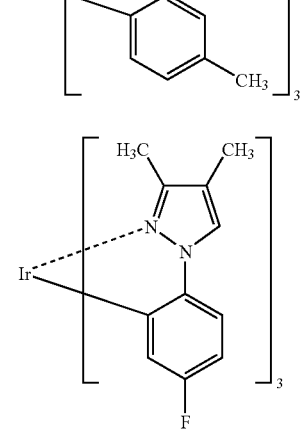
1-14
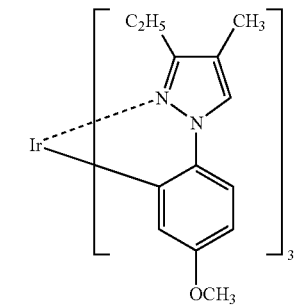
1-15
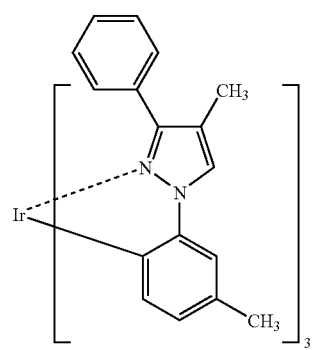

1-16 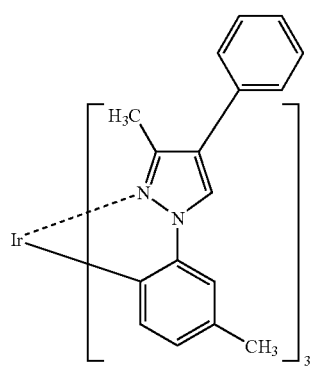
1-17 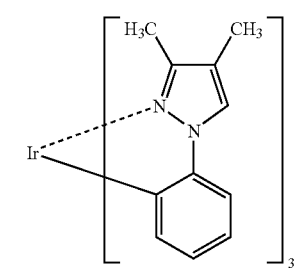
1-18 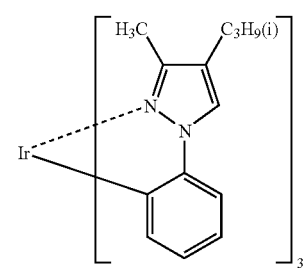
1-19 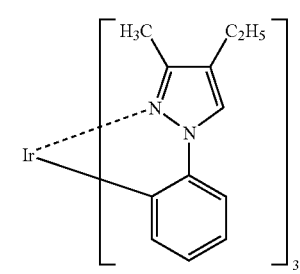
1-20 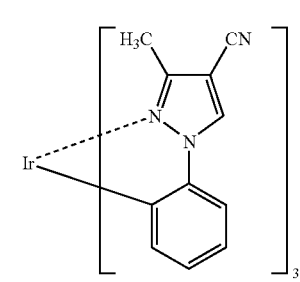
1-21 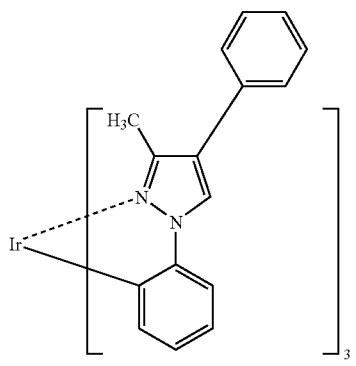
1-22 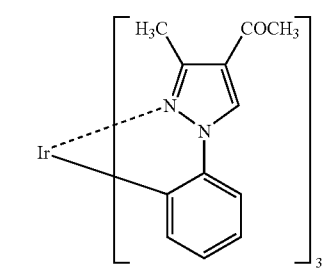
1-23 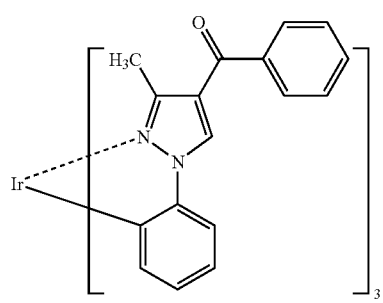
1-24 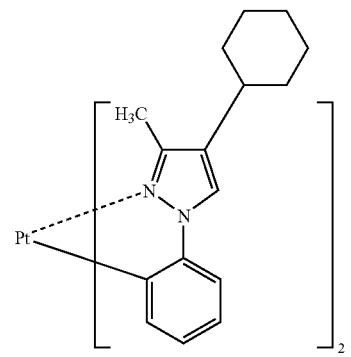
1-25 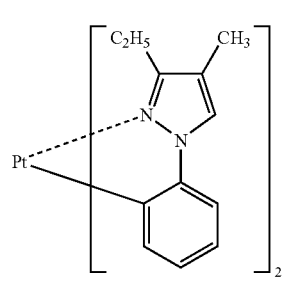

1-26 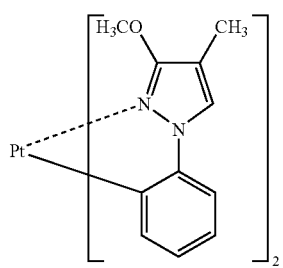
1-27 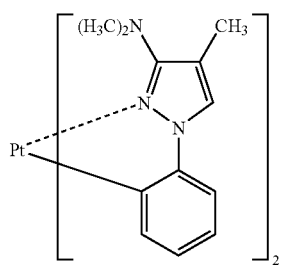
1-28 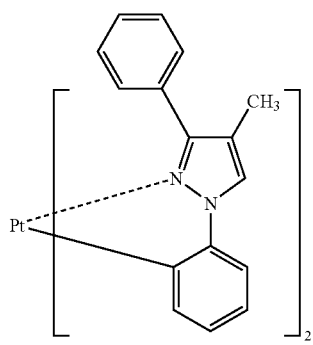
1-29 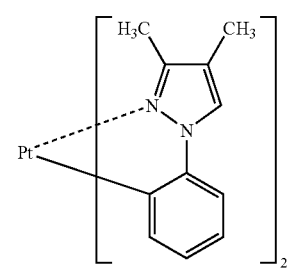
1-30 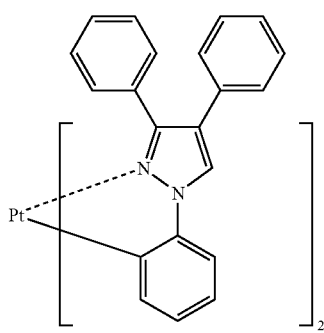
1-31 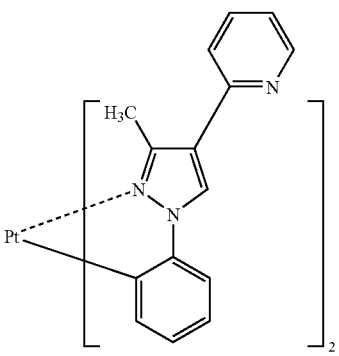
1-32 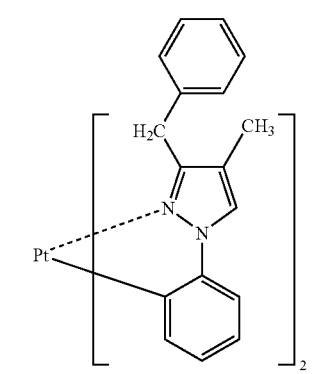
1-33 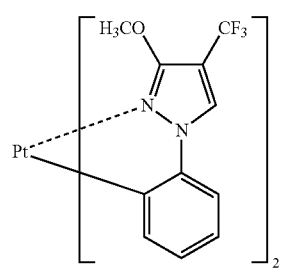
1-34 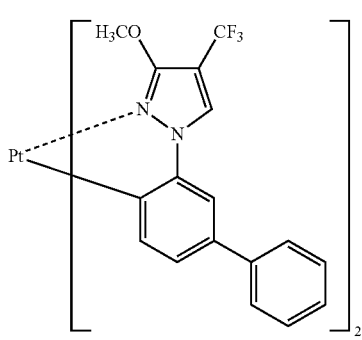
1-35 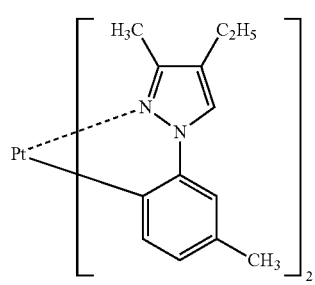

-continued
1-36
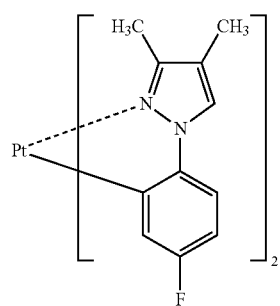
1-37
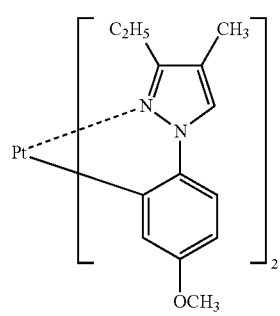
1-38
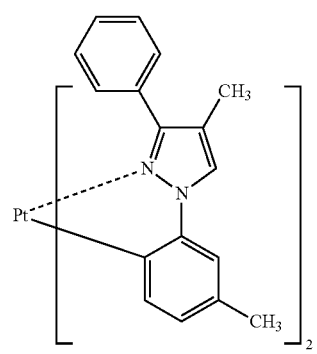
1-39
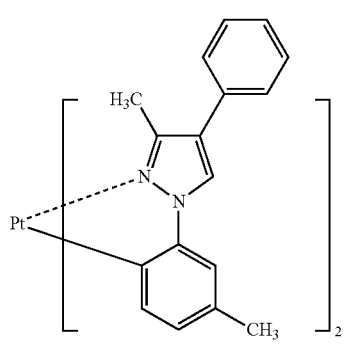
1-40
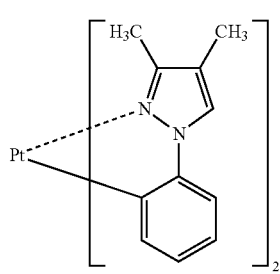
-continued
1-41
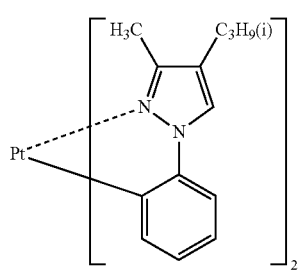
1-42
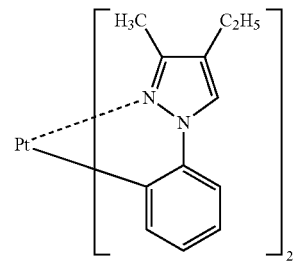
1-43
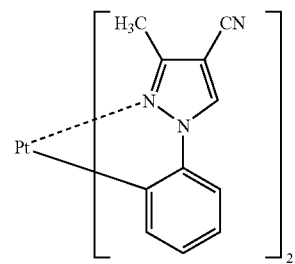
1-44
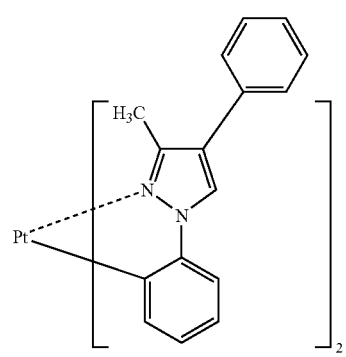
1-45
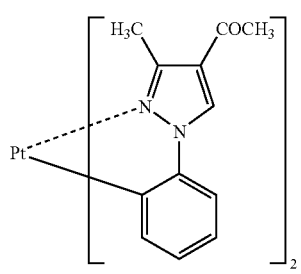

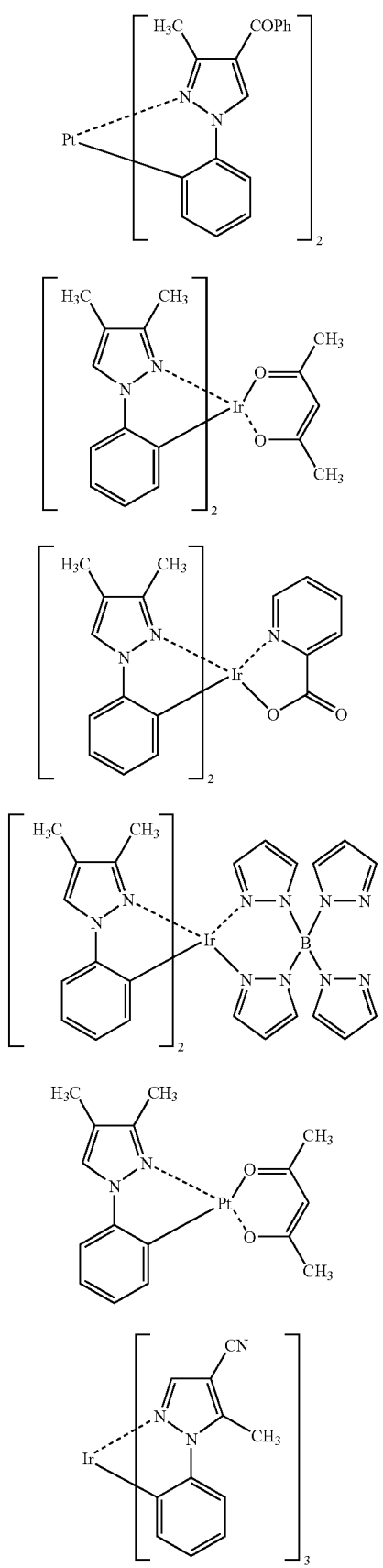
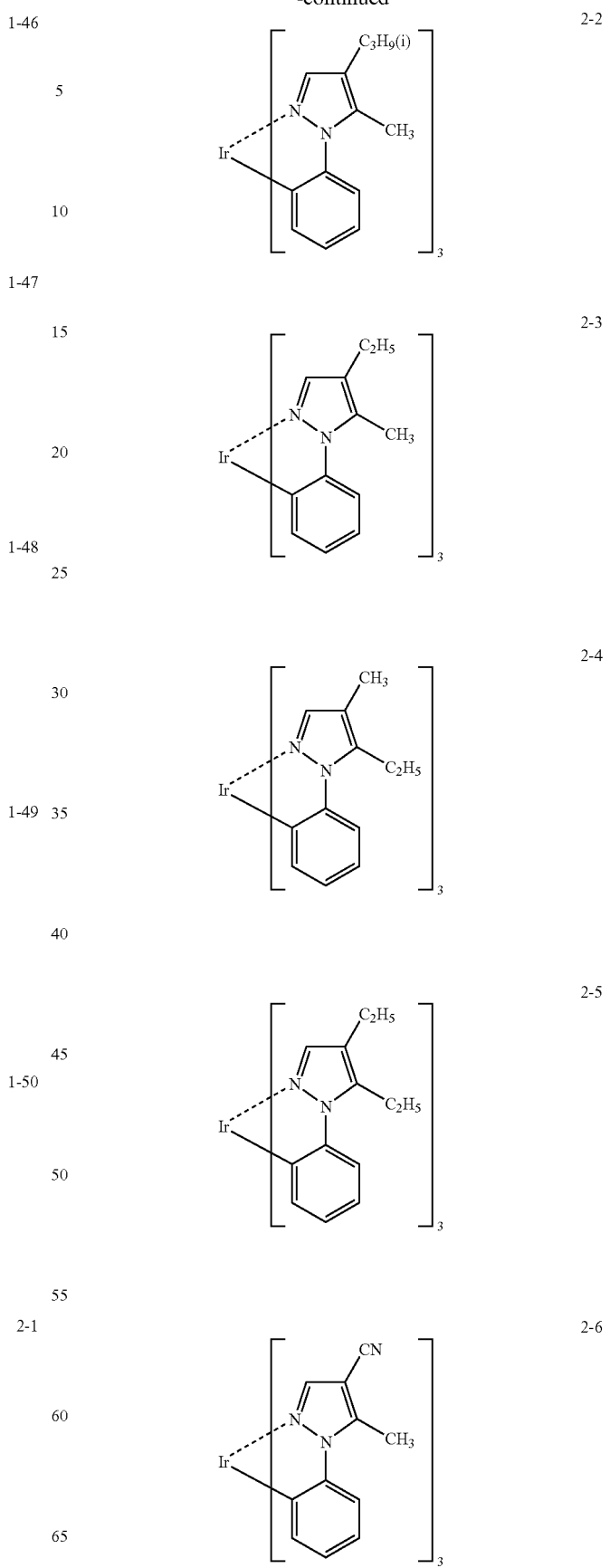

2-7 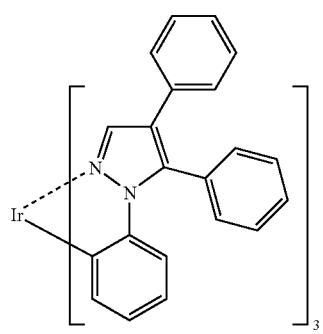
2-8 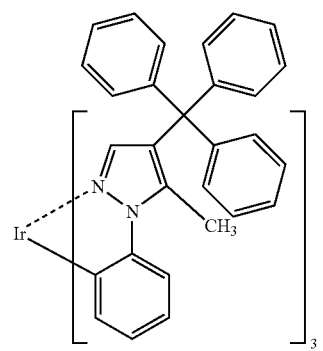
2-9 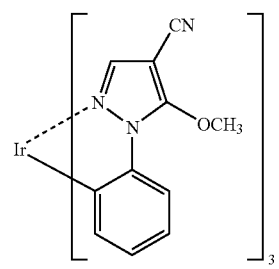
2-10 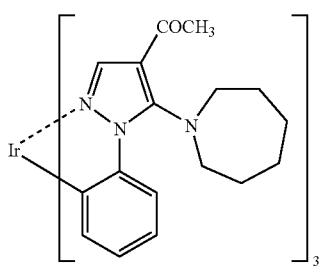
2-11 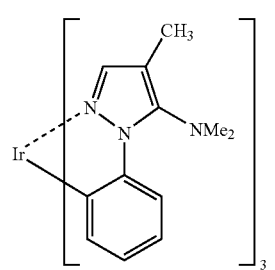
2-12 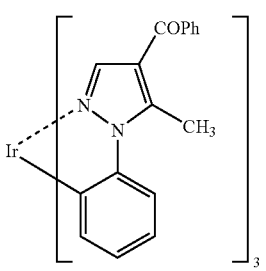
2-13 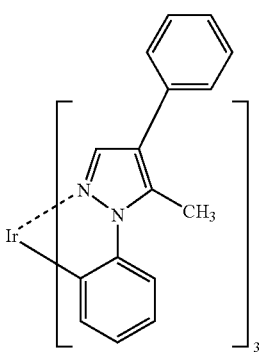
2-14 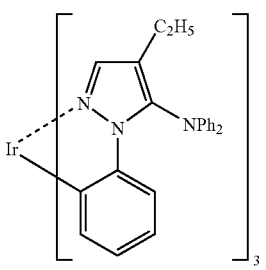
2-15 
2-16

2-17 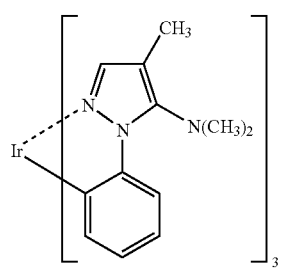
2-18 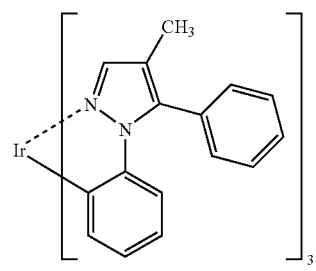
2-19 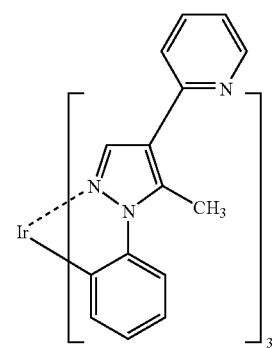
2-20 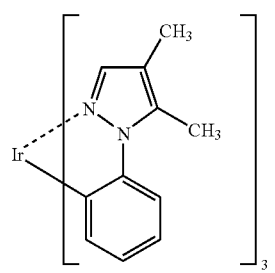
2-21 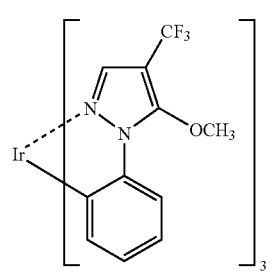
2-22 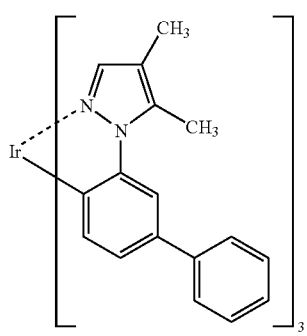
2-23 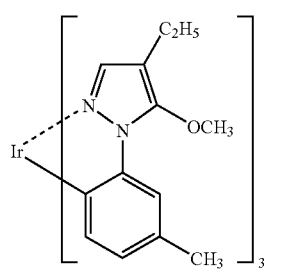
2-24 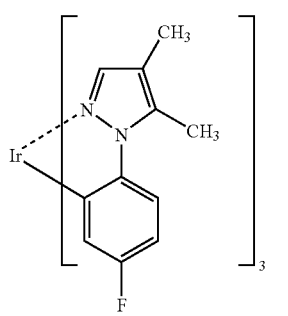
2-25 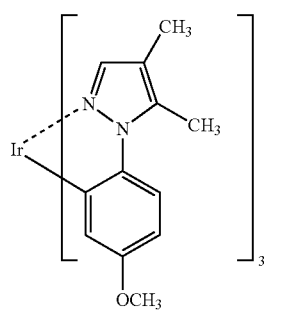
2-26 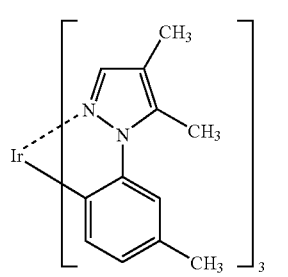

-continued
2-27
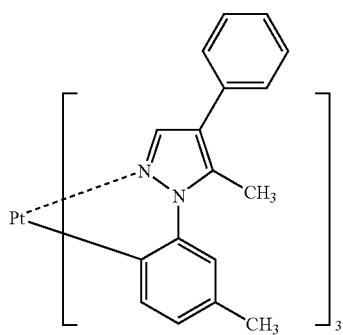
2-28
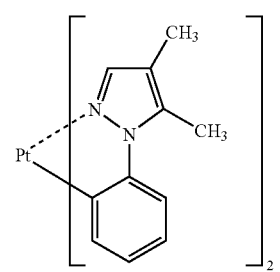
2-29
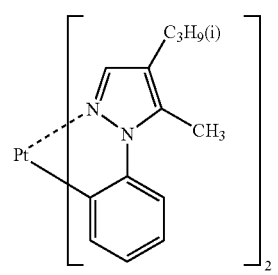
2-30
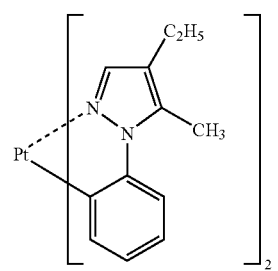
2-31
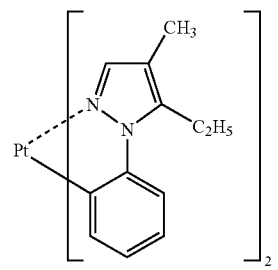
-continued
2-32
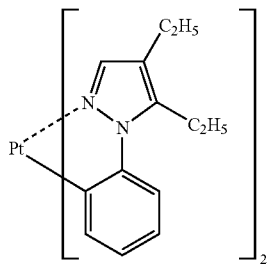
2-33
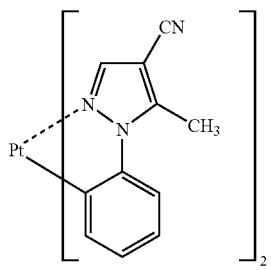
2-34
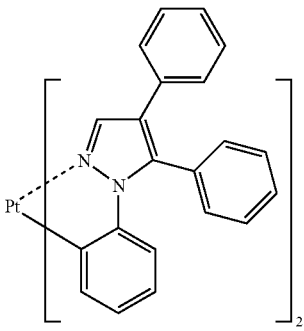
2-35
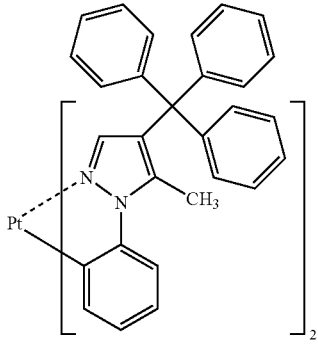
2-36
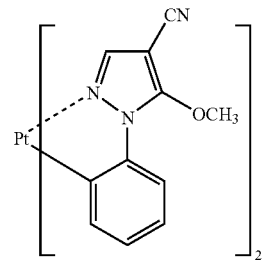

2-37 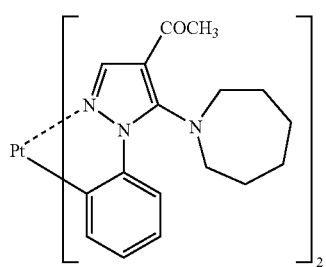
2-38 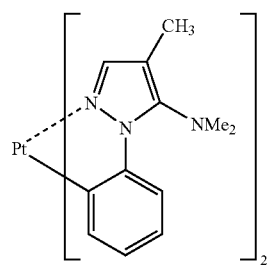
2-39 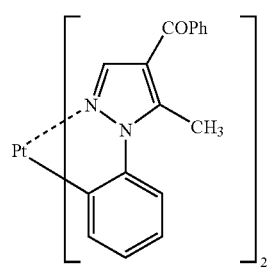
2-40 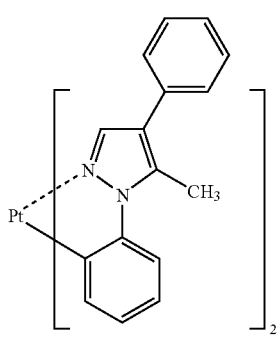
2-41 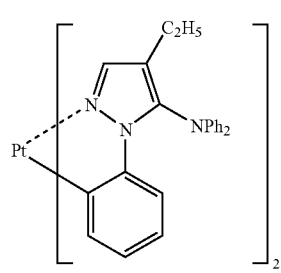
2-42 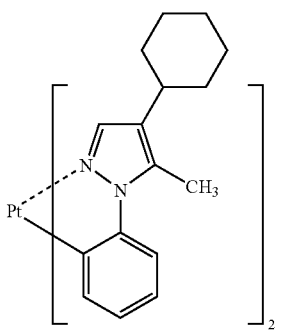
2-43 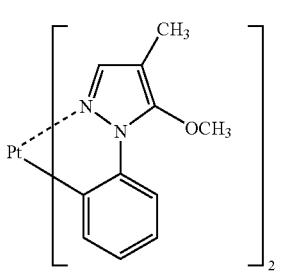
2-44 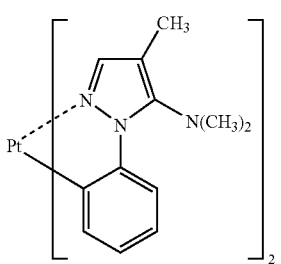
2-45 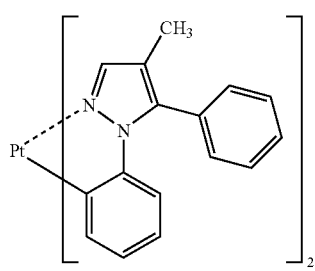
2-46 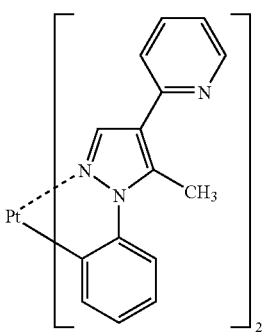

2-47
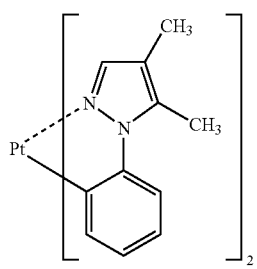
2-48
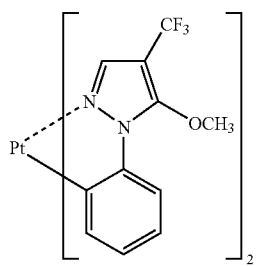
2-49
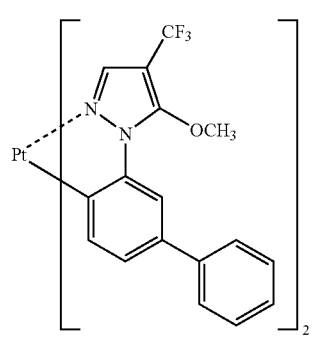
2-50
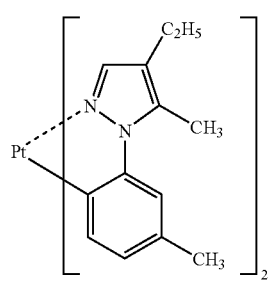
2-51
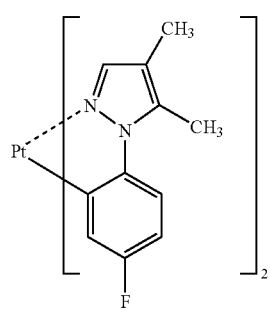
2-52
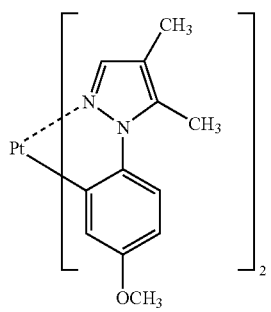
2-53
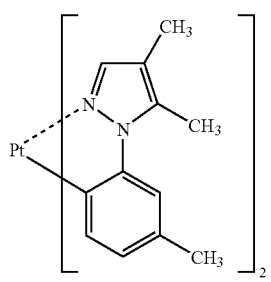
2-54
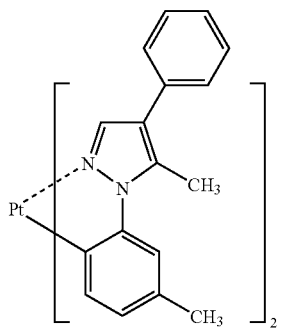
2-55
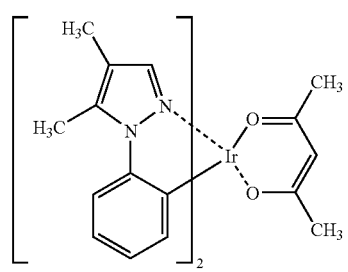
2-56
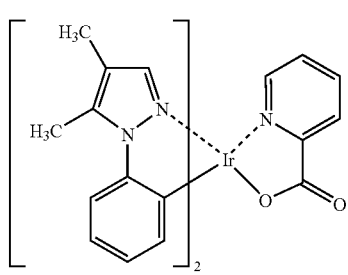

2-57 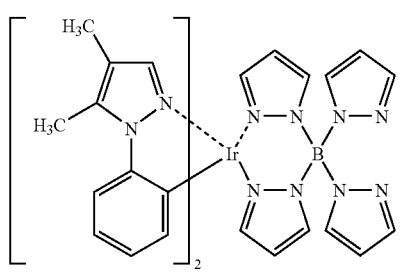
2-58 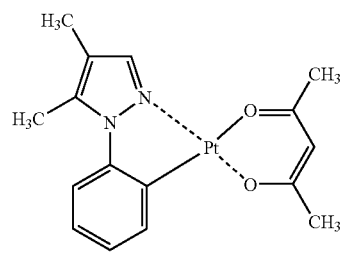
3-1 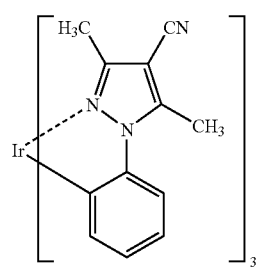
3-2 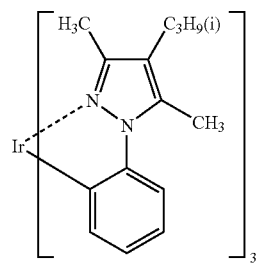
3-4 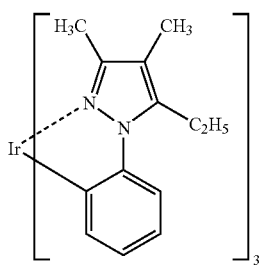
3-5 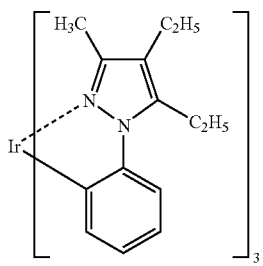
3-6 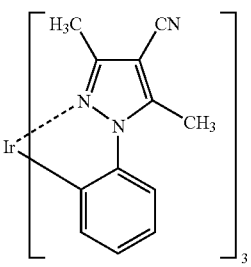
3-7 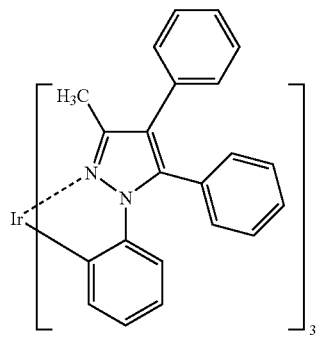
3-8 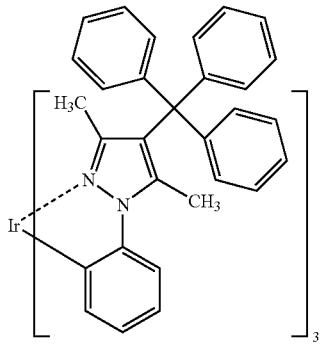
3-9 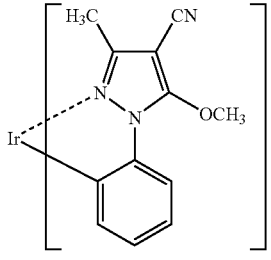
3-10 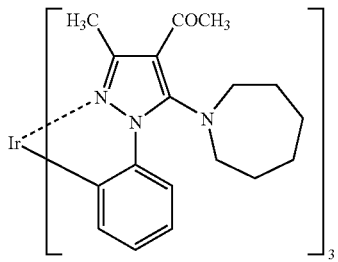

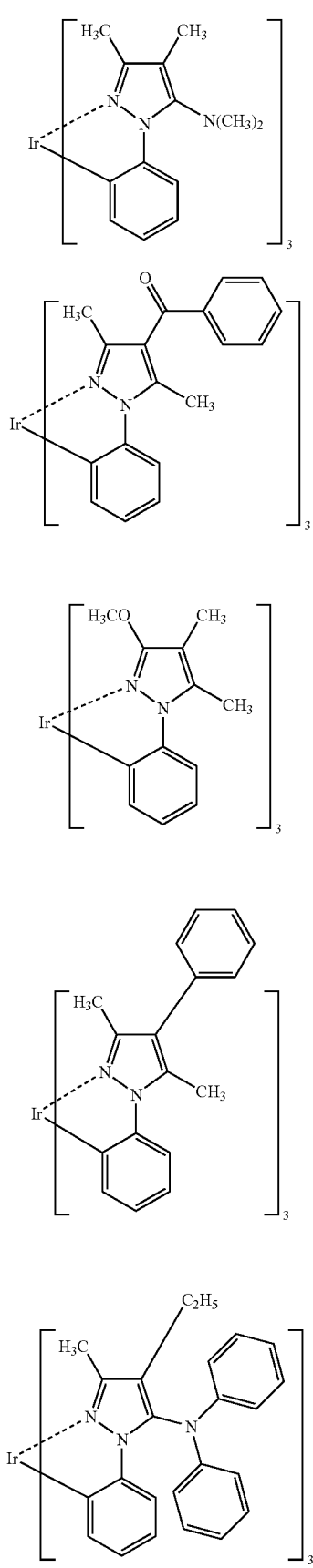
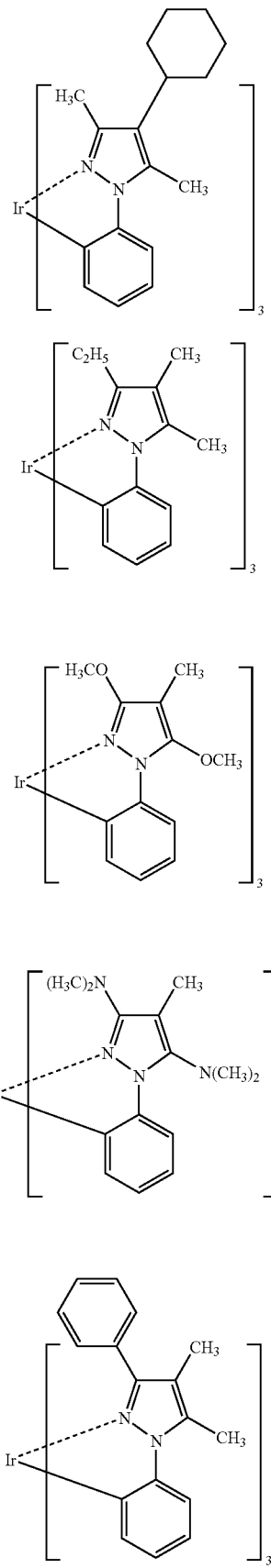

3-21 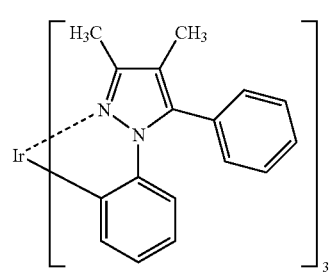
3-22 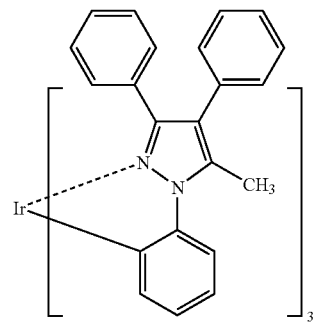
3-23 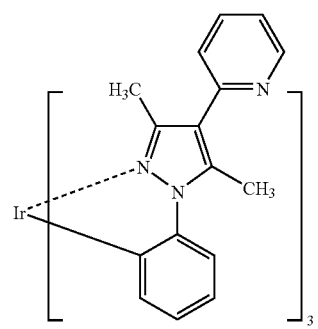
3-24 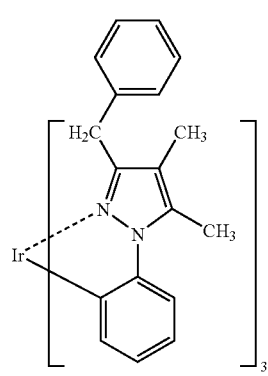
3-25 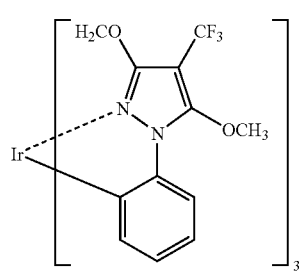
3-26 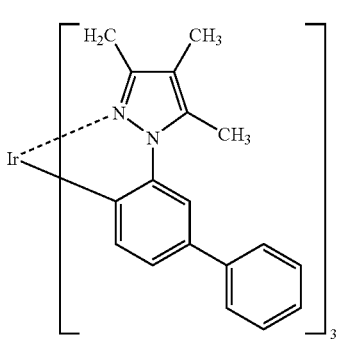
3-27 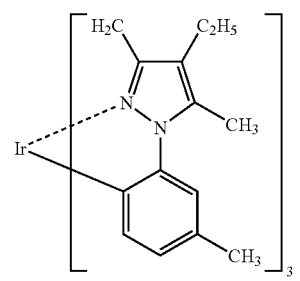
3-28 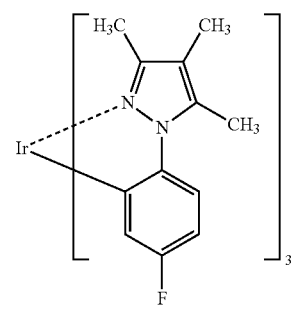
3-29 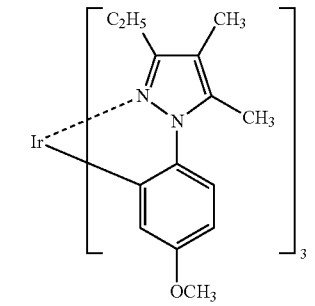
3-30 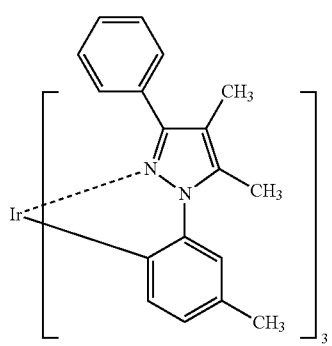

3-31
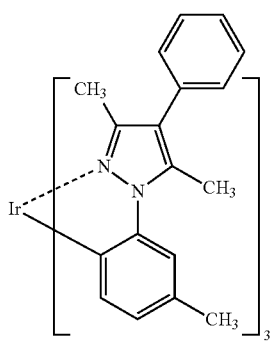
3-32
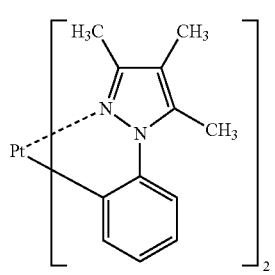
3-34
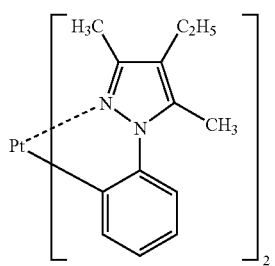
3-35
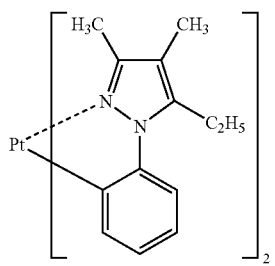
3-36
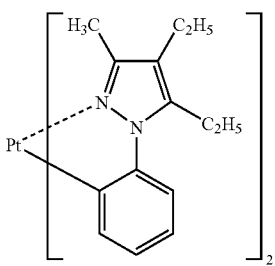
3-37
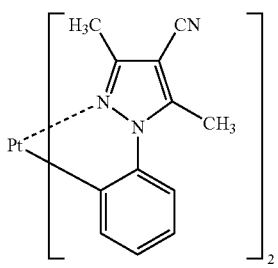
3-38
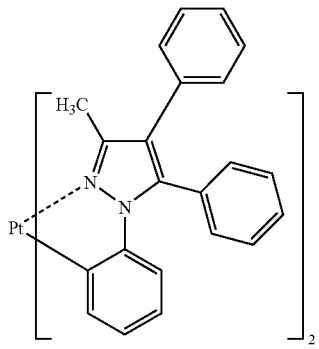
3-39
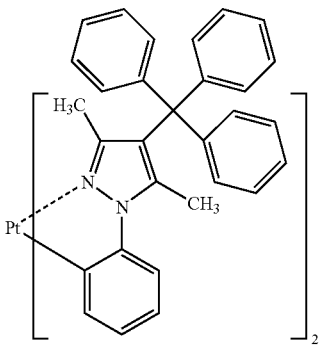
3-40
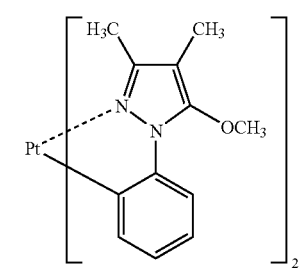
3-41
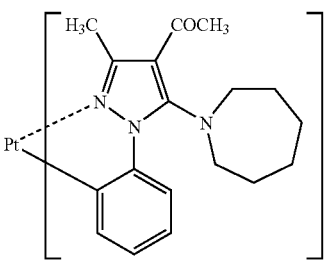

-continued
3-42
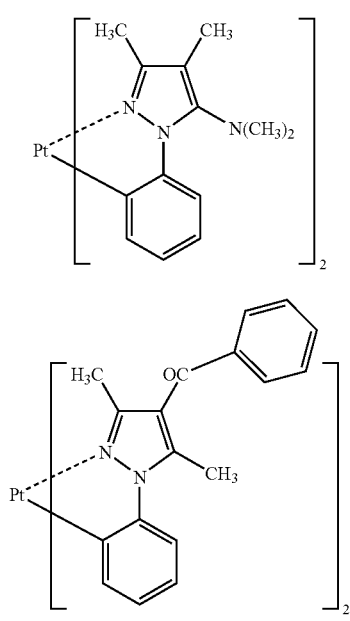
3-43
3-44
3-45
3-46
-continued
3-47
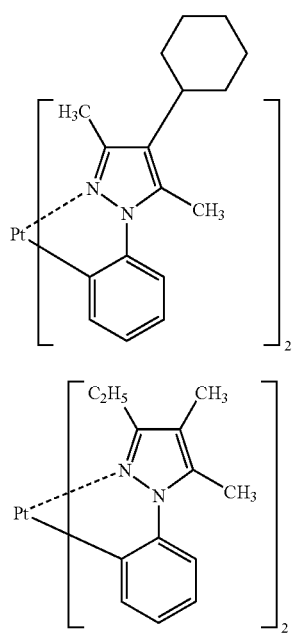
3-48
3-49
3-50
3-51
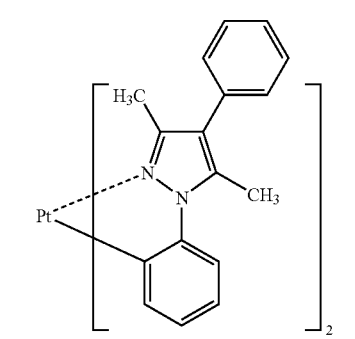
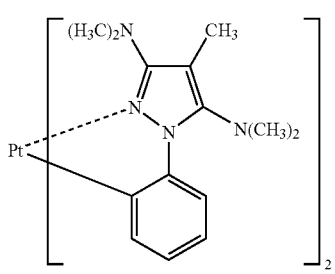
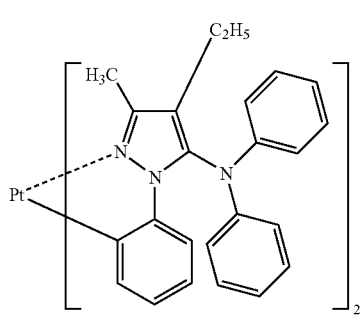
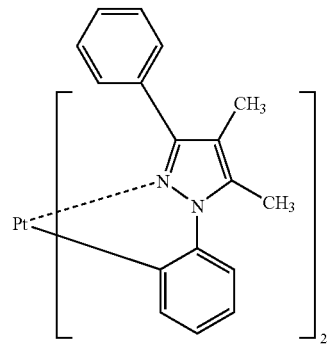

3-52
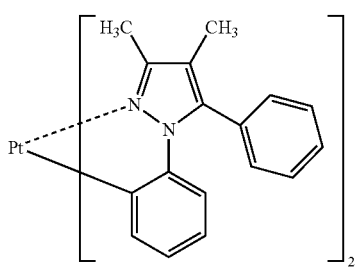
3-53
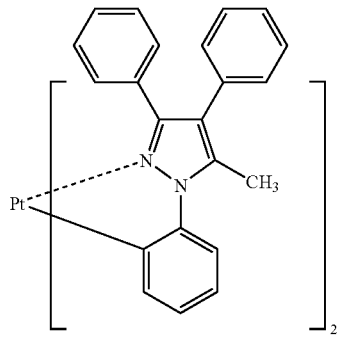
3-54
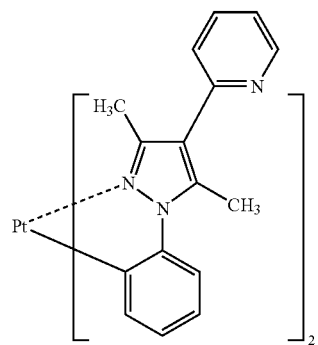
3-55
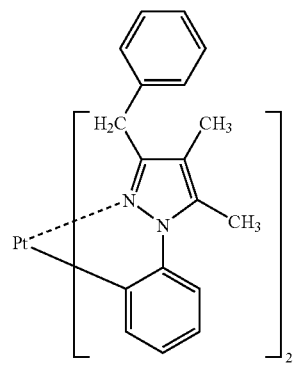
3-56
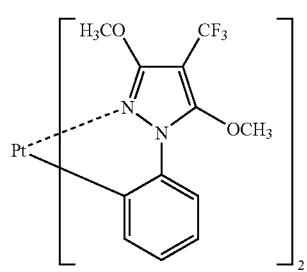
3-57
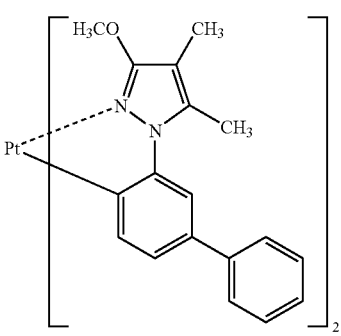
3-58
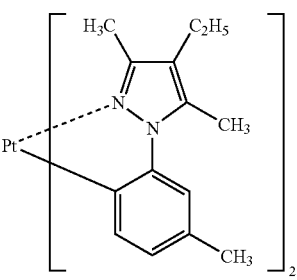
3-59
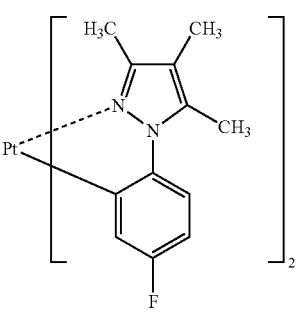
3-60
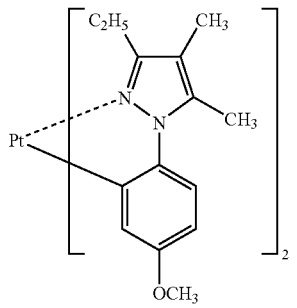
3-61
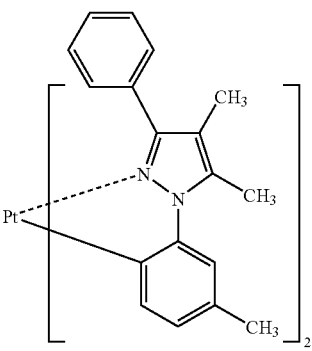

3-62
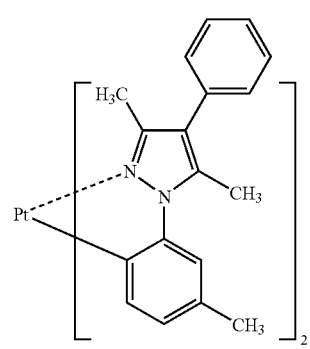
3-63
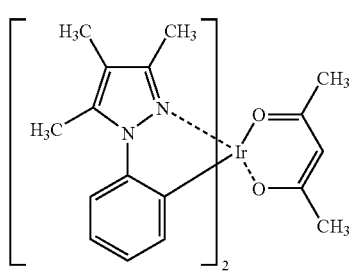
3-64
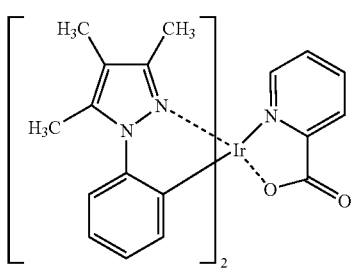
3-65
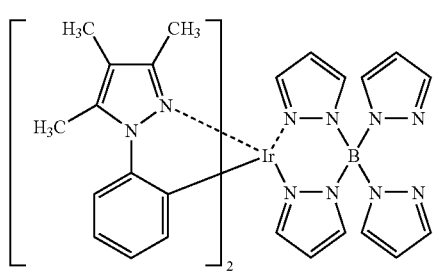
3-66
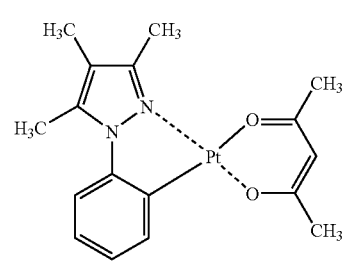
4-1
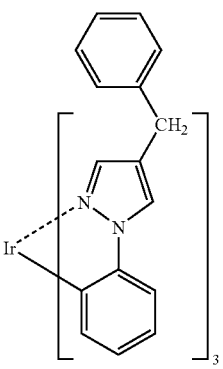
4-2
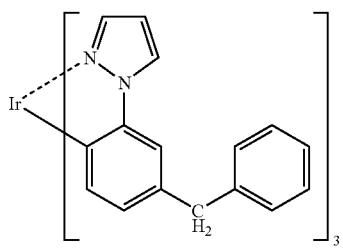
4-3
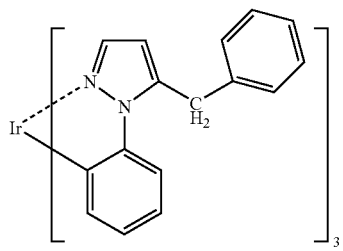
4-4
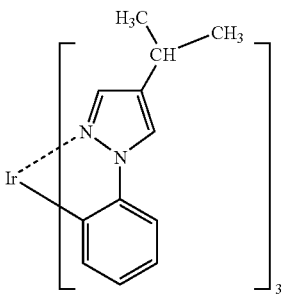
4-5
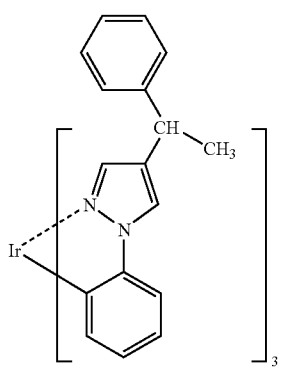

4-6 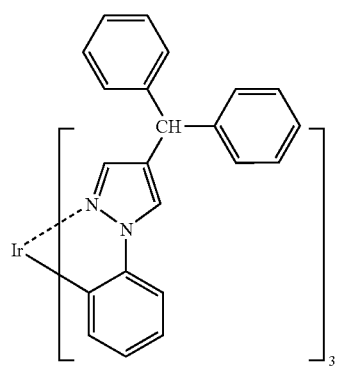
4-7 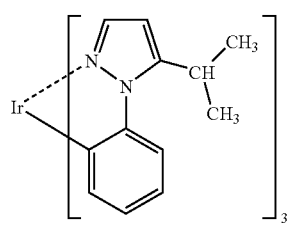
4-8 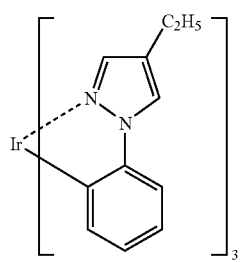
4-9 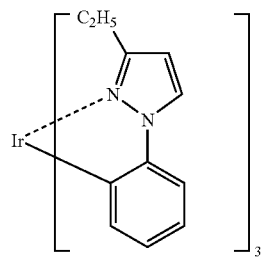
4-10 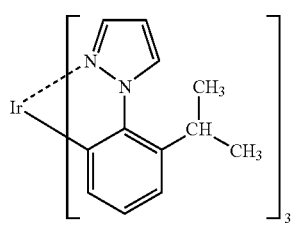
4-11 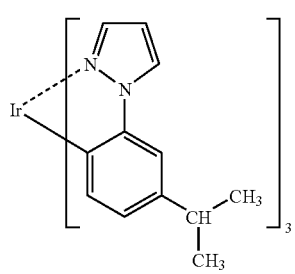
4-12 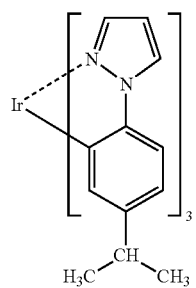
4-13 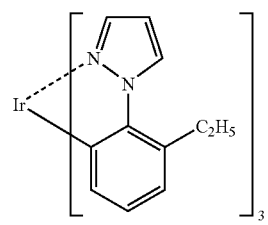
4-14 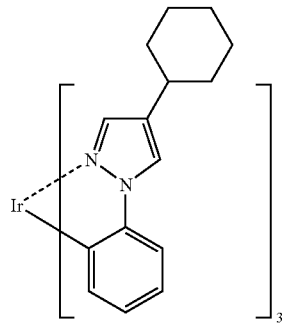
4-15 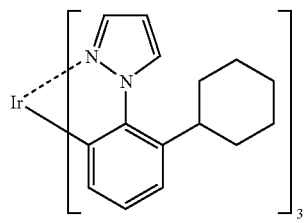
4-16 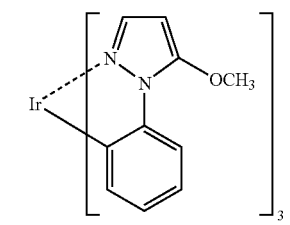
4-17 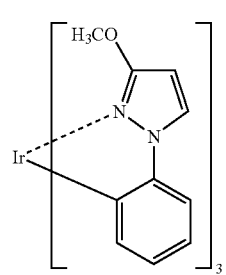

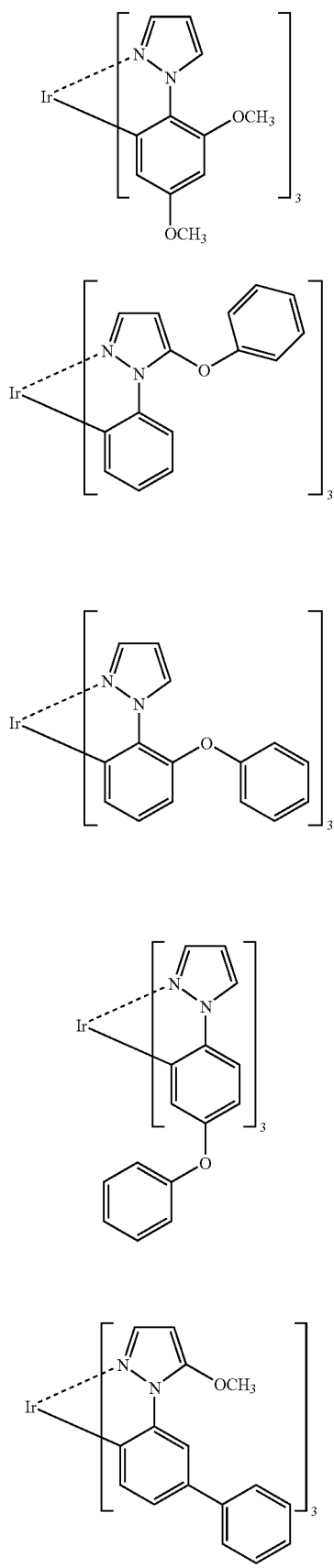
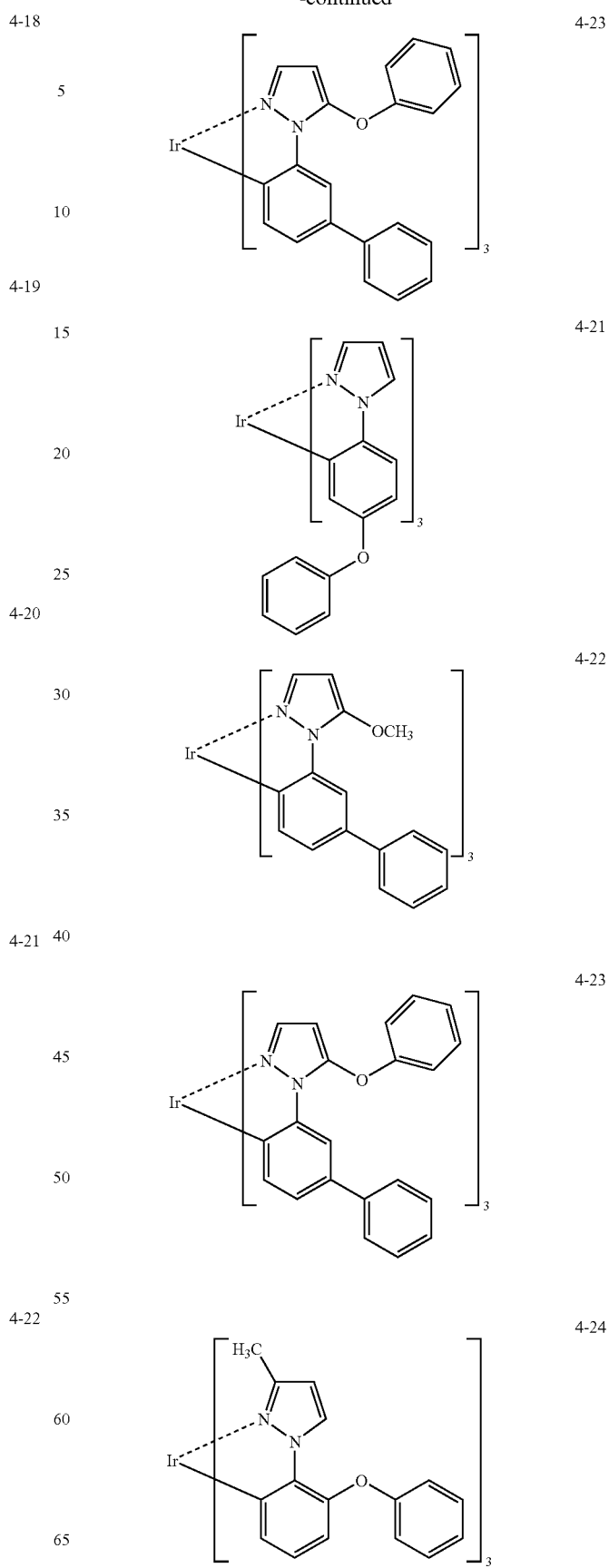

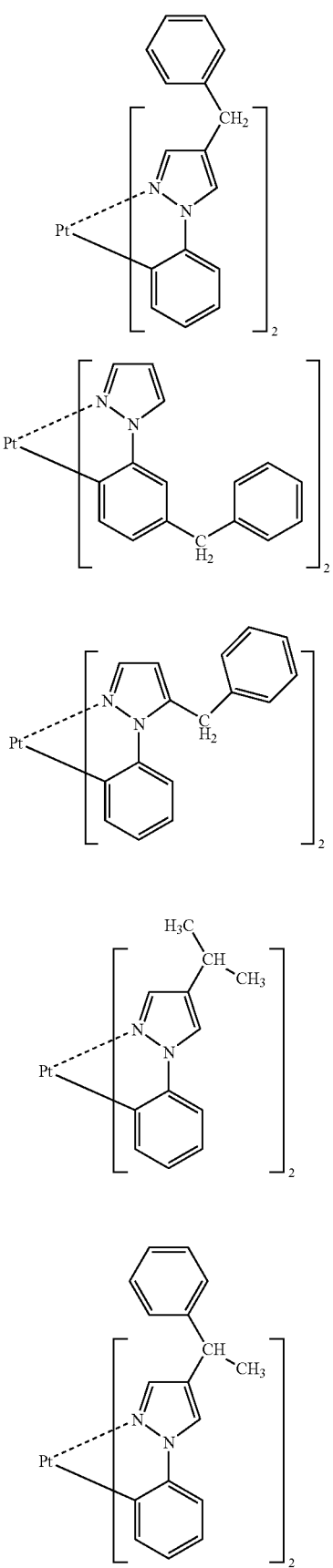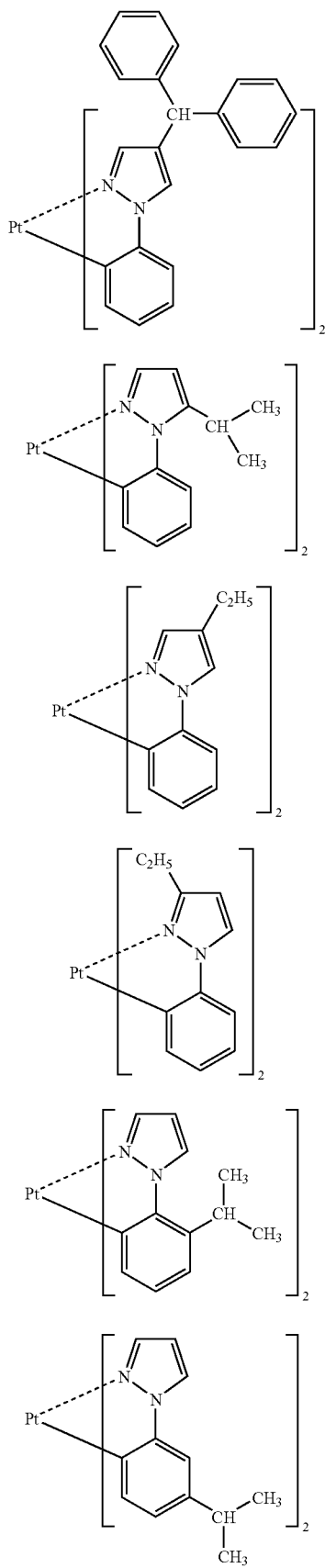

4-36 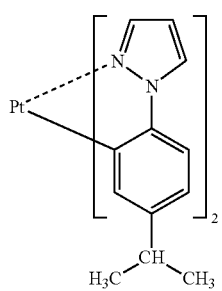
4-37 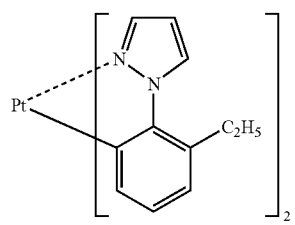
4-38 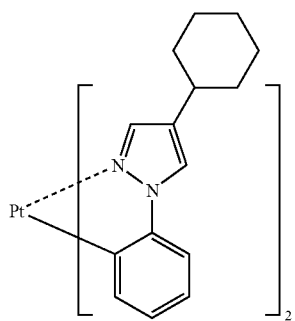
4-39 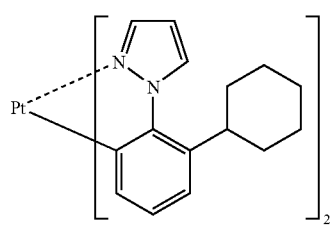
4-40 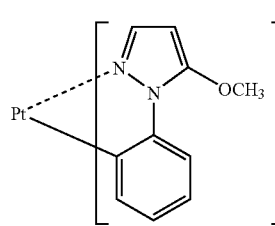
4-41 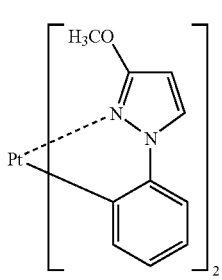
4-42 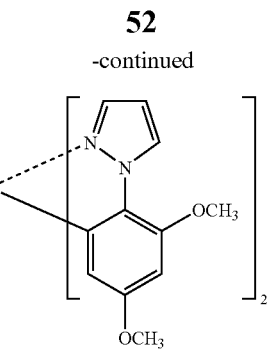
4-43 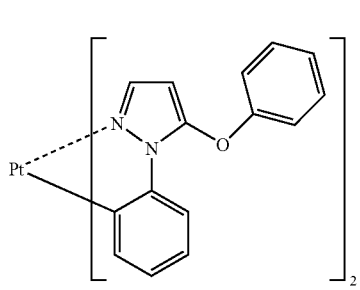
4-44 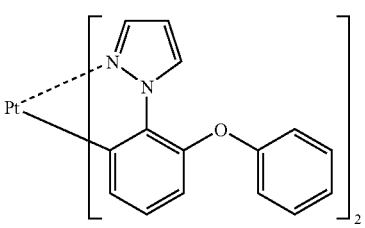
4-45 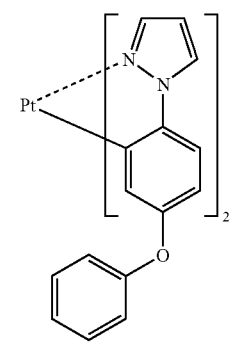
4-46 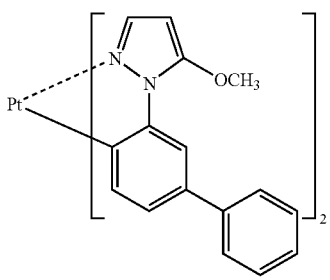

4-47 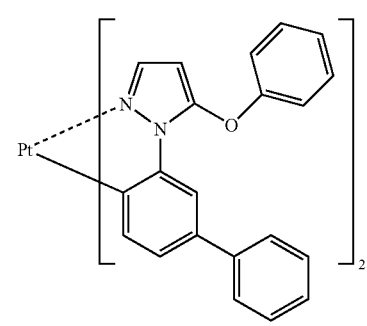
4-48 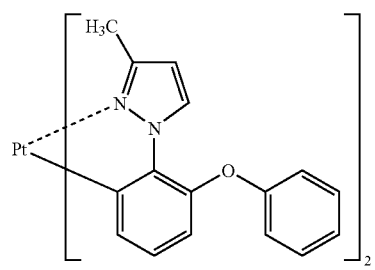
4-49 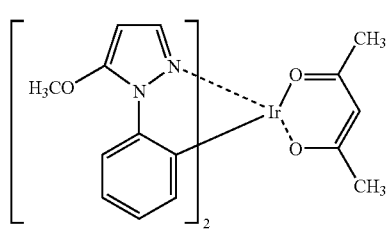
4-50 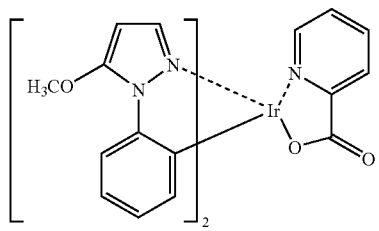
4-51 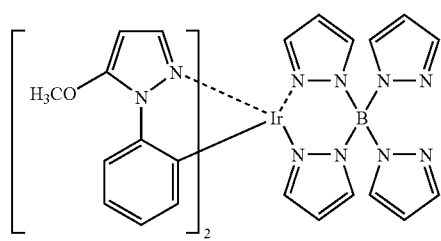
4-52 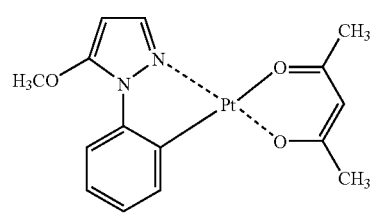
5-1 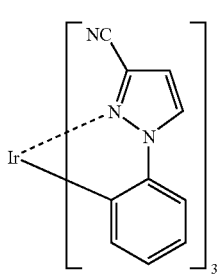
5-2 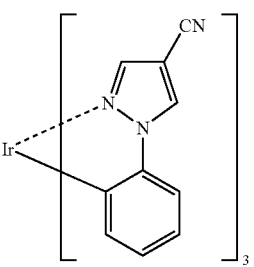
5-3 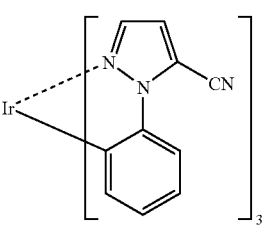
5-4 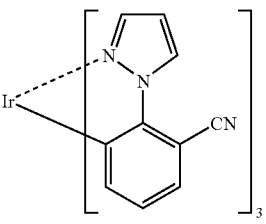
5-5 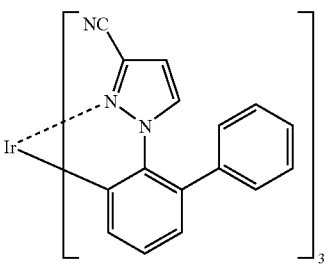
5-6 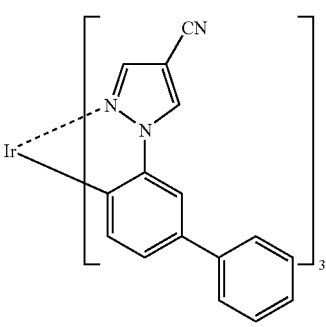

5-7
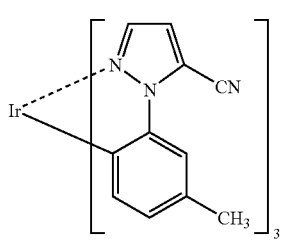
5-8
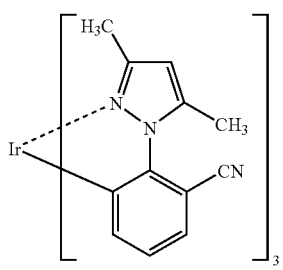
5-9
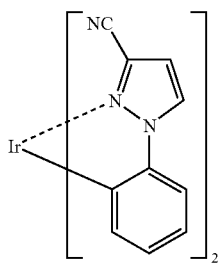
5-10
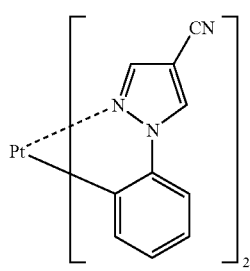
5-11
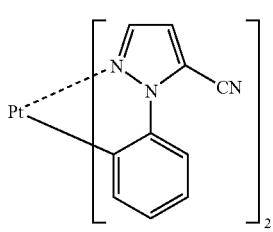
5-12
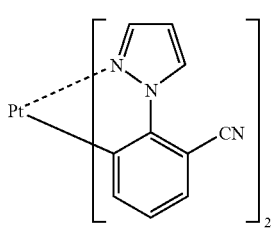
5-13
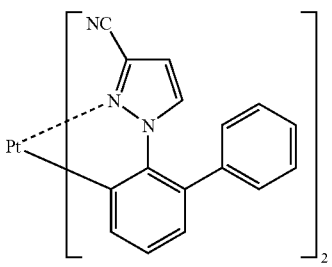
5-14
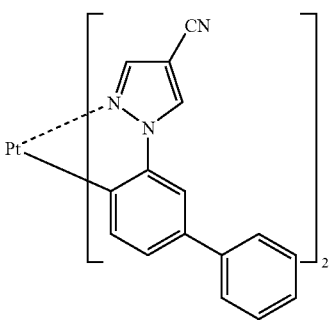
5-15
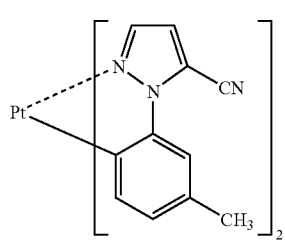
5-16
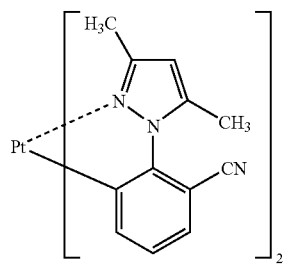
5-17
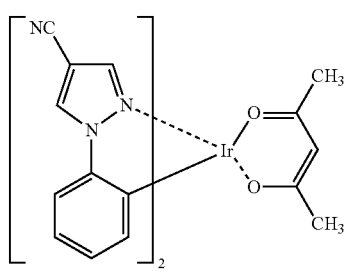
5-18
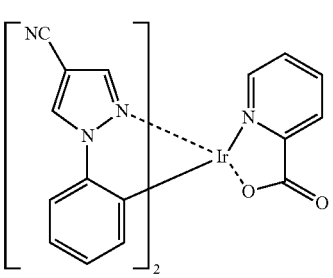

5-19 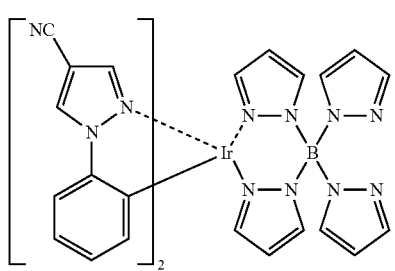
5-20 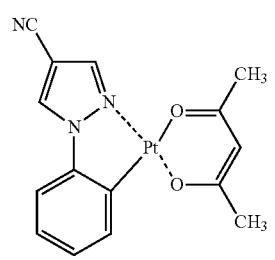
6-1 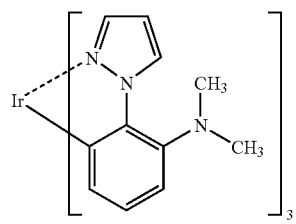
6-2 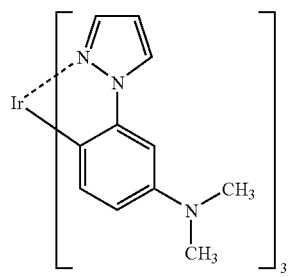
6-3 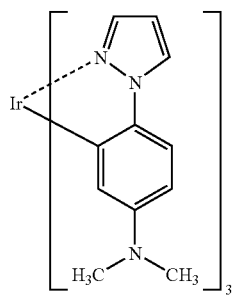
6-4 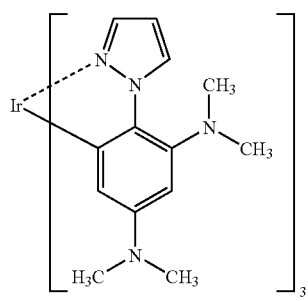
6-5 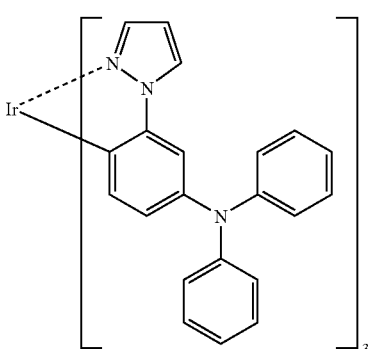
6-6 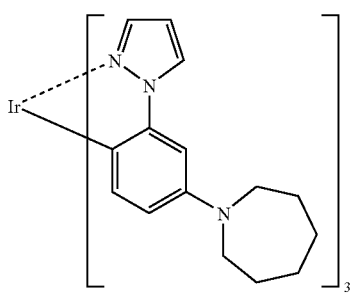
6-7 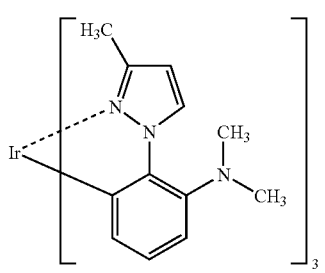
6-8 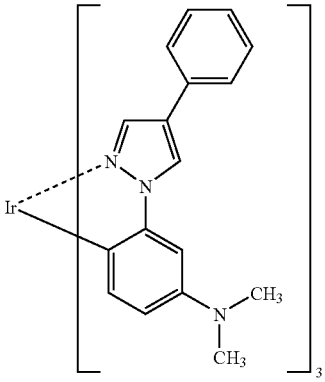
6-9 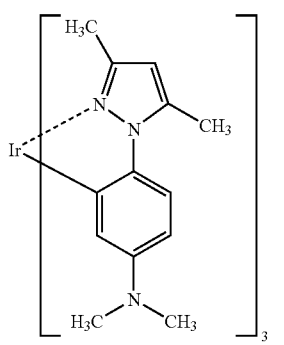

6-10
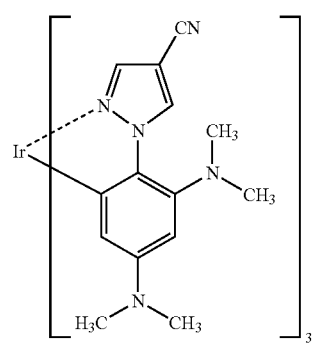
6-11
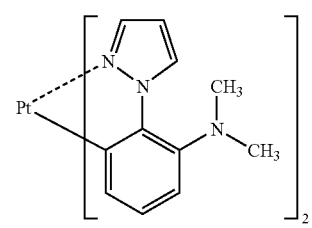
6-12
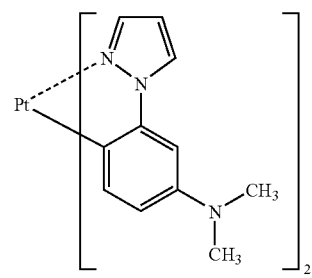
6-13
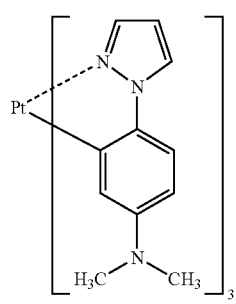
6-14
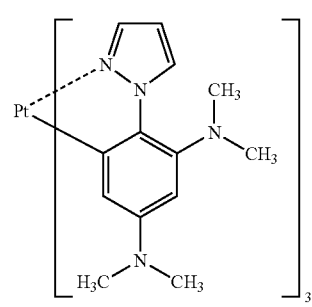
6-15
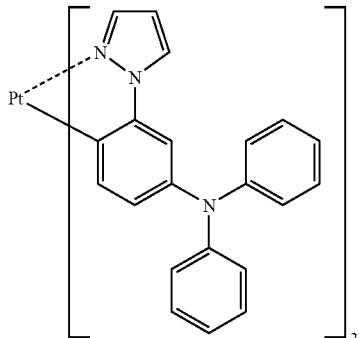
6-16
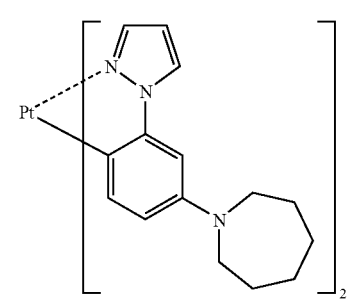
6-17
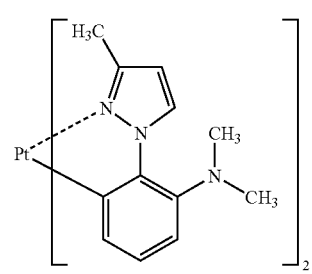
6-18
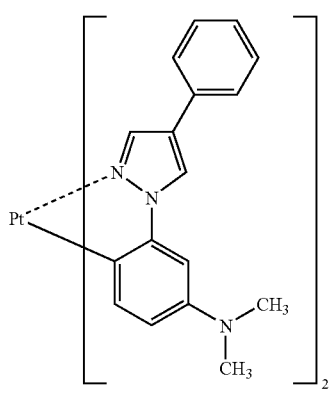
6-19
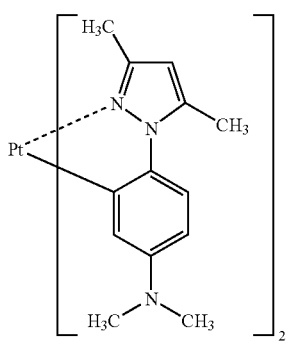

-continued
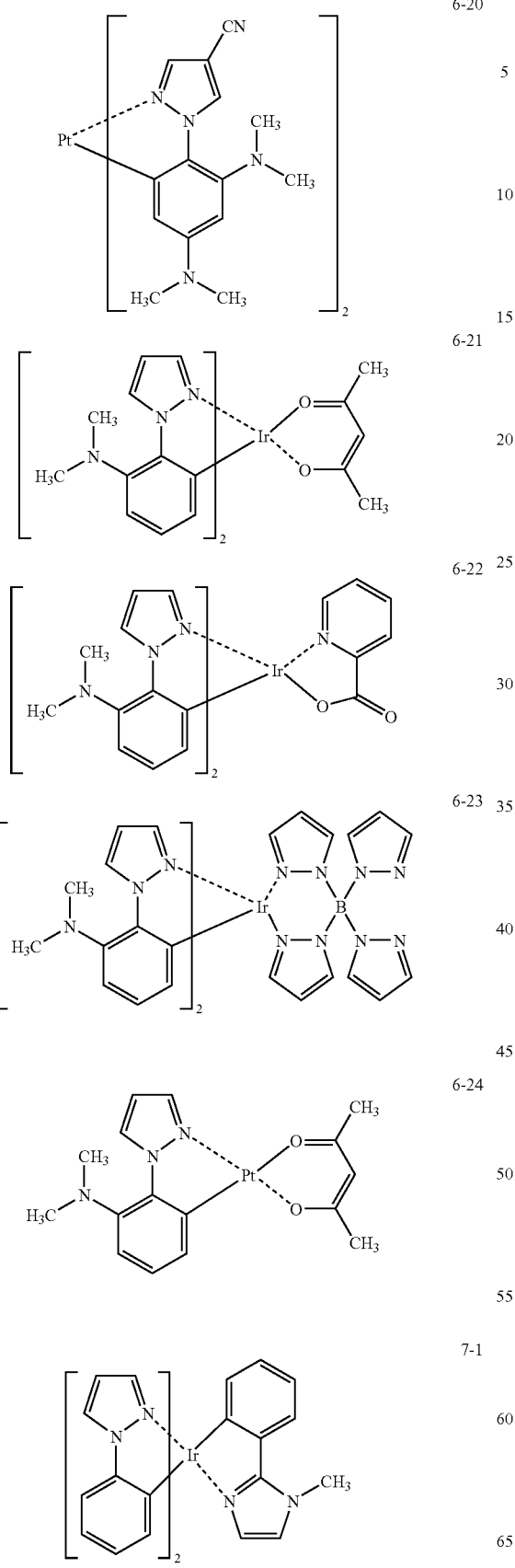
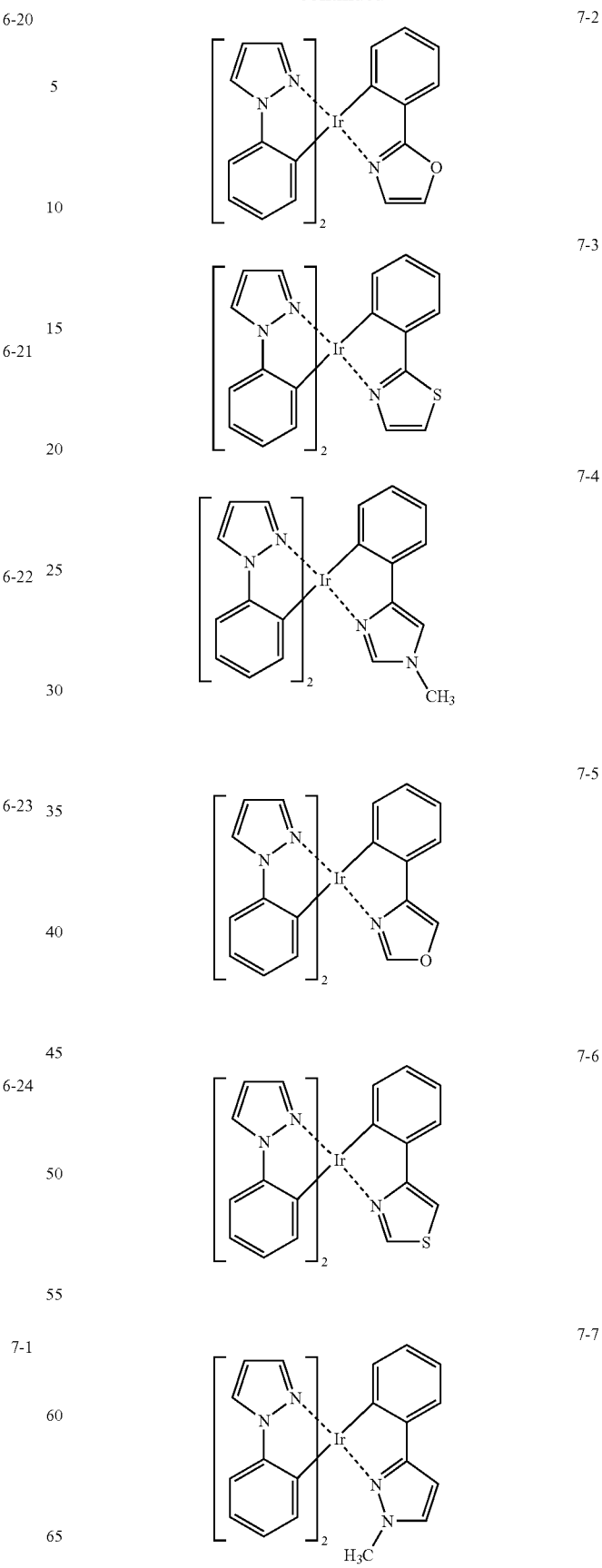

7-8
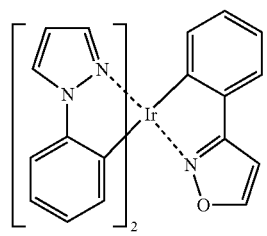
7-9
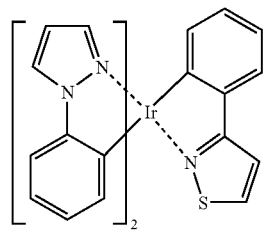
7-10
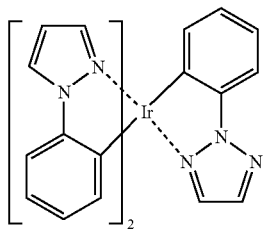
7-11
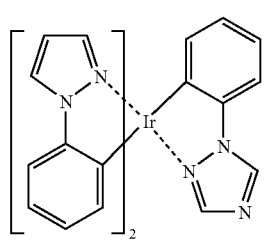
7-12
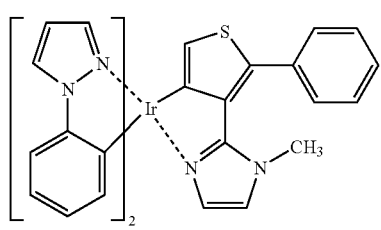
7-13
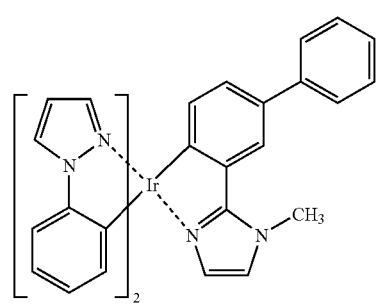
7-14
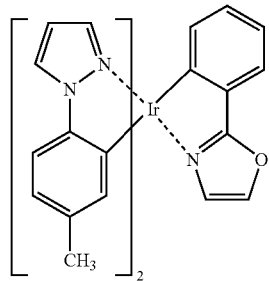
7-15
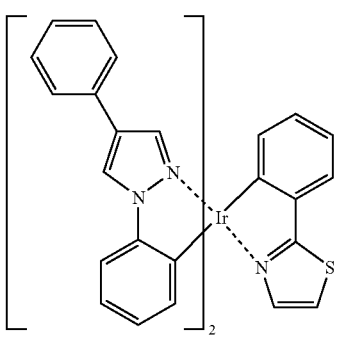
7-16
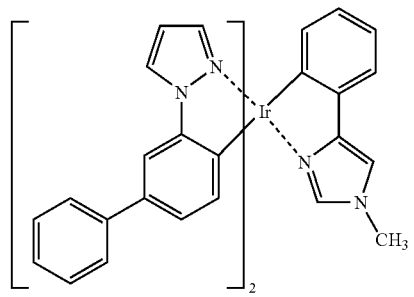
7-17
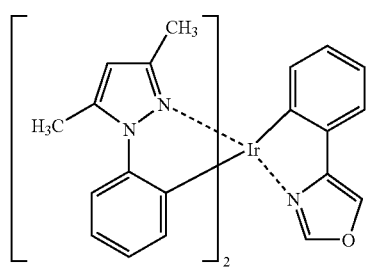
7-18
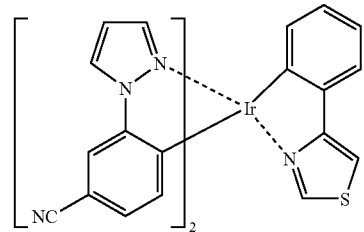

7-19 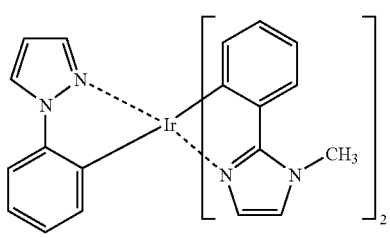
7-20 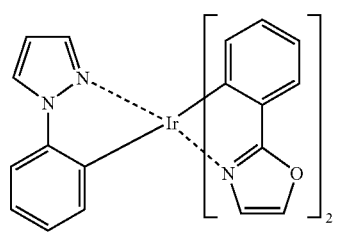
7-21 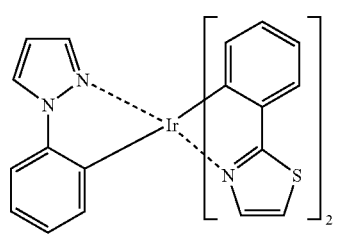
7-22 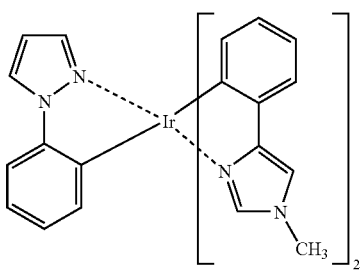
7-23 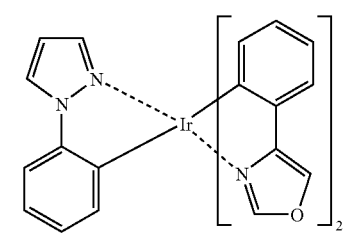
7-24 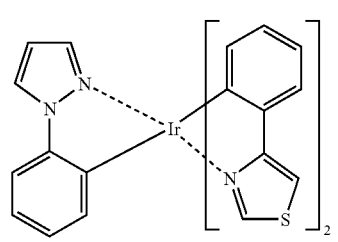
7-25 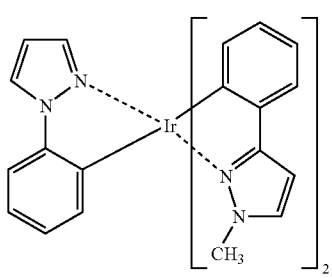
7-26 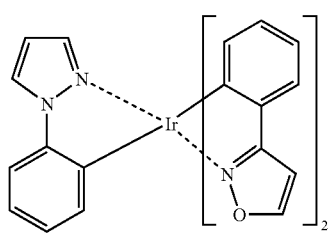
7-27 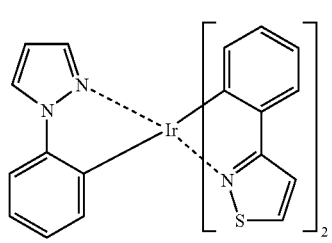
7-28 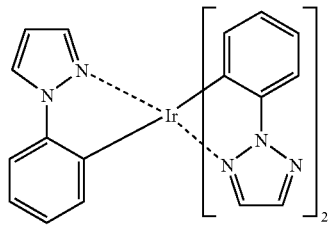
7-29 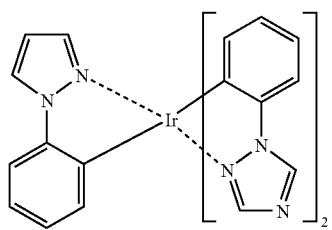
7-30 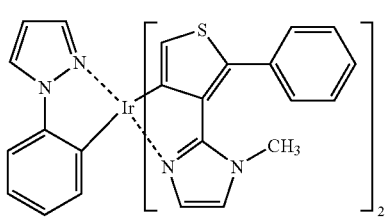

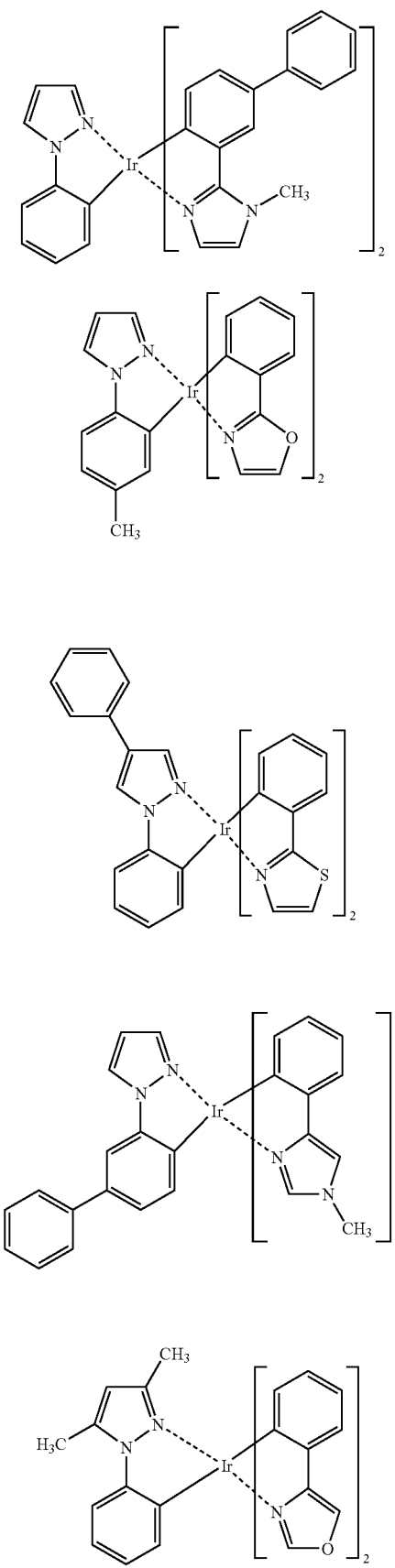
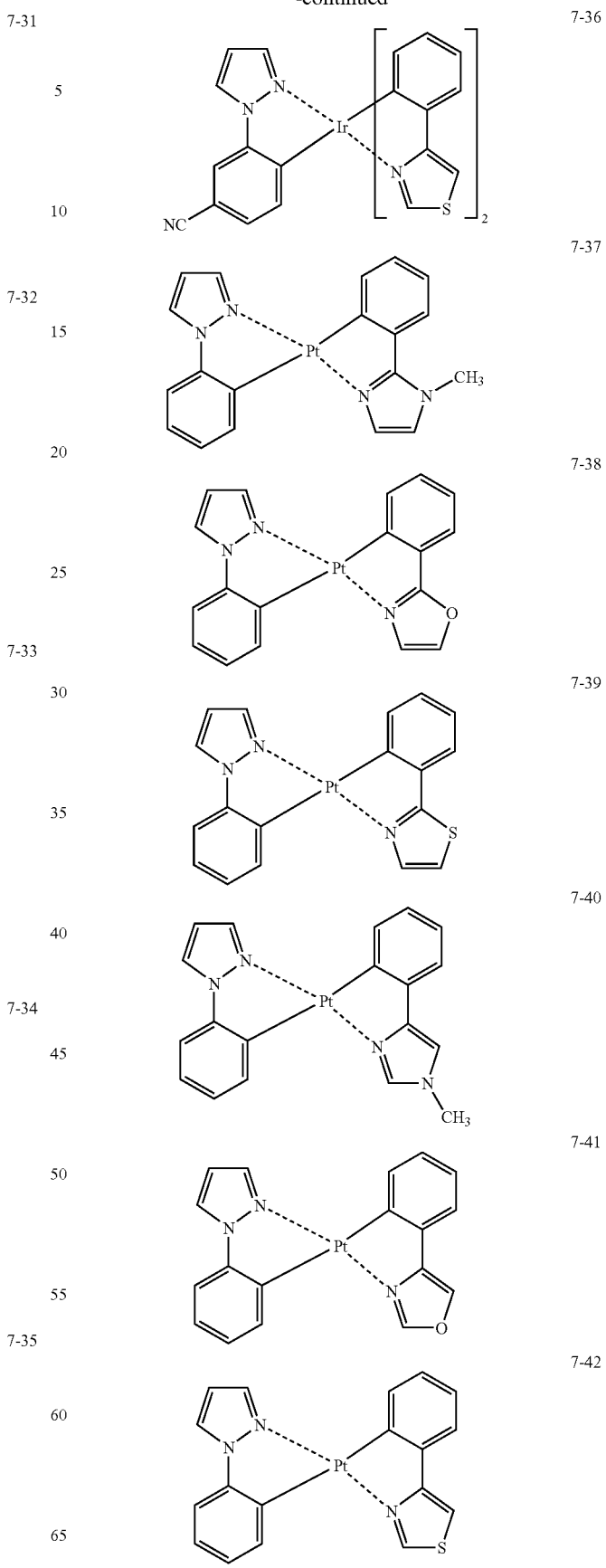

-continued
7-43
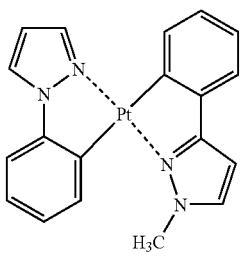
7-44
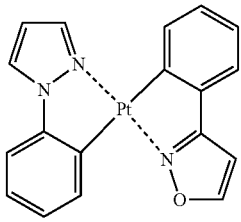
7-45
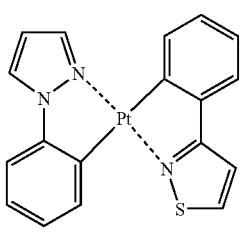
7-46
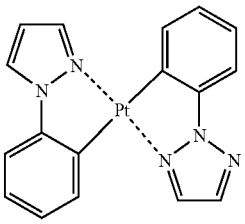
7-47
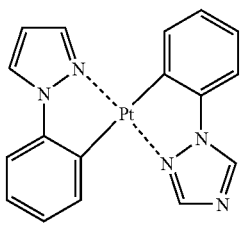
7-48
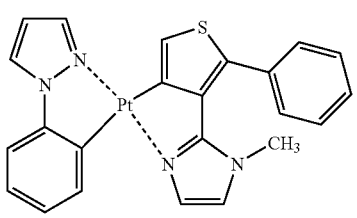
-continued
7-49
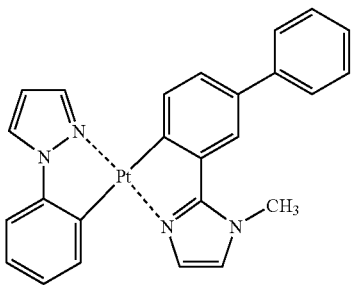
7-50
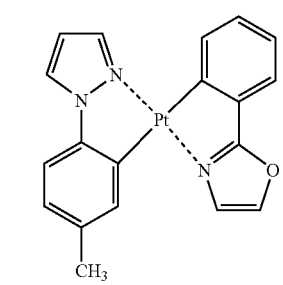
7-51
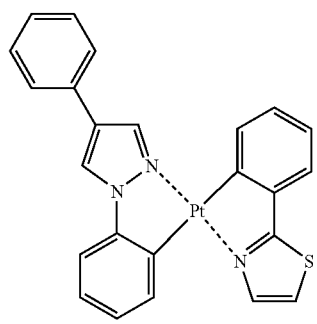
7-52
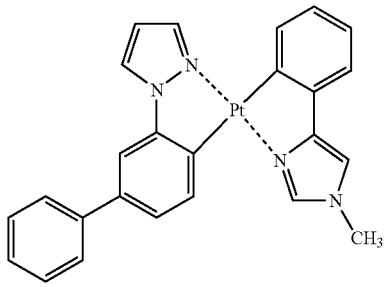
7-53
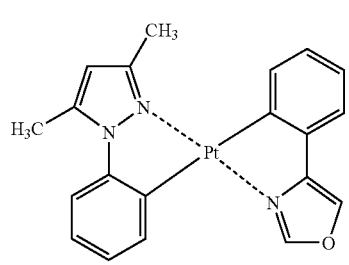

7-54

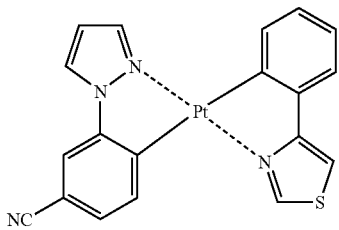

Metal complexes according to an organic EL element material of this invention can be synthesized by applying a method described in such as Organic Letter, vol. 3, No. 16, pp. 2579-2581 (2001), Inorganic Chemistry vol. 30, No. 8, pp. 1685-1687 (1991), J. Am. Chem. Soc., vol. 123, p, 4304 (2001), Inorganic Chemistry vol. 40, No. 7, pp. 1704-1711 (2001), Inorganic Chemistry vol. 41, No. 12, pp. 3055-3066 (2002), New Journal of Chemistry, vol. 26, p. 1171 (2002), European Journal of Organic Chemistry Vol. 4, pp. 695-709 (2004), and reference documents described in these documents.

<<Application of an Organic EL Element Material Incorporating a Metal Complex to an Organic EL Element>>

An emission layer is preferable for a layer incorporating the metal complex having a partial structure represented by Formulas (1)-(6) or having an interchangeable isomer thereof as a partial structure or the metal complex represented by Formula (7). Further, in cases in which the metal complex is incorporated in the emission layer, by use of the metal complex as an emission dopant, an increase in taking-out quantum efficiency (enhancement of luminance) as well as a prolonged emission life of the organic El element of the present invention can be realized.

(Emission Host and Emission Dopant)

An emission host and an emission dopant are preferably incorporated in an emission layer. It is preferable to adjust the mixture ratio of the emission dopant to the emission host, which is a host compound to be described later incorporated in the emission layer, to the range of 0.1% by weight-less than 30% by weight.

A phosphorescent dopant according to the present invention will now be described.

The phosphorescent dopant of the present invention is a compound wherein emission from an excited triplet state thereof is observed, specifically including a compound emitting phosphorescence at room temperature (25° C.), which is defined as a compound exhibiting a phosphorescence quantum efficiency of at least 0.01 at 25° C. However, the phosphorescence quantum efficiency is preferably at least 0.1.

The phosphorescence quantum efficiency may be determined, via a method described in page 398 of Bunko II of Dai 4 Han Jikken Kagaku Koza 7 (Spectroscopy II of 4th Edition Lecture of Experimental Chemistry 7) (published by Maruzen Co., Ltd.). Phosphorescence quantum efficiency in a solution may be determined using various solvents. However, it is only necessary for the phosphorescent dopant of the present invention to exhibit the above phosphorescence quantum efficiency (namely at least 0.01) in any appropriate solvent.

Two kinds of principles regarding emission of a phosphorescent dopant are cited. One is an energy transfer-type, wherein carriers recombine on a host compound on which the carriers are transferred to produce an excited state of the host compound and then via transfer of this energy to a phosphorescent dopant, emission from the phosphorescent dopant is realized. The other is a carrier trap-type, wherein a phosphorescent dopant serves as a carrier trap and then carriers recombine on the phosphorescent dopant to generate emission from the phosphorescent dopant. In each type, the excited state energy of the phosphorescent dopant is required to be lower than that of the host compound.

Further, "a fluorescence-emitting dopant" in the present invention is defined similarly to the phosphorescence-emitting dopant.

However, plural types of compounds may be utilized in combination as an emission dopant, and the partner to be mixed may be a metal complex having a different structure, and a phosphorescent dopant or a fluorescent dopant having other structures.

Here, a dopant (such as a phosphorescent dopant and a fluorescent dopant) which may be utilized together with a metal complex employed as an emission dopant will be described. An emission dopant is roughly classified into two types, that is, a fluorescent, dopant which emits fluorescence and a phosphorescent dopant which emits phosphorescence.

A typical example of the former (a fluorescent dopant) includes coumarin type dye, pyran type dye, cyanine type dye, croconium type dye, squarylium type dye, oxobenzanthracene type dye, fluorescein type dye, rhodamine type dye, pyrylium type dye, perylene type dye, stilbene type dye, polythiophene type dye or rare earth complex type fluorescent substances.

A typical example of the latter (a phosphorescent dopant) is preferably a complex type compound containing metal of the 8th-10th groups of the periodic table, more preferably an iridium compound and an osmium compound and most preferable among them is an iridium compound.

Specifically, listed are compounds described in the following patent publication:

Such as WO 00/70655, JP-A Nos. 2002-280178, 2001-181616, 2002-280179, 2001-181617, 2002-280180, 2001-247859, 2002-299060, 2001-313178, 2002-302671, 2001-345183 and 2002-324679, WO 02/15645, JP-A Nos. 2002-332291, 2002-50484, 2002-332292 and 2002-83684, Japanese Translation of PCT International Application Publication No. 2002-540572, JP-A NOS. 2002-117978, 2002-338588, 2002-170684 and 2002-352960, WO 01/93642 pamphlet, JP-A Nos. 2002-50483, 2002-100476, 2002-173674, 2002-359082, 2002-175884, 2002-363552, 2002-184582 and 2003-7469, Japanese Translation of PCT International Application Publication No. 2002-525808, JP-A 2003-7471, Japanese Translation of PCT International Application Publication No. 2002-525833, JP-A Nos. 2003-31366, 2002-226495, 2002-234894, 2002-235076, 2002-241751, 2001-319779, 2001-319780, 2002-62824, 2002-100474, 2002-203679, 2002-343572 and 2002-203678.

A part of examples thereof will be shown below.

Ir-1

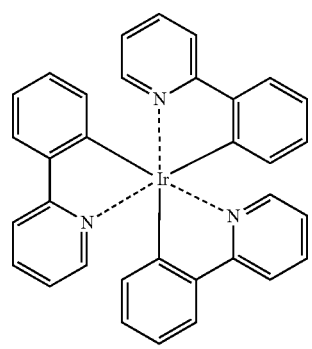

Ir-2
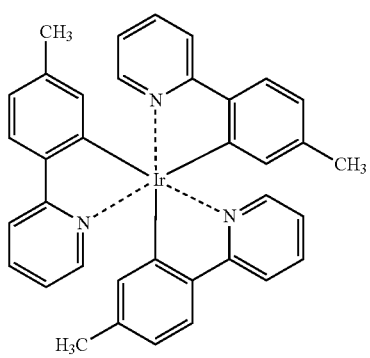
Ir-3
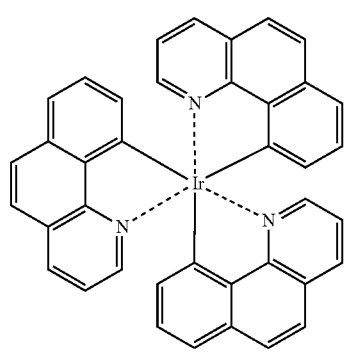
Ir-4
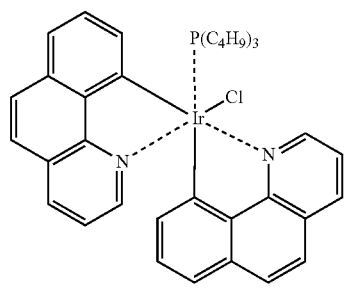
Ir-5
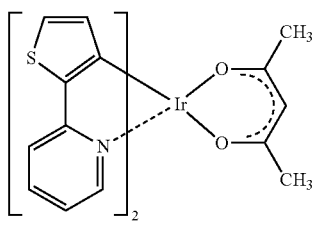
Ir-6
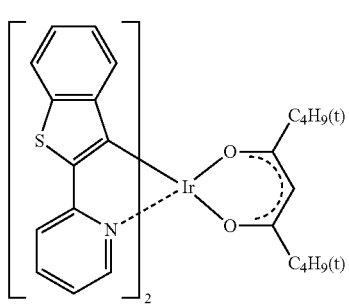
Ir-7
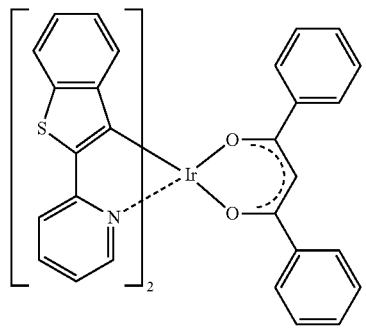
Ir-8
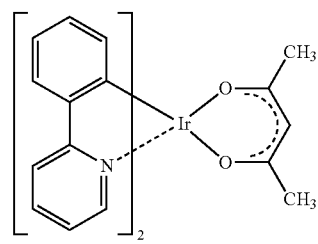
Ir-9
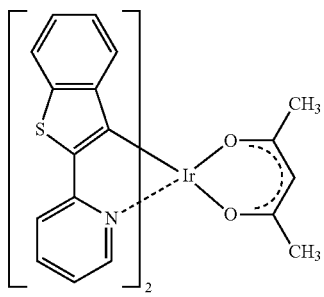
Ir-10
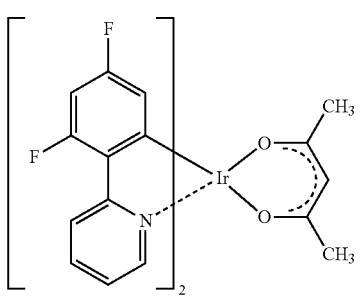
Ir-11
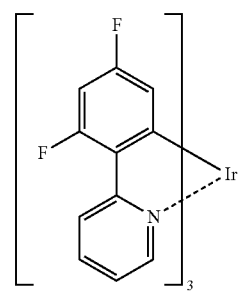

-continued

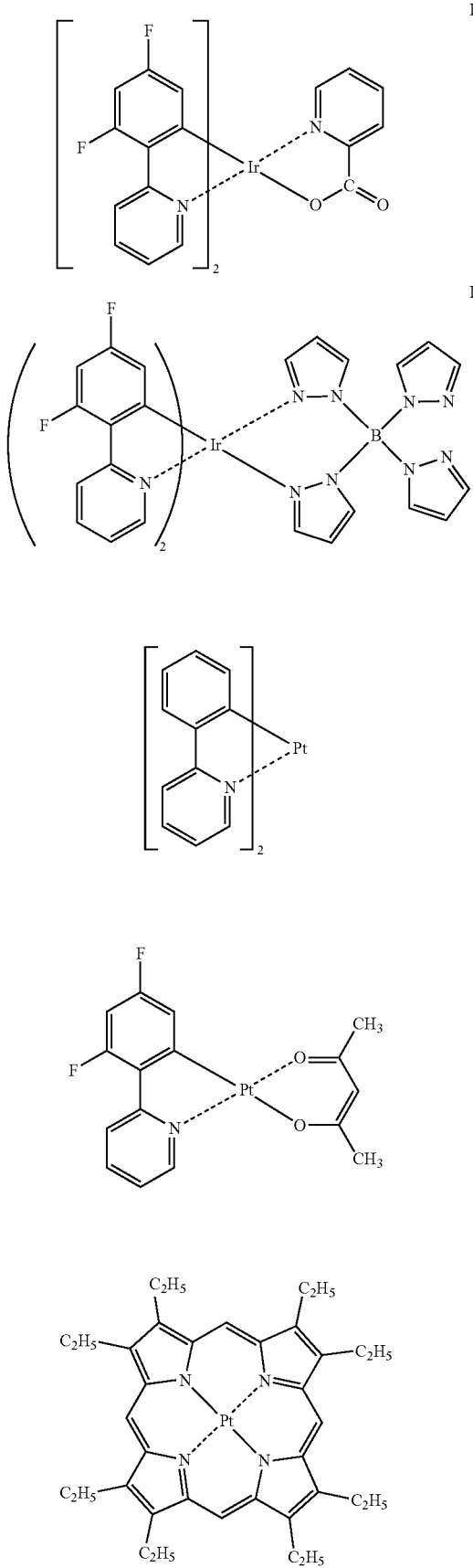

(Emission Host)

In the present invention, an emission host (also referred to simply as a host compound) is defined as a compound featuring a mass ratio of at least 20% in an emission layer based on all the compounds incorporated therein and exhibiting a phosphorescence quantum efficiency of less than 0.1 in terms of phosphorescence emission at room temperature (25° C.). The phosphorescence quantum efficiency is preferably less than 0.01. Further, of the compounds incorporated in the emission layer, a compound exhibiting a mass ratio of at least 20% therein is preferable.

The emission host used in the present invention is preferably a compound that exhibits a phosphorescence 0-0 band of a shorter wavelength than that of an emission dopant used in combination. When a compound containing a blue light-emitting component exhibiting a phosphorescence 0-0 band of at most 470 nm is used as an emission dopant, the emission host preferably exhibits a phosphorescence 0-0 band of at most 460 nm.

The phosphorescence 0-0 band (nm) of the metal complex of the present invention is determined as described below.

A compound to be measured is dissolved in a mixed solvent of well-deoxygenated ethanol/methanol (4/1 by volume) and placed in a cell for phosphorescence measurement, followed by irradiation of exciting light at a liquid nitrogen temperature of 77 K to measure an emission spectrum 100 ms after completion of the irradiation of exciting light. It is conceivable that since phosphorescence features a longer emission life than fluorescence, most of the light remaining after the 100 ms have elapsed is phosphorescence. Incidentally, a compound exhibiting a phosphorescence life of shorter than 100 ms may be measured by shortening a delay time. However, in cases when shortening the delay time to the extent that the shortened delay time is not distinguished from the life of fluorescence, a problem occurs in that phosphorescence and fluorescence each are indistinguishable, and therefore, it is necessary to select an appropriate delay time capable of distinguishing therebetween.

For a compound insoluble in the solvent system described above, any appropriate solvent, which can dissolve the compound, may be employed (it is not substantially problematic since a solvent effect on the phosphorescence wavelength in the above measurement method is negligible.). From a spectrum chart obtained, the maximum emission wavelength in the shortest wavelength portion is read.

An emission host (an emission compound) used in the present invention is not specifically limited in terms of the structure, typically including a carbazole derivative, a triarylamine derivative, an aromatic borane derivative, a nitrogen-containing heterocyclic derivative, a thiophene derivative, a furan derivative, a compound having a basic skeleton such as an oligoallylene compound, or a derivative having a ring structure wherein at least one of the carbon atoms of a hydrocarbon ring constituting a carboline derivative or a carboline ring of the carboline derivative is substituted with a nitrogen atom.

Of these, it is preferable to use a carbazole derivative or a derivative having a ring structure wherein at least one of the carbon atoms of a hydrocarbon ring constituting a carboline derivative or a carboline ring of the carboline derivative is substituted with a nitrogen atom.

Further, as the host compound, any appropriate host compound may be used individually or in combination. Using a plurality of host compounds at the same time makes it possible to adjust charge transfer and to enhance efficiency of an organic EL element. Still further, using a plurality of emission dopants to be described later makes it possible to mix different emission light components, resulting in any given emission color.

Specific examples thereof will now be listed that by no means limit the scope of the present invention.

| Compound | Central structure | A |
|---|---|---|
| 1 | | |
| 2 | | |
| 3 | | |
| 4 | | |
| 5 | | |
| 6 | | |
| 7 | | |

-continued

| Compound | Central structure | A |
|---|---|---|
| 8 | A—⟨phenyl⟩—⟨phenyl⟩—A | (N-methyl dipyrido-pyrrole) |
| 9 | 2,2'-dimethylbiphenyl with A at 4,4' | (N-methyl dipyrido-pyrrole isomer) |
| 10 | 2,2'-dimethylbiphenyl with A at 4,4' | (N-methyl dipyrido-pyrrole isomer) |
| 11 | 2,2'-bis(trifluoromethyl)biphenyl with A at 4,4' | (N-methyl dipyrido-pyrrole isomer) |
| 12 | 2,2'-diphenyl biphenyl with A at 4,4' | 3,6-dimethyl N-methyl dipyrido-pyrrole |
| 13 | 2,2',6,6'-tetramethylbiphenyl with A at 4,4' | (N-methyl dipyrido-pyrrole isomer) |
| 14 | 3,3',5,5'-tetrakis-A biphenyl | (N-methyl dipyrido-pyrrole isomer) |
| 15 | octafluorobiphenyl with A at 4,4' | (N-methyl dipyrido-pyrrole isomer) |

-continued

| Compound | Central structure | A |
|---|---|---|
| 16 | | |
| 17 | | |
| 18 | | |
| 19 | | |
| 20 | | |
| 21 | | |

-continued
| Compound | Central structure | A |
|---|---|---|
| 22 | 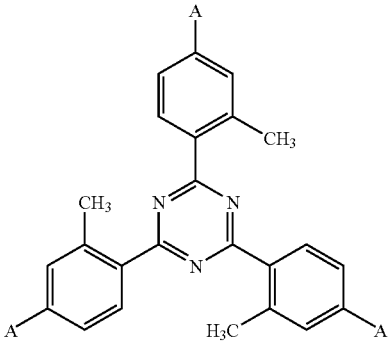 | 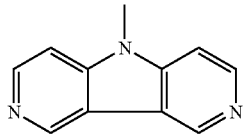 |
| 23 | 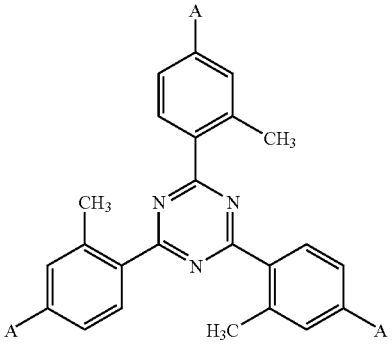 | 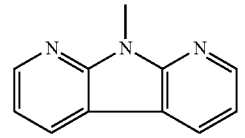 |
| 24 |  | 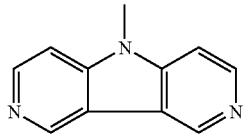 |
| 25 |  | 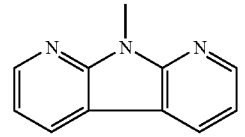 |
| 26 | 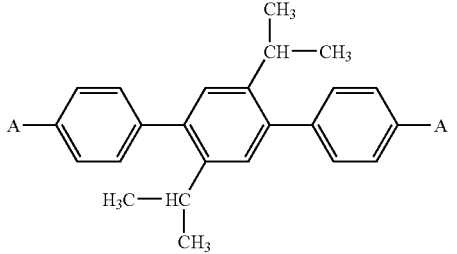 | 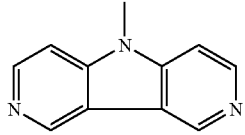 |
| 27 | 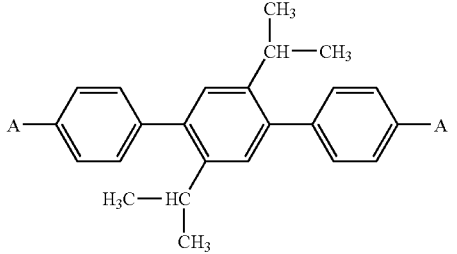 | 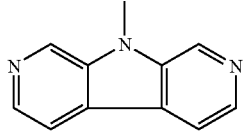 |

-continued

| Compound | Central structure | A |
|---|---|---|
| 28 | | |
| 29 | | |
| 30 | | |
| 31 | | |
| 32 | | |
| 33 | | |
| 34 | | |

-continued

| Compound | Central structure | A |
|---|---|---|
| 35 | | |
| 36 | | |
| 37 | | |
| 38 | | |

-continued

| Compound | Central structure | A |
|---|---|---|
| 39 | | |
| 40 | | |
| 41 | | |
| 42 | | |
| 43 | | |

-continued

| Compound | Central structure | A |
|---|---|---|
| 44 | | |
| 45 | | |
| 46 | | |
| 47 | | |
| 48 | | |
| 49 | | |
| 50 | | |

-continued

| Compound | Central structure | A |
|---|---|---|
| 51 | | |
| 52 | | |
| 53 | | |
| 54 | | |
| 55 | | |
| 56 | | |
| 57 | | |
| 58 | | |
| 59 | | |

-continued

| Compound | Central structure | A |
|---|---|---|
| 60 | | |
| 61 | | |
| 62 | | |
| 63 | | |
| 64 | | |
| 65 | | |

-continued
| Compound | Central structure | A |
|---|---|---|
| 66 | 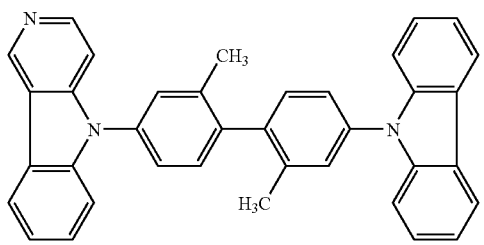 [SMILES: Cc1cc(-n2c3ccccc3c3ccccc32)ccc1-c1ccc(-n2c3ccccc3c3cnccc32)cc1C] | |
| 67 | 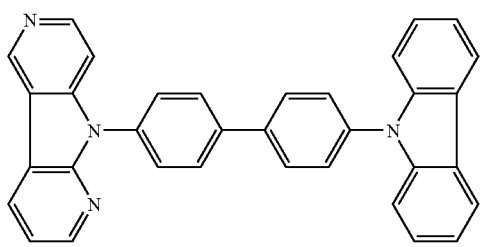 [SMILES: c1ccc2c(c1)c1ccccc1n2-c1ccc(-c2ccc(-n3c4ccncc4c4cccnc43)cc2)cc1] | |
| 68 | 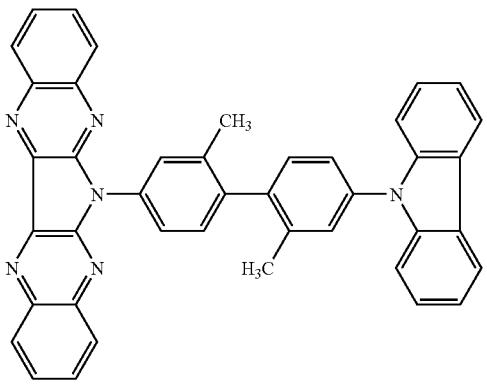 [SMILES: Cc1cc(-n2c3ccccc3c3ccccc32)ccc1-c1ccc(-n2c3nc4ccccc4nc3c3nc4ccccc4nc32)cc1C] | |
| 69 | 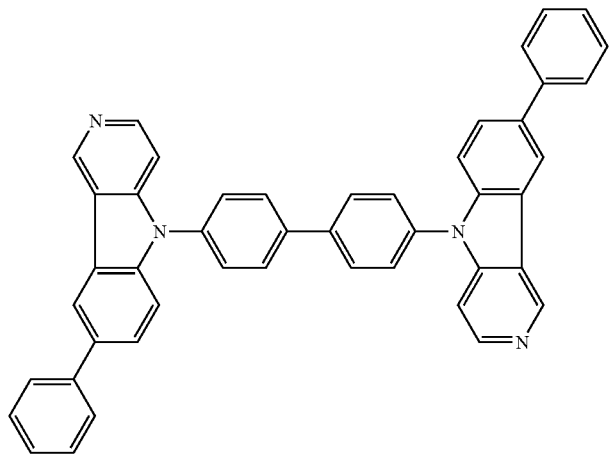 [SMILES: c1ccc(-c2ccc3c(c2)c2cnccc2n3-c2ccc(-c3ccc(-n4c5ccncc5c5cc(-c6ccccc6)ccc54)cc3)cc2)cc1] | |

-continued

| Compound | Central structure | A |
|---|---|---|
| 70 | | |
| 71 | | |
| 72 | | |
| 73 | | |

-continued
| Compound | Central structure | A |
|---|---|---|
| 74 | 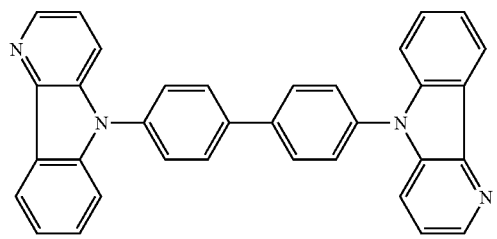 [SMILES: c1ccc2c(c1)c1ncccc1n2-c1ccc(-c2ccc(-n3c4ccccc4c4ncccc43)cc2)cc1] | |
| 75 | 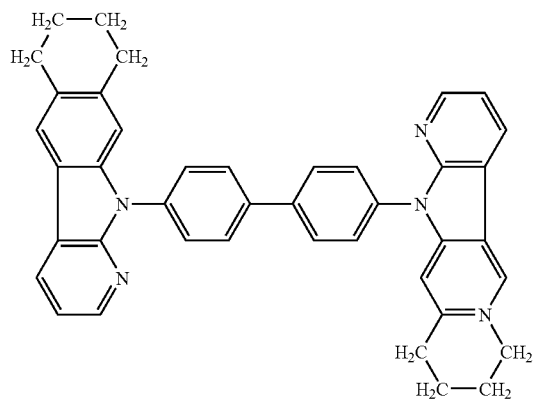 | |
| 76 | 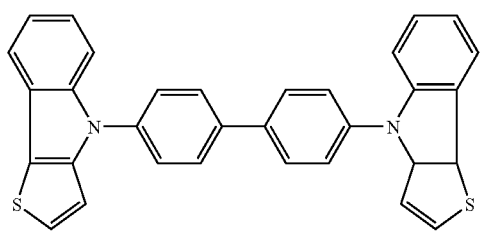 [SMILES: C1=CC2C(S1)c1ccccc1N2c1ccc(-c2ccc(-n3c4ccccc4c4sccc43)cc2)cc1] | |
| 77 | 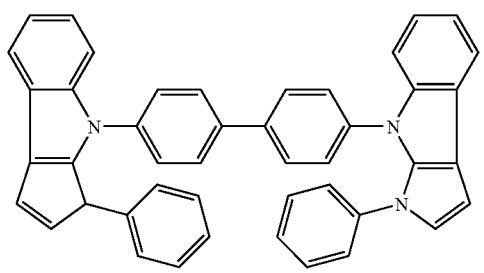 [SMILES: C1=CC(c2ccccc2)c2c1c1ccccc1n2-c1ccc(-c2ccc(-n3c4ccccc4c4ccn(-c5ccccc5)c43)cc2)cc1] | |
| 78 | 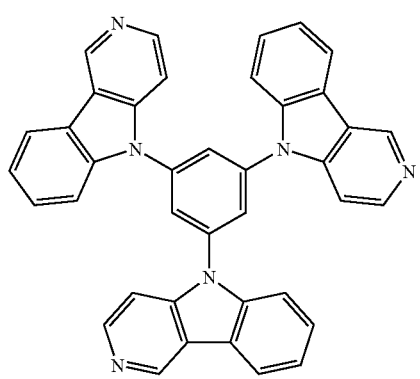 [SMILES: c1ccc2c(c1)c1cnccc1n2-c1cc(-n2c3ccccc3c3cnccc32)cc(-n2c3ccccc3c3cnccc32)c1] | |

| Compound | Central structure | A |
|---|---|---|
| 79 | 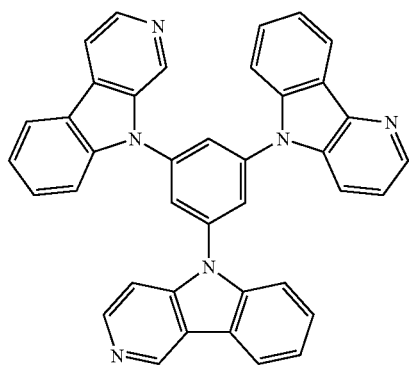 [SMILES: c1ccc2c(c1)c1cnccc1n2-c1cc(-n2c3ccccc3c3ccncc32)cc(-n2c3ccccc3c3ncccc32)c1] | |
| 80 | 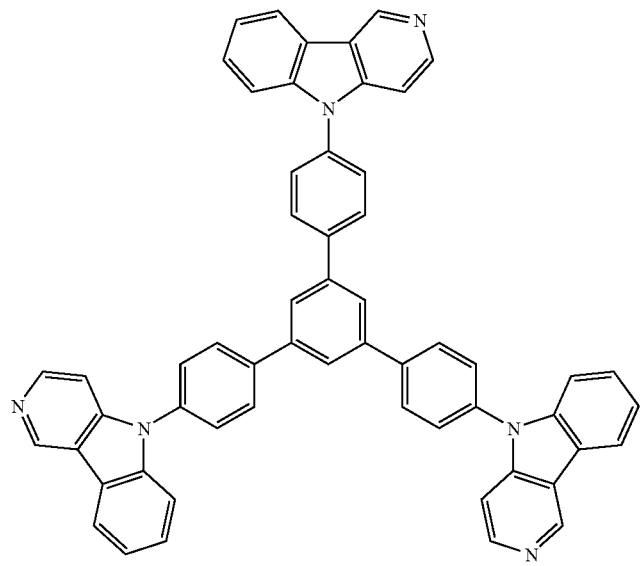 [SMILES: c1ccc2c(c1)c1cnccc1n2-c1ccc(-c2cc(-c3ccc(-n4c5ccccc5c5cnccc54)cc3)cc(-c3ccc(-n4c5ccccc5c5cnccc54)cc3)c2)cc1] | |
| 81 | 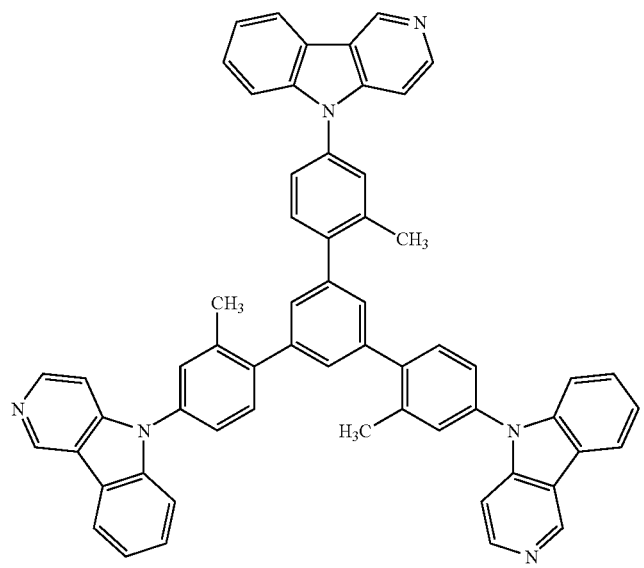 [SMILES: Cc1cc(-n2c3ccccc3c3cnccc32)ccc1-c1cc(-c2ccc(-n3c4ccccc4c4cnccc43)cc2C)cc(-c2ccc(-n3c4ccccc4c4cnccc43)cc2C)c1] | |

-continued

| Compound | Central structure | A |
|---|---|---|
| 82 | | |
| 83 | | |
| 84 | | |

-continued

| Compound | Central structure | A |
|---|---|---|
| 85 | | |
| 86 | | |
| 87 | | |

-continued
| Compound | Central structure | A |
|---|---|---|
| 88 | 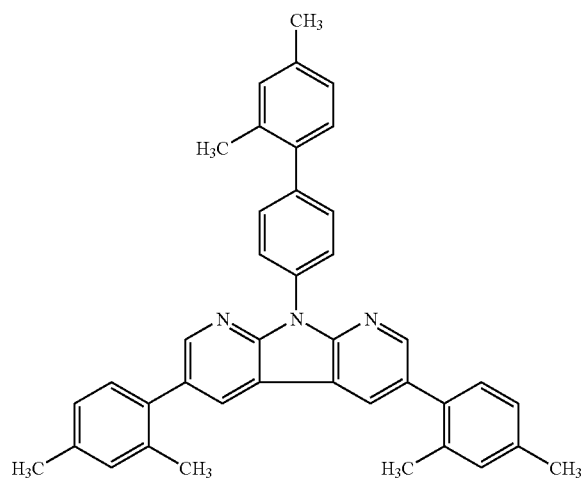 | |
| 89 | 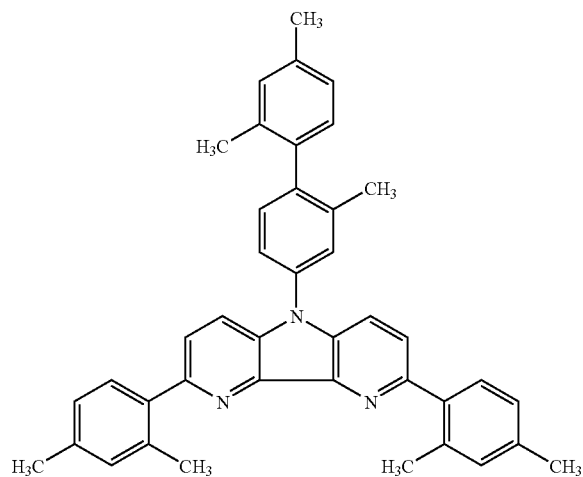 | |
| 90 | 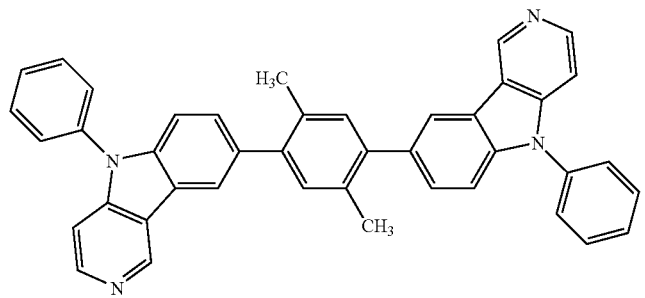 [SMILES: Cc1cc(-c2ccc3c(c2)c2cnccc2n3-c2ccccc2)c(C)cc1-c1ccc2c(c1)c1cnccc1n2-c1ccccc1] | |

-continued

| Compound | Central structure | A |
|---|---|---|
| 91 | | |
| 92 | | |
| 93 | | |
| 94 | | |

-continued

| Compound | Central structure | A |
|---|---|---|
| 95 | | |
| 96 | | |
| 97 | | |
| 98 | | |
| 99 | | |

-continued
| Compound | Central structure | A |
|---|---|---|
| 100 | | 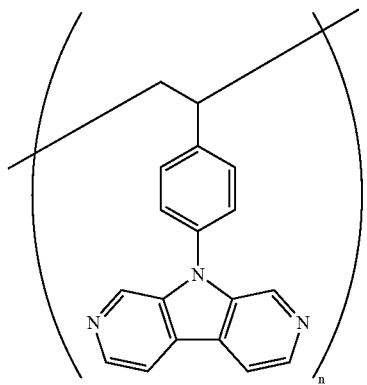 |
| 101 | | 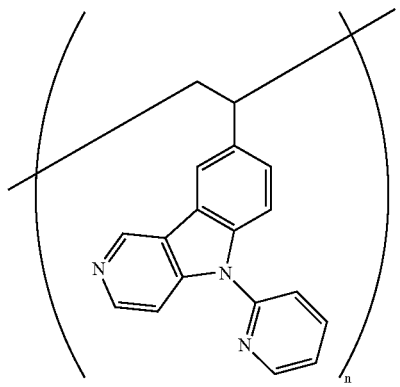 |
| 102 | | 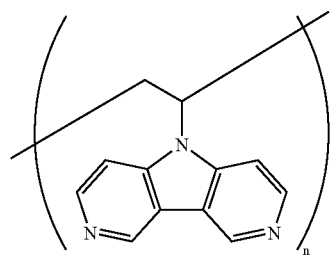 |
| 103 | | 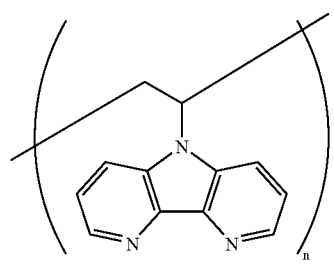 |

-continued
| Compound | Central structure | A |
|---|---|---|
| 104 | 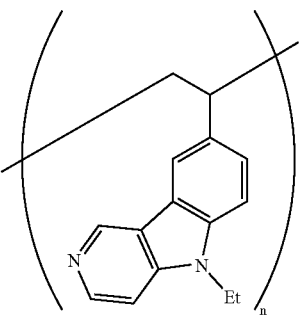 | |
| 105 | 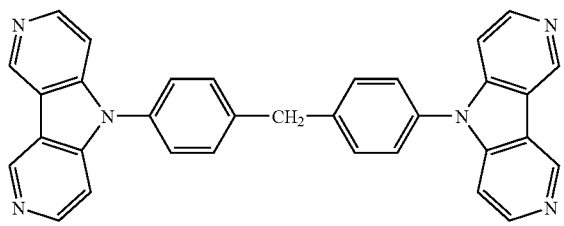 | |
| 106 | 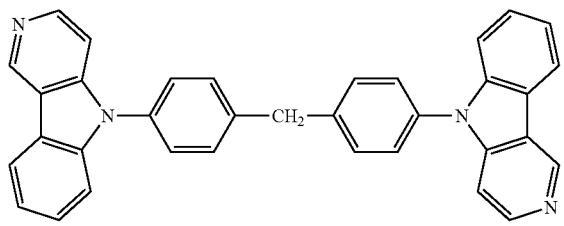 [SMILES: c1ccc2c(c1)c1cnccc1n2-c1ccc(Cc2ccc(-n3c4ccccc4c4cnccc43)cc2)cc1] | |
| 107 | 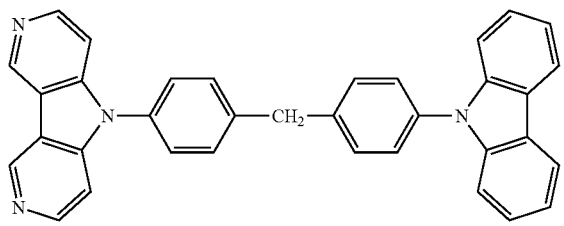 [SMILES: c1ccc2c(c1)c1ccccc1n2-c1ccc(Cc2ccc(-n3c4ccncc4c4cnccc43)cc2)cc1] | |
| 108 | 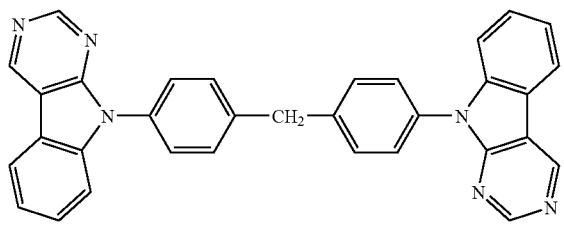 [SMILES: c1ccc2c(c1)c1cncnc1n2-c1ccc(Cc2ccc(-n3c4ccccc4c4cncnc43)cc2)cc1] | |
| 109 | 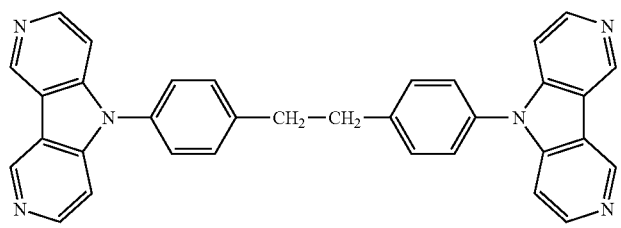 [SMILES: c1cc2c(cn1)c1cnccc1n2-c1ccc(CCc2ccc(-n3c4ccncc4c4cnccc43)cc2)cc1] | |

-continued
| Compound | Central structure | A |
|---|---|---|
| 110 | 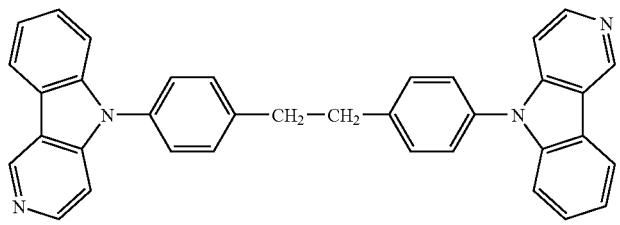 [SMILES: c1ccc2c(c1)c1cnccc1n2-c1ccc(CCc2ccc(-n3c4ccccc4c4cnccc43)cc2)cc1] | |
| 111 | 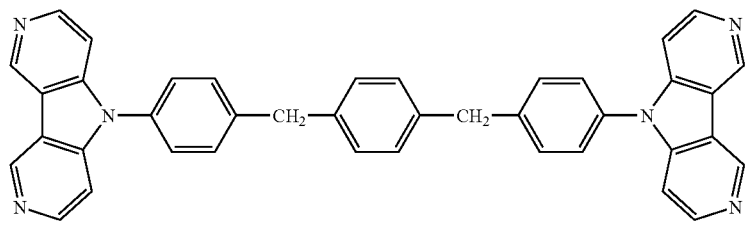 | |
| 112 | 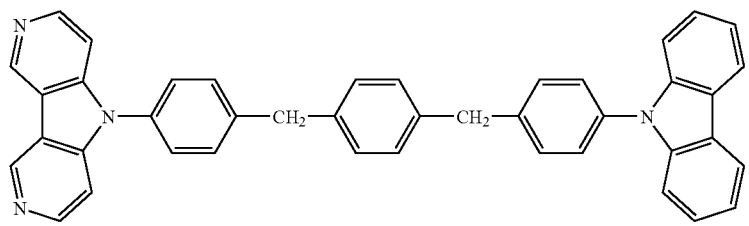 [SMILES: c1ccc2c(c1)c1cnccc1n2-c1ccc(Cc2ccc(Cc3ccc(-n4c5ccccc5c5cnccc54)cc3)cc2)cc1] | |
| 113 | 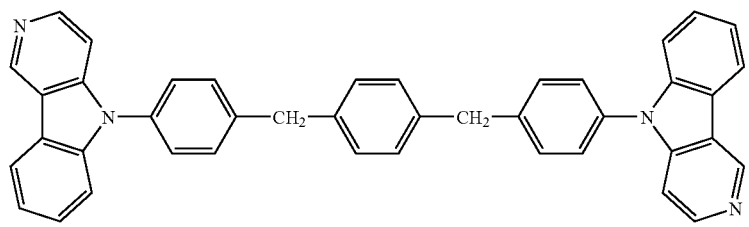 | |
| 114 | 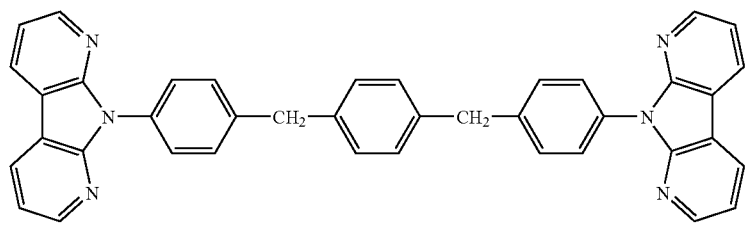 | |
| 115 | 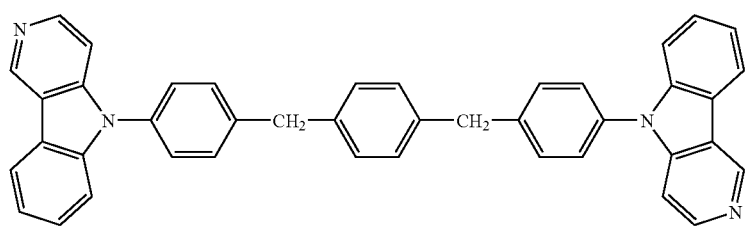 [SMILES: c1ccc2c(c1)c1cnccc1n2-c1ccc(Cc2ccc(Cc3ccc(-n4c5ccccc5c5cnccc54)cc3)cc2)cc1] | |

| Compound | Central structure | A |
|---|---|---|
| 116 | 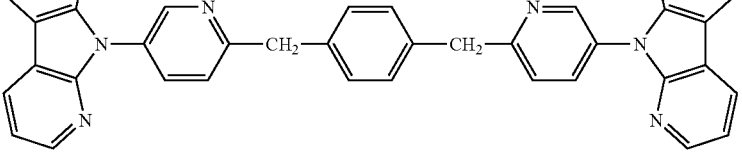 | |
| 117 | 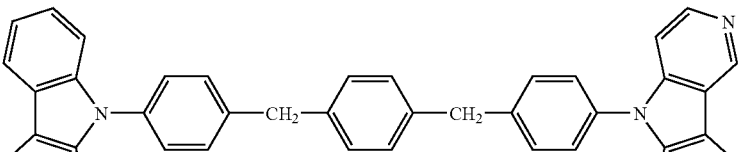 | |
| 118 |  | |
| 119 | 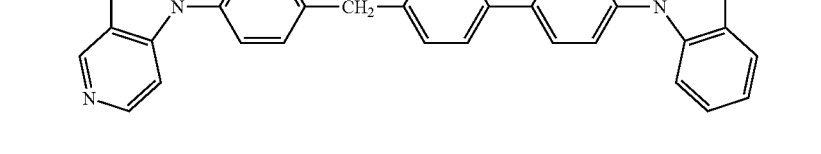 | |
| 120 | 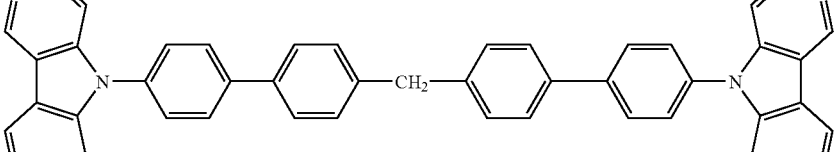 | |
| 121 | 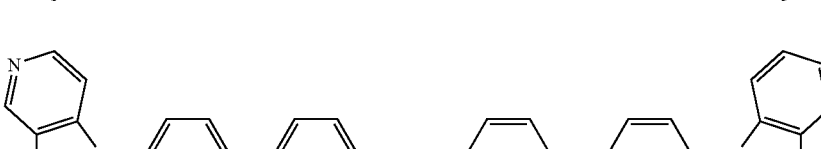 | |

-continued

| Compound | Central structure | A |
|---|---|---|
| 122 | | |
| 123 | | |
| 124 | | |
| 125 | | |
| 126 | | |
| 127 | | |

-continued

| Compound | Central structure | A |
|---|---|---|
| 128 | | |
| 129 | | |
| 130 | | |
| 131 | | |
| 132 | | |
| 133 | | |

-continued
| Compound | Central structure | A |
|---|---|---|
| 134 | 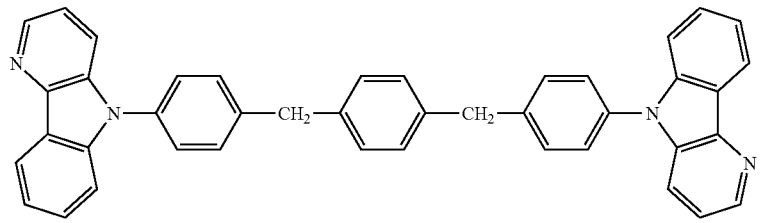 | |
| 135 | 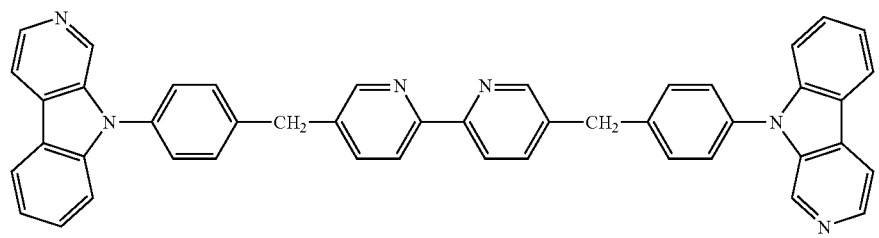 [SMILES: c1ccc2c(c1)c1ccncc1n2-c1ccc(Cc2ccc(-c3ccc(Cc4ccc(-n5c6ccccc6c6ccncc65)cc4)cc3)cc2)cc1] | |
| 136 | 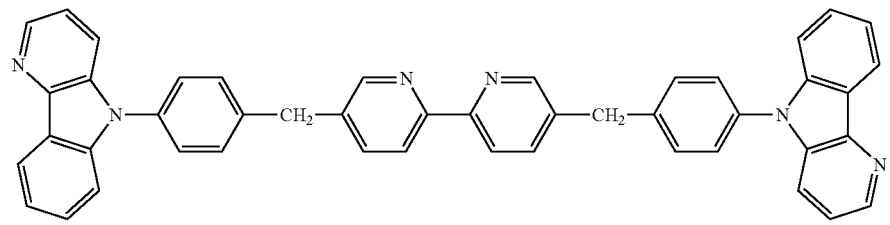 [SMILES: c1ccc2c(c1)c1ncccc1n2-c1ccc(Cc2ccc(-c3ccc(Cc4ccc(-n5c6ccccc6c6ncccc65)cc4)cc3)cc2)cc1] | |
| 137 | 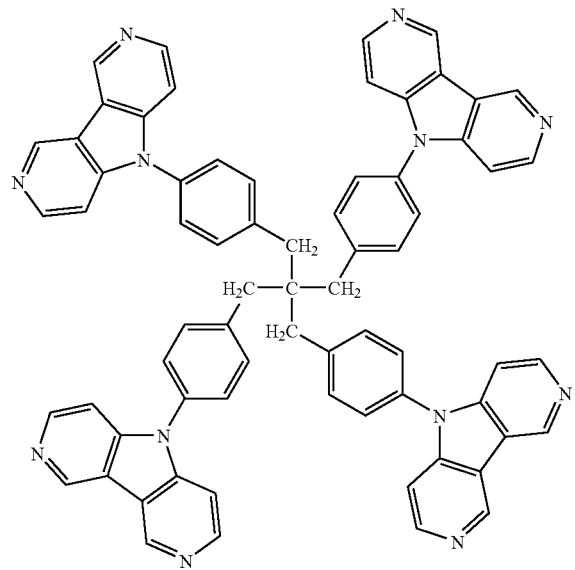 | |

-continued
| Compound | Central structure | A |
|---|---|---|
| 138 | 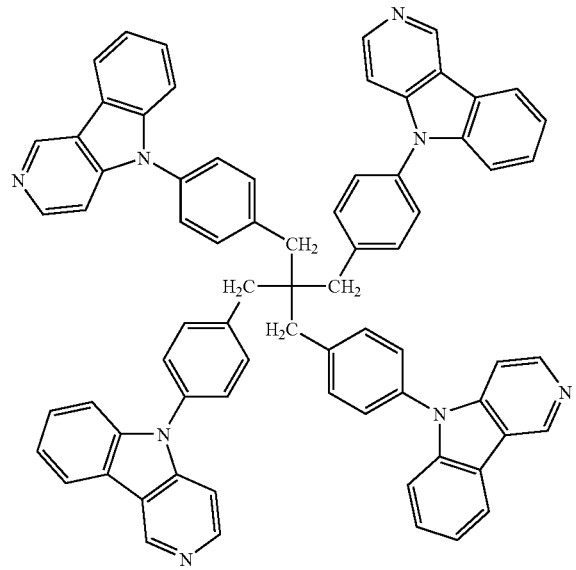 [SMILES: c1ccc2c(c1)c1cnccc1n2-c1ccc(CC(Cc2ccc(-n3c4ccccc4c4cnccc43)cc2)(Cc2ccc(-n3c4ccccc4c4cnccc43)cc2)Cc2ccc(-n3c4ccccc4c4cnccc43)cc2)cc1] | |
| 139 | 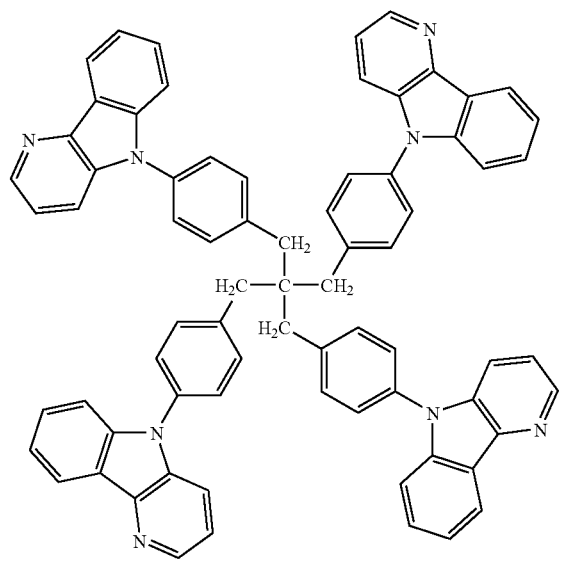 [SMILES: c1ccc2c(c1)c1ncccc1n2-c1ccc(CC(Cc2ccc(-n3c4ccccc4c4ncccc43)cc2)(Cc2ccc(-n3c4ccccc4c4ncccc43)cc2)Cc2ccc(-n3c4ccccc4c4ncccc43)cc2)cc1] | |

-continued

| Compound | Central structure | A |
|---|---|---|
| 140 | | |
| 141 | | |

-continued
| Compound | Central structure | A |
|---|---|---|
| 142 | 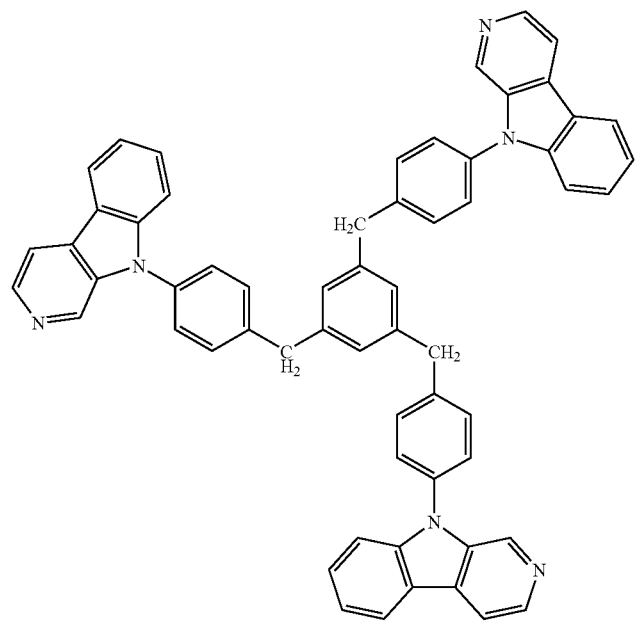 [SMILES: c1ccc2c(c1)c1ccncc1n2-c1ccc(Cc2cc(Cc3ccc(-n4c5ccccc5c5ccncc54)cc3)cc(Cc3ccc(-n4c5ccccc5c5ccncc54)cc3)c2)cc1] | |
| 143 | 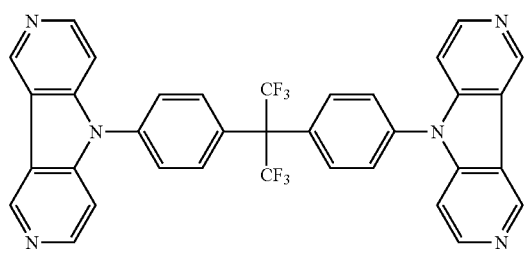 [SMILES: FC(F)(F)C(c1ccc(-n2c3ccncc3c3cnccc32)cc1)(c1ccc(-n2c3ccncc3c3cnccc32)cc1)C(F)(F)F] | |
| 144 | 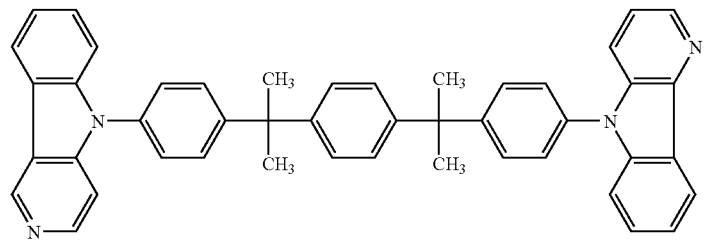 [SMILES: CC(C)(c1ccc(-n2c3ccccc3c3cnccc32)cc1)c1ccc(C(C)(C)c2ccc(-n3c4ccccc4c4ncccc43)cc2)cc1] | |
| 145 | 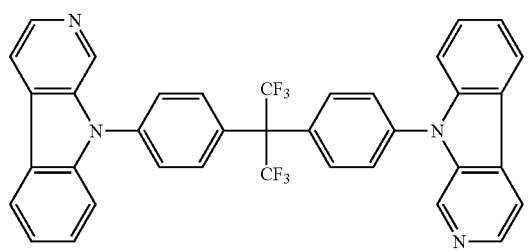 [SMILES: FC(F)(F)C(c1ccc(-n2c3ccccc3c3ccncc32)cc1)(c1ccc(-n2c3ccccc3c3ccncc32)cc1)C(F)(F)F] | |

| Compound | Central structure | A |
|---|---|---|
| 146 | 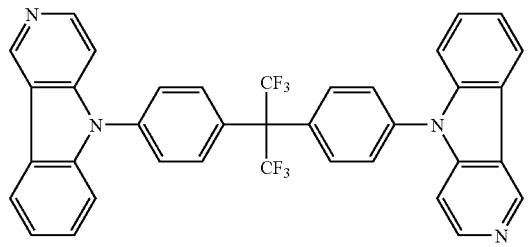 [SMILES: FC(F)(F)C(c1ccc(-n2c3ccccc3c3cnccc32)cc1)(c1ccc(-n2c3ccccc3c3cnccc32)cc1)C(F)(F)F] | |
| 147 | 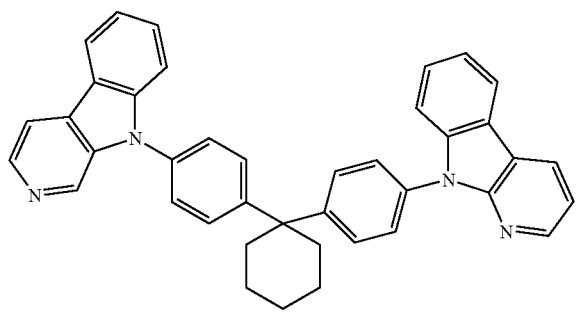 [SMILES: c1ccc2c(c1)c1ccncc1n2-c1ccc(C2(c3ccc(-n4c5ccccc5c5cccnc54)cc3)CCCCC2)cc1] | |
| 148 | 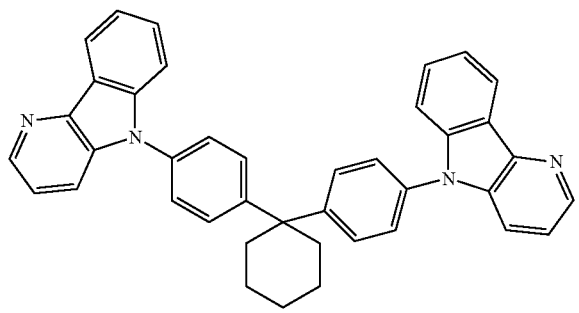 [SMILES: c1ccc2c(c1)c1ncccc1n2-c1ccc(C2(c3ccc(-n4c5ccccc5c5ncccc54)cc3)CCCCC2)cc1] | |
| 149 | 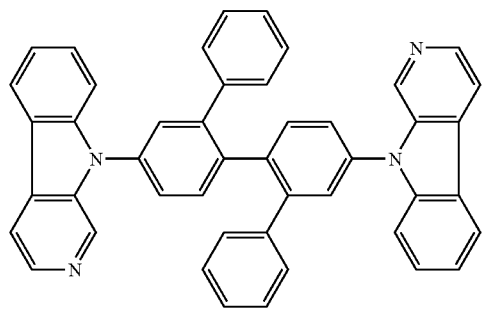 [SMILES: c1ccc(-c2cc(-n3c4ccccc4c4ccncc43)ccc2-c2ccc(-n3c4ccccc4c4ccncc43)cc2-c2ccccc2)cc1] | |
| 150 | 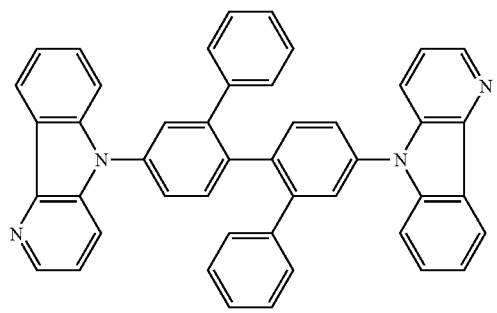 [SMILES: c1ccc(-c2cc(-n3c4ccccc4c4ncccc43)ccc2-c2ccc(-n3c4ccccc4c4ncccc43)cc2-c2ccccc2)cc1] | |

-continued
| Compound | Central structure | A |
|---|---|---|
| 151 | 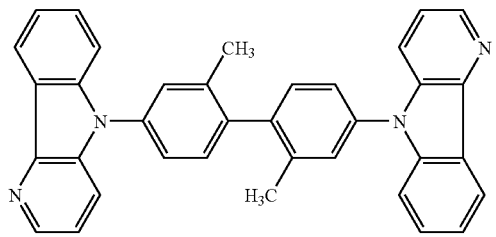 [SMILES: Cc1cc(-n2c3ccccc3c3ncccc32)ccc1-c1ccc(-n2c3ccccc3c3ncccc32)cc1C] | |
| 152 | 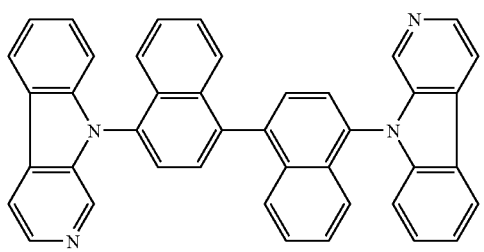 [SMILES: c1ccc2c(-n3c4ccccc4c4ccncc43)ccc(-c3ccc(-n4c5ccccc5c5ccncc54)c4ccccc34)c2c1] | |
| 153 | 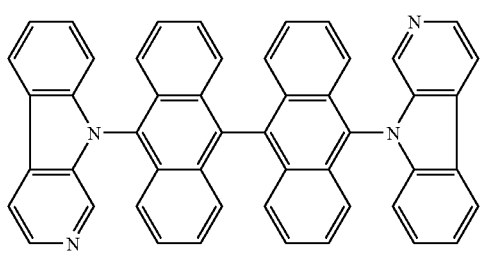 [SMILES: c1ccc2c(-n3c4ccccc4c4ccncc43)c3ccccc3c(-c3c4ccccc4c(-n4c5ccccc5c5ccncc54)c4ccccc34)c2c1] | |
| 154 | 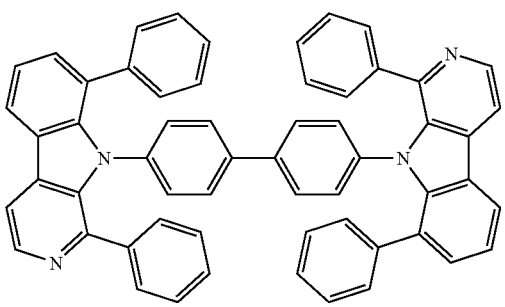 [SMILES: c1ccc(-c2cccc3c4ccnc(-c5ccccc5)c4n(-c4ccc(-c5ccc(-n6c7c(-c8ccccc8)cccc7c7ccnc(-c8ccccc8)c76)cc5)cc4)c23)cc1] | |
| 155 | 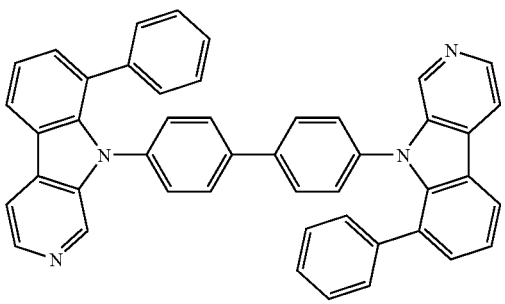 [SMILES: c1ccc(-c2cccc3c4ccncc4n(-c4ccc(-c5ccc(-n6c7cnccc7c7cccc(-c8ccccc8)c76)cc5)cc4)c23)cc1] | |

-continued

| Compound | Central structure | A |
|---|---|---|
| 156 | | |
| 157 | | |
| 158 | | |
| 159 | | |
| 160 | | |

| Compound | Central structure | A |
|---|---|---|
| 161 | 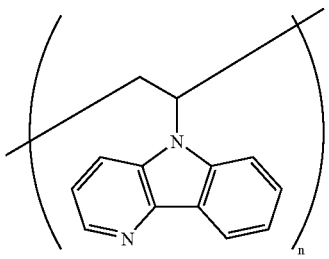 | |
| 162 | 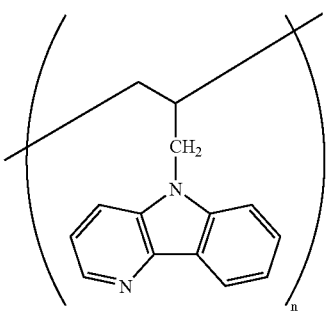 | |
| 163 | 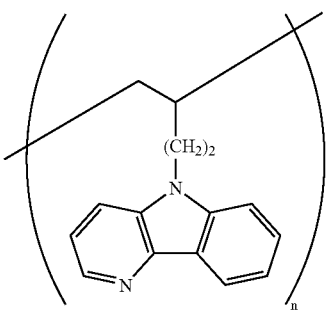 | |
| 164 | 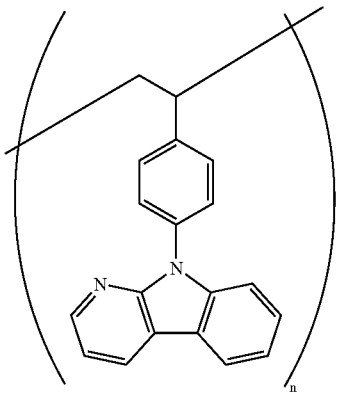 | |

| Compound | Central structure | A |
|---|---|---|
| 165 | 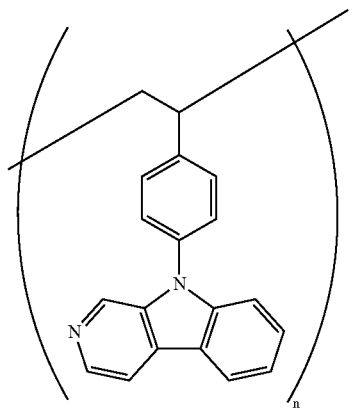 | |
| 166 | 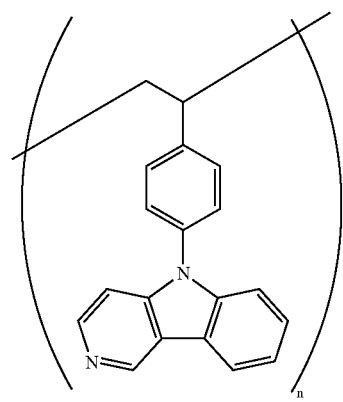 | |
| 167 | 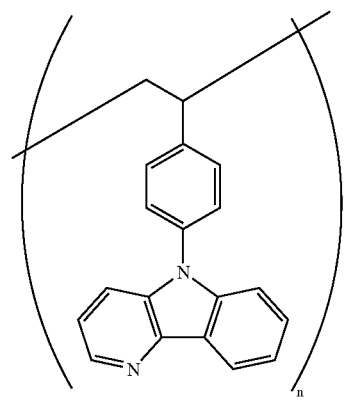 | |

| Compound | Central structure | A |
|---|---|---|
| 168 | 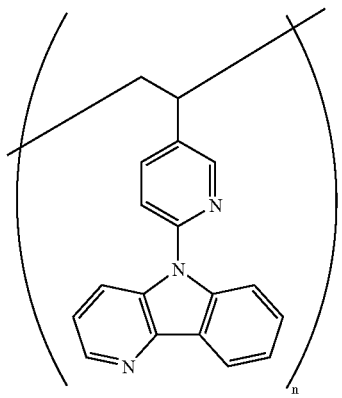 | |
| 169 | 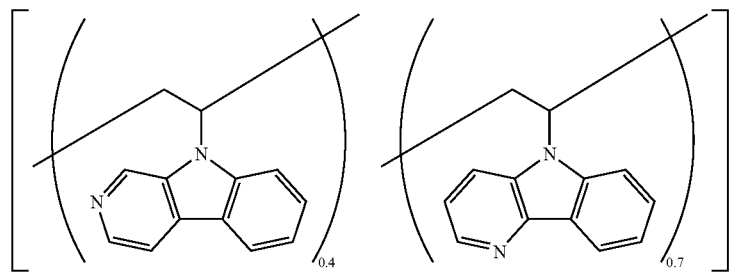 | |
| 170 | 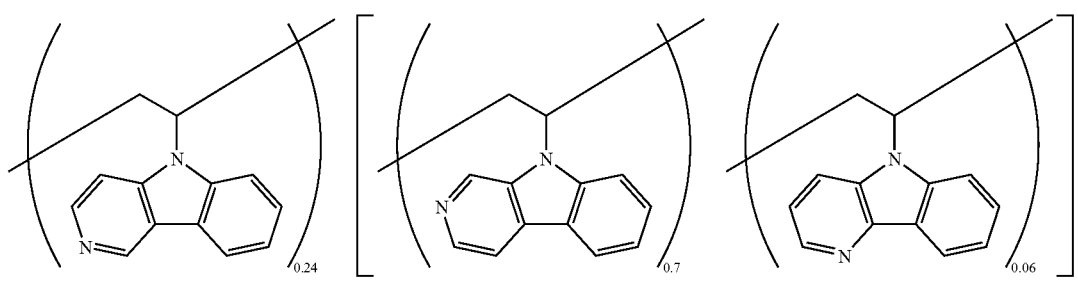 | |
| 171 | 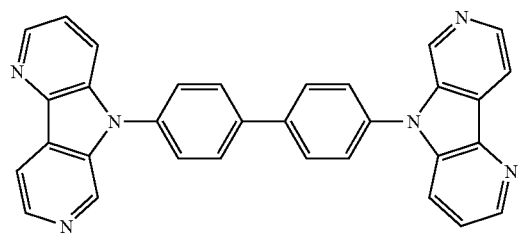 [SMILES: c1cnc2c3ccncc3n(-c3ccc(-c4ccc(-n5c6cnccc6c6ncccc65)cc4)cc3)c2c1] | |
| 172 | 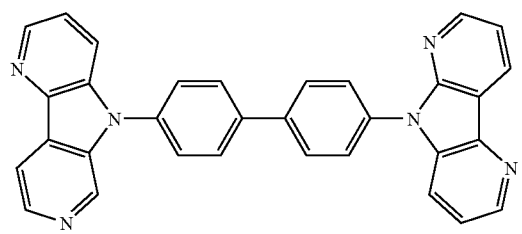 [SMILES: c1cnc2c(c1)c1ncccc1n2-c1ccc(-c2ccc(-n3c4cnccc4c4ncccc43)cc2)cc1] | |

| Compound | Central structure | A |
|---|---|---|
| 173 | 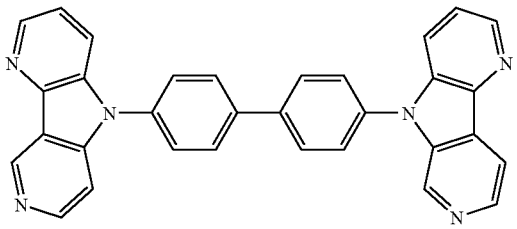 [SMILES: c1cnc2c3cnccc3n(-c3ccc(-c4ccc(-n5c6cnccc6c6ncccc65)cc4)cc3)c2c1] | |
| 174 | 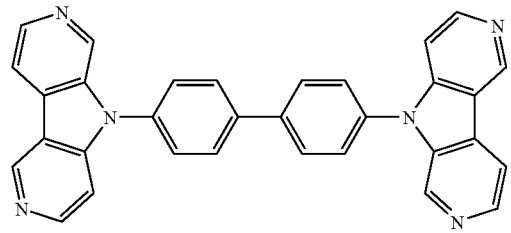 [SMILES: c1cc2c(cn1)c1ccncc1n2-c1ccc(-c2ccc(-n3c4ccncc4c4ccncc43)cc2)cc1] | |
| 175 | 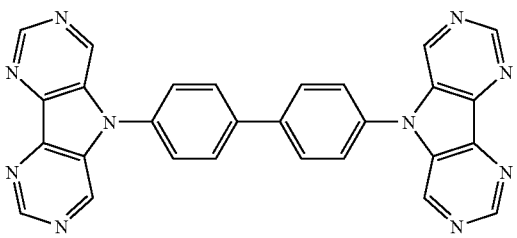 [SMILES: c1ncc2c(n1)c1ncncc1n2-c1ccc(-c2ccc(-n3c4cncnc4c4ncncc43)cc2)cc1] | |
| 176 | 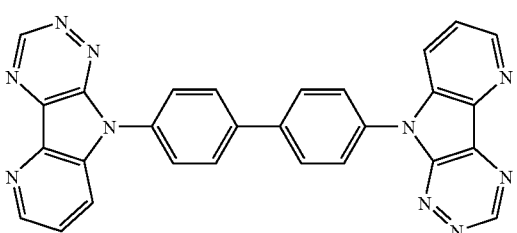 | |
| 177 | 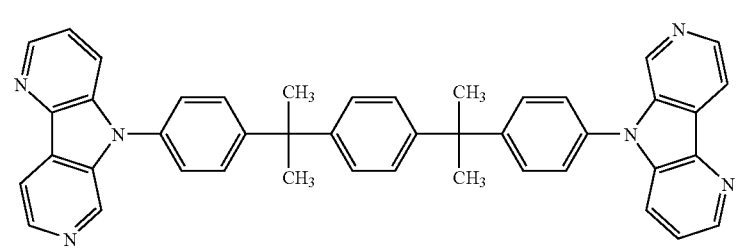 | |
| 178 | 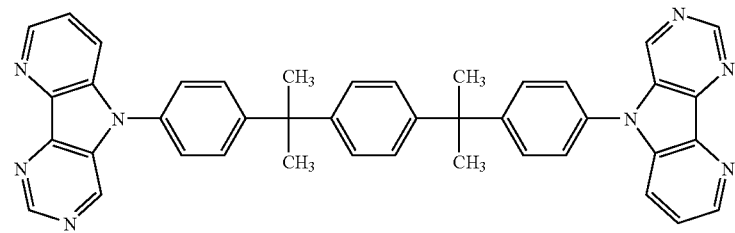 [SMILES: CC(C)(c1ccc(-n2c3cnccc3c3ncccc32)cc1)c1ccc(C(C)(C)c2ccc(-n3c4cnccc4c4ncccc43)cc2)cc1] | |

-continued

| Compound | Central structure | A |
|---|---|---|
| 179 | | |
| 180 | | |
| 181 | | |
| 182 | | |
| 183 | | |

-continued

| Compound | Central structure | A |
|---|---|---|
| 184 | | |
| 185 | | |
| 186 | | |
| 187 | | |
| 188 | | |

Further, an emission host of this invention may be either a low molecular weight compound or a polymer compound having a repeating unit, in addition to a low molecular weight compound provided with a polymerizing group such as a vinyl group and an epoxy group (an evaporation polymerizing emission host).

An emission host is preferably a compound having a positive hole transporting ability and an electron transporting ability, as well as preventing elongation of an emission wavelength and having a high Tg (a glass transition temperature).

As specific examples of an emission host compounds described in the following Documents are preferable: For example, JP-A Nos. 2001-257076, 2002-308855, 2001-313179, 2002-319491, 2001-357977, 2002-334786, 2002-8860, 2002-334787, 2002-15871, 2002-334788, 2002-43056, 2002-334789, 2002-75645, 2002-338579, 2002-105445, 2002-343568, 2002-141173, 2002-352957, 2002-203683, 2002-363227, 2002-231453, 2003-3165, 2002-234888, 2003-27048, 2002-255934, 2002-260861, 2002-280183, 2002-299060, 2002-302516, 2002-305083, 2002-305084 and 2002-308837.

Next, a typical constitution of an organic EL element will be described.

<Constituent Layers of Organic EL Element>

Constituent layers of an organic EL element of this invention will now be explained.

Specific examples of a preferable layer constitution of an organic EL element of this invention are shown below; however, this invention is not limited thereto.
(i) anode/positive hole transport layer/emission layer/positive hole inhibition layer/electron transport layer/cathode,
(ii) anode/electron inhibition layer/emission layer/positive hole inhibition layer/electron transport layer/cathode,
(iii) anode/positive hole transport layer/electron inhibition layer/emission layer/positive hole inhibition layer/electron transport layer/cathode,
(iv) anode/positive hole transport layer/electron inhibition layer/emission layer/positive hole inhibition layer/electron transport layer/cathode,
(v) anode/positive hole transport layer/electron inhibition layer/emission layer/positive hole inhibition layer/electron transport layer/cathode buffer layer/cathode,
(vi) anode/anode buffer layer/positive hole transport layer/ electron inhibition layer/emission layer/positive hole inhibition, layer/electron transport layer/cathode buffer layer/cathode,
(vii) anode/anode buffer layer/positive hole transport layer/ electron inhibition layer/emission layer/positive hole inhibition layer/electron transport layer/cathode buffer layer/cathode,
(viii) anode/positive hole transport layer/inter layer/emission layer/positive hole inhibition layer/electron transport layer/ cathode buffer layer/cathode.

The constitution (viii) is the most preferred one among all cited,

<Inter Layer>

An inter layer according to this invention is a layer provided in a position between an emission layer and a positive hole transport layer. The inter layer may be called as an electron transport layer or an electron inhibition, layer depending on a property of the material incorporated therein. In this invention, the inter layer preferably contains a compound which is the same as a host compound contained in an emission layer.

<Inhibition Layer (Electron Inhibition Layer, Positive Hole Inhibition Layer)>

An inhibition layer (such as an electron inhibition layer, a positive hole inhibition layer) according to this invention will now be explained.

The layer thickness of an inhibition layer according to this invention is preferably 3-100 nm and more preferably 5-nm.

<Positive Hole Inhibition Layer>

A positive hole inhibition layer, in a broad meaning, is provided with a function of electron transport layer, being comprised of a material having a function of transporting an electron but a very small ability of transporting a positive hole, and can improve the recombination probability of an electron and a positive hole by inhibiting a positive hole while transporting an electron.

As a positive hole inhibition layer, for example, a positive inhibition layer described in such as JP-A Nos. 11-204258 and 11-204359 and p. 237 of "Organic EL Elements and Industrialization Front Thereof (Nov. 30 (1998), published by N. T. S Corp.)" is applicable to a positive hole inhibition (hole block) layer according to this invention. Further, a constitution of an electron transport layer described later can be appropriately utilized as a positive hole inhibition layer according to this invention.

It is preferable that the organic EL layer of the present invention incorporates a positive hole layer, which incorporates derivatives having a ring structure, in which at least one carbon atom of the hydrocarbon ring constituting the above carboline derivative or the carboline ring of the above carboline derivative is substituted with a nitrogen atom.

<Electron Inhibition Layer>

On the other hand, an electron inhibition layer is, in a broad meaning, provided with a function of a positive hole transport layer, being comprised of a material having a function of transporting a positive hole but a very small ability of transporting an electron, and can improve the recombination probability of an electron and a positive hole by inhibiting an electron while transporting a positive hole. Further, a constitution of a positive hole transport layer described later can be appropriately utilized as an electron inhibition layer.

<Positive Hole Transport Layer>

A positive hole transport layer contains a material having a function of transporting a positive hole, and in a broad meaning, a positive hole injection layer and an electron inhibition layer are also included in a positive hole transport layer. A single layer of or plural layers of a positive hole transport layer may be provided.

A positive hole transport material is not specifically limited and can be arbitrary selected from those such as generally utilized as a charge injection transporting material of a positive hole in a conventional photoconductive material and those which are well known in the art and utilized in a positive hole injection layer and a positive hole transport layer of an EL element.

A positive hole transport material is those having any one of a property to inject or transport a positive hole or a barrier property to an electron, and may be either an organic substance; or an inorganic substance. For example, listed are a triazole derivative, an oxadiazole derivative, an imidazole derivative, a polyallylalkane derivative, a pyrazolone derivative, a phenylenediamine derivative, a allylamine derivative, an amino substituted chalcone derivative, an oxazole derivatives, a styrylanthracene derivative, a fluorenone derivative, a hydrazone derivative, a stilbene derivative, a silazane derivative, an aniline type copolymer, or conductive polymer oligomer and specifically preferably such as thiophene oligomer.

As a positive hole transport material, those described above can be utilized, however, it is preferable to utilized a porphyrin compound, an aromatic tertiary amine compound and a styrylamine compound, and specifically preferably an aromatic tertiary amine compound.

Typical examples of an aromatic tertiary amine compound and a styrylamine compound include N,N,N',N'-tetraphenyl-4,4'-diaminophenyl; N,N'-diphenyl-N,N'-bis(3-methylphenyl)-(1,1'-biphenyl)-4,4'-diamine (TDP); 2,2-bis(4-di-p-tolylaminophenyl)propane; 1,1-bis(4-di-p-tolylaminophenyl)cyclohexane; N,N,N',N'-tetra-p-tolyl 4,4'-diaminobiphenyl; 1,1-bis(4-di-p-tolylaminophenyl)-4-phenylcyclohexane, bis(4-dimethylamino-2-methyl)phenylmethane; bis(4-di-p-tolylaminophenyl)phenylmethane; N,N'-diphenyl-N,N'-di(4-methoxyphenyl)-4,4'-diaminobiphenyl; N,N,N',N'-tetraphenyl-4,4'-diaminophenylether; 4,4'-bis(diphenylamino)quarterphenyl; N,N,N-tri(p-tolyl)amine; 4-(di-p-tolylamino)-4'-[4-(di-p-triamino) styryl]stilbene; 4-N,N-diphenylamino-(2-diphenylvinyl)benzene; 3-methoxy-4'-N,N-diphenylaminostilbene; and N-phenylcarbazole, in addition to those having two condensed aromatic rings in a molecule described in U.S. Pat. No. 5,061,569, such as 4,4'-bis[N-(1-naphthyl)-N-phenylamino]biphenyl (NDP), and 4,4', 4"-tris[N-(3-methylphenyl)-N-phenylamino]triphenylamine (MDTDATA), in which three of triphenylamine units are bonded in a star burst form, described in JP-A 4-308688.

Polymer materials, in which these materials are introduced in a polymer chain or constitute the main chain of polymer, can be also utilized.

Further, an inorganic compound such as a p type-Si and a p type-Sic can be utilized as a positive hole injection material and a positive hole transport material This positive hole transport layer can be prepared by forming a thin layer made of the above-described positive hole transport material according to a method well known in the art such as a vacuum evaporation method, a spin coating method, a cast method, an inkjet method and a LB method. The layer thickness of a positive hole transport layer is not specifically limited, however, is generally 5-5,000 nm. This positive transport layer may have a single layer structure comprised of one or not less than two types of the above described materials.

<Electron Transport Layer>

An electron transfer layer is comprised of a material having a function to transfer an electron, and an electron injection layer and a positive hole inhibition layer are included in an electron transfer layer in a broad meaning. A single layer or plural layers of an electron transfer layer may be provided.

An electron transfer layer is provided with a function to transmit an electron injected from a cathode to an emission layer, and compounds conventionally well known in the art can be utilized by arbitrarily selection as a material thereof.

Examples of a material utilized in this electron transfer layer (hereinafter, referred to as an electron transfer material) include such as a nitro-substituted fluorene derivative, a diphenylquinone derivative, a thiopyradineoxide derivative, a heterocyclic tetracarbonic acid anhydride such as naphthaleneperylene, carbodiimide, a fluorenylidenemethane derivative, anthraquinonedimethane and anthrone derivatives, and an oxadiazole derivative. Further, a thiazole derivative in which an oxygen atom in the oxadiazole ring of the above-described oxadiazole derivative is substituted by a sulfur atom, and a quinoxaline derivative having a quinoxaline ring which is known as an electron attracting group can be utilized as an electron transfer material.

Polymer materials, in which these materials are introduced in a polymer chain or these materials form the main chain of polymer, can be also utilized.

Further, a metal complex of a 8-quinolinol derivative such as tris(8-quinolinol)aluminum (Alq), tris(5,7-dichloro-8-quinolinol) aluminum, tris(5,7-dibromo-8-quinolinol)aluminum, tris(2-methyl-8-quinolinol)aluminum, tris(5-methyl-8-quinolinol)aluminum and bis(8-quinolinol)zinc (Znq); and metal complexes in which a central metal, of the aforesaid metal complexes is substituted by In, Mg, Cu, Ca, Sn, Ga or Pb, can be also utilized as an electron transfer material. Further, metal-free or metal phthalocyanine, or those the terminal of which is substituted by an alkyl group and a sulfonic acid group, can be preferably utilized as an electron transfer material. Further, distyrylpyrazine derivative, which has been exemplified as a material of an emission layer, can be also utilized as an electron transfer material, and, similarly to the case of a positive hole injection layer and a positive hole transfer layer, an inorganic semiconductor such as an n-type-Si and an n-type-SiC can be also utilized as an electron transfer material.

This electron transport layer can be prepared by forming a thin layer made of the above-described electron transport material according to a method well known in the art such as a vacuum evaporation method, a spin coating method, a cast method, an inkjet method and a LB method. The layer thickness of an electron transport layer is not specifically limited; however, is generally 5-5,000 nm. This electron transport layer may have a single layer structure comprised of one or not less than two types of the above described materials.

Next, an injection layer which is known as a constituent layer of an organic EL element, of this invention will be explained.

<Injection Layer>: Electron Injection Layer, Positive Hole Injection Layer

An injection layer is appropriately provided and includes an electron injection layer and a positive hole injection layer, which may be arranged between an anode and an emission layer or a positive transfer layer, and between a cathode and an emission layer or an electron transfer layer, as described above.

An injection layer is a layer which is arranged between an electrode and an organic layer to decrease an operating voltage and to improve an emission luminance, which is detailed in volume 2, chapter 2 (pp. 123-166) of "Organic EL Elements and Industrialization Front thereof (Nov. 30, 1998, published by N. T. S Corp.)", and includes a positive hole injection layer (an anode buffer layer) and an electron injection layer (a cathode buffer layer).

An anode buffer layer (a positive hole injection layer) is also detailed in such as JP-A 9-45479, 9-260062 and 8-288069, and specific examples include such as a phthalocyanine buffer layer comprising such as copper phthalocyanine, an oxide buffer layer comprising such as vanadium oxide, an amorphous carbon buffer layer, and a polymer buffer layer employing conductive polymer such as polythiophene.

A cathode buffer layer (an electron injection layer) is also detailed in such as JP-A 6-325871, 9-17574 and 10-74586, and specific examples include a metal buffer layer comprising such as strontium and aluminum, an alkali metal compound buffer layer comprising such as lithium fluoride, an alkali earth metal compound buffer layer comprising such as magnesium fluoride, and an oxide buffer layer comprising such as aluminum oxide.

The above-described buffer layer (injection layer) is preferably a very thin layer, and the layer thickness is preferably in a range of 0.1-100 nm although it depends on a raw material.

This injection layer can be prepared by forming a thin layer made of the above-described material according to a method well known in the art such as a vacuum evaporation method, a spin coating method, a cast method, an inkjet method and a LB method. The layer thickness of an injection layer is not specifically limited; however, is generally 5-5,000 nm. This injection layer may have a single layer structure comprised of one or not less than two types of the above described materials.

<Anode>

As an anode according to an organic EL element of this invention, those comprising metal, alloy, a conductive compound, which is provided with a large work function (not less than 4 eV), and a mixture thereof as an electrode substance are preferably utilized. Specific examples of such an electrode substance include a conductive transparent material such as metal like Au, CuI, indium tin oxide (ITO), $SnO_2$ and ZnO. Further, a material such as IDIXO ($In_2O_3$—ZnO), which can prepare an amorphous and transparent electrode, may be also utilized. As for an anode, these electrode substances may be made into a thin layer by a method such as evaporation or spattering and a pattern of a desired form may be formed by means of photolithography, or in the case of requirement of pattern precision is not so severe (not less than 100 μm), a pattern may be formed through a mask of a desired form at the time of evaporation or spattering of the above-described substance. When emission is taken out of this anode, the transmittance is preferably set to not less than 10% and the sheet resistance as an anode is preferably not more than a few hundreds Ω/□. Further, although the layer thickness depends on a material, it is generally selected in a range of 10-1,000 nm and preferably of 10-200 nm.

<Cathode>

On the other hand, as a cathode according to this invention, metal, alloy, a conductive compound and a mixture thereof, which have a small work function (not more than 4 eV), are utilized as an electrode substance. Specific examples of such an electrode substance includes such as sodium, sodium-potassium alloy, magnesium, lithium, a magnesium/copper mixture, a magnesium/silver mixture, a magnesium/aluminum mixture, a magnesium/indium mixture, an aluminum/aluminum oxide ($Al_2O_3$) mixture, indium, a lithium/aluminum mixture and rare earth metal. Among them, with respect to an electron injection property and durability against such as oxidation, preferable axe a mixture of electron injecting metal with the second metal which is stable metal having a work function larger than electron injecting metal, such as a magnesium/silver mixture, a magnesium/aluminum mixture, a magnesium/indium mixture, an aluminum/aluminum oxide ($Al_2O_3$) mixture and a lithium/aluminum mixture, and aluminum. As for a cathode, these electrode substances may be made into a thin layer by a method such as evaporation or spattering. Further, the sheet resistance as a cathode is preferably not more than a few hundreds Ω/□ and the layer thickness is generally selected in a range of 10-1,000 nm and preferably of 50-200 nm. Herein, to transmit emission, either one of an anode or a cathode of an organic EL element is preferably transparent or translucent to improve the mission luminance.

<Substrate (also referred to as Base Plate, Base Material or Support)>

A substrate according to an organic EL element of this invention is not specifically limited with respect to types of such as glass and plastics provided being transparent, however, a substrate preferably utilized includes such as glass, quartz and transparent resin film. A specifically preferable substrate is resin film capable of providing an organic EL element with a flexible property.

Resin film includes such as film comprised of polyethylene terephthalate (PET), polyethylene naphthalate (PEN), polyether sulphone (PES), polyether imide, polyether etherketone, polyphenylene sulfide, polyallylate, polyimide, polycarbonate (PC) and cellulose acetate propionate (CAP).

On the surface of resin film, an inorganic or organic cover layer or a hybrid cover layer comprising the both may be formed, and the film is preferably provided with a high barrier ability. A preferably barrier film has a oxygen transmittance of not more than $1\times10^{-3}$ ml/(m²·24 hr·MPa) measured based on JIS K 7129-1992 and a vapor transmittance of not more than $1\times10^{-3}$ g/(m²·24 hr)·at a temperature of 25±0.5° C., relative humidity (90±2) % RH, measured based on JIS K. 7129-1987.

Further, a hue improving filter such as a color filter may be utilized in combination.

In the case of an illumination application, roughening processed film (such as anti-glare film) can be also utilized in combination to decrease emission unevenness.

In the case of an application as a multi-color display device, the display is comprised of at least two types of organic EL elements having different emission maximum wavelengths, and a preferable example to prepare an organic EL element will now be explained.

<Preparation Method of Organic EL Element>

As an example of a preparation method of an organic EL element of this invention, a preparation method of an organic EL element, comprising anode/positive hole injection layer/positive hole transport layer/emission layer/positive hole inhibition layer/electron transport layer/cathode buffer layer/cathode, will be explained.

First, on an appropriate substrate, a thin layer comprising a desired electrode substance such as an anode electrode substance is formed by means of evaporation or spattering so as to make a layer thickness of not more than 1 μm and preferably of 10-200 nm, whereby an anode is prepared. Next, on this layer, thin layers containing organic substances of such as a positive hole injection layer, a positive hole transport layer, an emission layer, a positive hole inhibition layer and an electron transport layer are formed.

A thin layer forming method of these layers containing the organic substances includes such as a spin coat method, a cast method, an inkjet method, an evaporation method and a printing method as described before, however, a vacuum evaporation method or a spin coat method is specifically preferable with respect to easy preparation of a homogeneous layer and bare generation of pinholes. Further, a different layer forming method, depending on each layer may be applied. In the case of employing an evaporation method in layer formation, the evaporation condition depends on such as the type of a utilized compound, however, is generally appropriately selected in a range of 50-450° C. as a boat heating temperature, $10^{-6}$-$10^{-2}$ Pa as a vacuum degree, 0.01-50 nm/sec as a deposition rate, −50-300° C. as a substrate temperature and 0.1 μm-5 μm as a layer thickness.

After formation of these layers, a thin layer comprising a cathode electrode substance is formed thereon by means of such as evaporation or spattering so as to make a layer thickness in a range of 50-200 nm to provide a cathode, whereby a desired organic EL element can be prepared. This preparation of an organic EL element is preferably carried out with one time evacuation to prepare all through from a positive hole injection layer to a cathode, however, different layer forming method may be also applied by taking out the element on the way. At that time, it is preferable to take consideration such as to perform the operation under a dry inert gas environment.

<Display Device>

A display device of this invention will now be explained. The display device of this invention includes the above-described organic EL element.

A display device of this invention may be either monochromatic or multi-colored. Here explained will be a multicolor display device. In the case of a multicolor display device, a shadow mask is provided only at the time of emission layer formation, and layers can be formed all over the surface by such as an evaporation method, a cast method, a spin coat method, an inkjet method and a printing method.

When patterning is performed only with an emission, layer, the method is not specifically limited; however, preferable are an evaporation method, an inkjet method and a printing method. And patterning employing a shadow mask is preferred in the case of an evaporation method. Further, reversing the preparation order, it is also possible to prepare layers in the order of a cathode, an electron transport layer, a positive hole inhibition layer, an emission layer, a positive hole transport layer and an anode.

When a direct current voltage is applied on the multicolor display device thus prepared, emission can be observed by application of a voltage of approximately 2-40V setting an anode to + polarity and a cathode to − polarity. Further, no current flows and no emission generate at all even when a voltage is applied with a reversed polarity. Further, in the case of alternate current voltage being applied, emission generates only in a state of an anode being + and a cathode being −. Herein, the wave shape of alternate current may be arbitrary.

<Taking Out Quantum Efficiency of Organic EL Element>

The taking out efficiency of emission of an organic EL element of this invention at room temperature is preferably not less than 1% and more preferably not less than 2%.

Talking out quantum efficiency of this invention is defined as below.

Taking out quantum efficiency (%)=photon number emitted out of organic EL element/electron number flown into organic EL element×100. The detailed measuring method of taking out quantum efficiency is described in Examples.

A multicolor display device can be utilized as a display device, a display and various types of emission light sources. In a display device and a display, full-colored display is possible by employing three types of organic EL elements providing blue, red and green emissions. A display device and a display include a TV, a personal computer, a mobile instrument, an AV instrument, a character broadcast display and an information display in a car. Particularly, the display device and the display may be also utilized as a display to playback still images and moving images, and may adopt either a simple matrix (a passive matrix) mode or an active matrix mode when being utilized as a display device for moving image playback.

An illumination light source includes a home use illumination, a car room illumination, a backlight of a watch or a liquid crystal, a panel advertisement, a signal, a light source of an optical memory medium, a light source for an electrophotographic copier, a light source for an optical telecommunication processor and a light source for a photo-sensor, however, is not limited thereto.

<Lighting Devices

A lighting device of this invention will now be explained. The lighting device of this invention includes the above-described organic EL element.

An organic EL element of this invention can be utilized as an organic EL element provided with a resonator structure, and a utilization purpose of such an organic EL element provided with a resonator structure includes such as a light source for an optical memory medium, a light source for an electrophotographic copier, a light source for a optical telecommunication processor and a light source for a photo-sensor, however, is not limited thereto. Further, the organic EL element may be utilized for the above-described applications by being made to perform laser emission.

Further, an organic EL element of this invention may be utilized as one type of a lamp like an illumination and an exposure light, and may be also utilized as a display device of a projector of an image projecting type and a display device (a display) of a type to directly view still images and moving images. An operating mode in the case of being utilized as a display device for playback of moving images may be either a simple matrix (a passive matrix) mode or an active matrix mode. In addition, a full-color display device can be prepared by utilizing at least two types of organic EL elements of this invention which emit different emitting colors.

In the following, one example of a display device provided with an organic EL element of this invention will be explained.

FIG. 1 is a schematic drawing to show an example of a display device constituted of an organic EL element. It is a schematic drawing of a display, which displays image information by emission of an organic EL element, such as a mobile phone. Display 1 is constituted of such as display section A having plural number of pixels and control section B which performs image scanning of display section A based on image information. Control section B, which is electrically connected to display section A, sends a scanning signal and an image data signal to plural number of pixels based on image information, from the outside and pixels of each scanning line successively emit depending on the image data signal by a scanning signal to perform image scanning, whereby image information is displayed on display section A.

Figure 2:
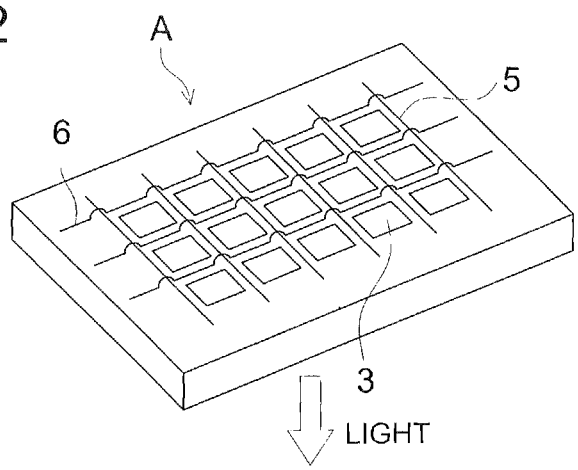
FIG. 2 is a schematic drawing of display section A.

FIG. 2 is a schematic drawing of display section A. Display section A is provided with such as a wiring part, which contains plural scanning lines 5 and data lines 6, and plural pixels 3 on a substrate. Primary part materials of display section A will be explained in the following. In the drawing, shown is the case that light emitted by pixel 3 is taken out along the white allow (downward). Scanning lines 5 and plural data lines 6 in a wiring part each are comprised of a conductive material, and scanning lines 5 and data lines 6 are perpendicular in a grid form and are connected to pixels 3 at the right-angled crossing points (details are not shown in the drawing). Pixel 3 receives an image data from data line 6 when a scanning signal is applied from scanning line 5 and emits according to the received image data. Full-color display device is possible by appropriately arranging pixels having an emission, color in a red region, pixels in a green region and pixels in a blue region, side by side on the same substrate.

Next an emission process of a pixel will be explained.

Figure 3:
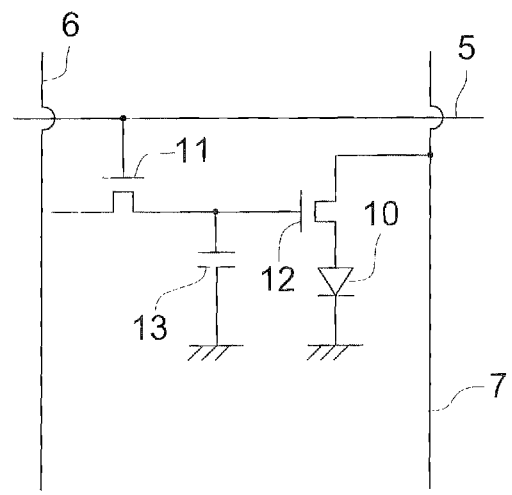
FIG. 3 is an equivalent circuit diagram of an image pixel.

FIG. 3 is a schematic drawing of a pixel. A pixel is equipped with such as organic EL element 10, switching transistor 11, operating transistor 12 and capacitor 13. Red, green and blue emitting organic EL elements are utilized as organic EL element 10 for plural pixels, and full-color display device is possible by arranging these side by side on the same substrate.

In FIG. 3, an image data signal is applied on the drain of switching transistor 11 via data, line 6 from control section B. Then, when a scanning signal is applied on the gate of switching transistor 11 via scanning line 5 from control section B, operation of switching transistor is on to transmit the image data signal applied on the drain to the gates of capacitor 13 and operating transistor 12. Operating transistor 12 is on, simultaneously with capacitor 13 being charged depending on the potential of an image data signal, by transmission of an image data signal. In operating transistor 12, the drain is connected to electric source line 7 and the source is connected to the electrode of organic EL element 10, and an electric current is supplied from electric source line 7 to organic EL element 10 depending on the potential of an image data applied on the gate. When a scanning signal is transferred to next scanning line 5 by successive scanning of control section B, operation of switching transistor 11 is off. However, since capacitor 13 keeps the charged potential of an image data, signal even when operation of switching transistor 11 is off, operation of operating transistor 12 is kept on to continue emission of organic EL element 10 until the next scanning signal is applied. When the next scanning signal is applied by successive scanning, operating transistor 12 operates depending on the potential of an image data signal synchronized to the scanning signal and organic EL element 10 emits.

That is, emission of each organic EL element 10 of plural pixels 3 is performed by providing switching transistor 11 and operating transistor 12 against each organic EL element 10 of plural pixels 3, Such an emission method is called as an active matrix mode. Herein, emission of organic EL element 10 may be either emission of plural gradations based on a multiple-valued image data signal having plural number of gradation potentials or on and off of a predetermined emission quantity based on a binary image data signal. Further, potential hold of capacitor 13 may be either continuously maintained until the next scanning signal application or discharged immediately before the next scanning signal application.

In this invention, emission operation is not necessarily limited to the above-described active matrix mode but may be a passive matrix mode in which organic EL element is emitted based on a data signal only when a scanning signal is scanned.

Figure 4:
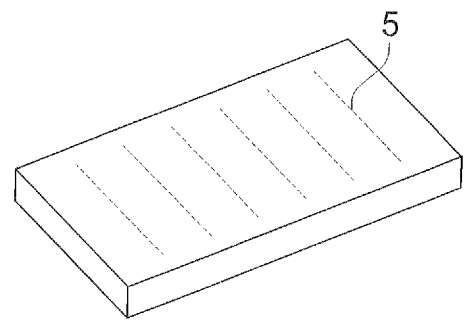
FIG. 4 is a schematic drawing of a full color display device according to a passive matrix mode.
Figure 4:
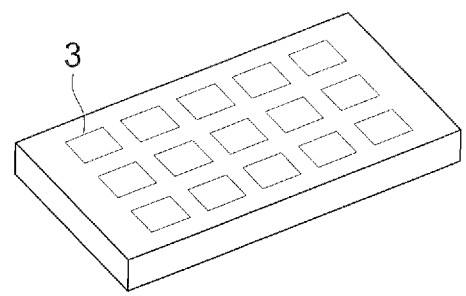
Figure 4:
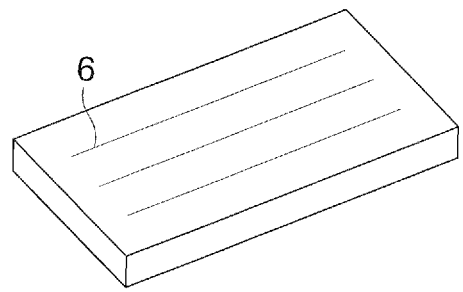

FIG. 4 is a schematic drawing of a display device based on a passive matrix mode. In FIG. 4, plural number of scanning lines 5 and plural number of image data lines 6 are arranged grid-wise, opposing to each other and sandwiching pixels 3.

When a scanning signal of scanning line 5 is applied by successive scanning, pixel 3 connected to scanning line 5 applied with said signal emits depending on an image data signal. Since pixel 3 is provided with no active element in a passive matrix, mode, decrease of manufacturing cost is possible.

An organic EL element, material of this invention can be also applied to an organic EL element to generate emission of practically white color as a lighting device. Plural emission colors are simultaneously emitted by plural number of emission materials to obtain white light by mixing colors. A combination of plural emission colors may be either the one, in which three emission maximum wavelengths of three primary colors of blue, green and red are contained, or the other, in which two emission maximum wavelengths, utilizing a relationship of complimentary colors such as blue and yellow, or blue and orange, are contained.

Further, a combination of emission, materials to obtain plural number of emission colors may be either a combination comprising plural number of materials which emit phosphoresce or fluorescence, or a combination of a material which emits phosphoresce or fluorescence and a dye material which emits by light from an emission material as exiting light, however, in a white organic electroluminescent element according to this invention, it is enough only to mix plural emission dopants in combination. A mask is provided only at the time of forming such as an emission layer, a positive hole transport layer or an electron transport layer, to only simply arrange the plural emission dopants such as by separately painting through the mask, while other layers are commonly utilized to require no patterning such as a mask. Therefore, such as an electrode can be formed all over the plane by such as an evaporation method, a cast method, a spin coat method, an inkjet method and a printing method, resulting in improvement of productivity. According to this method, different from a white organic EL device in which plural colors of emission elements are arranged parallel in an alley form, an element itself is white emitting.

An emission material utilized in an emission layer is not specifically limited, and in the case of a backlight of a liquid crystal display element, any combination by arbitrary selection among platinum complexes according to this invention or emission materials well known in the art can be utilized so as to be fitted to the wavelength range corresponding to CF (color filter) characteristics, whereby white emission can be obtained.

In this manner, a white emitting organic EL element of this invention is usefully utilized as one type of a lamp such as a home use illumination, a car room illumination or an exposure light source as various emission light sources or lighting devices, in addition to the aforesaid display device and a display, and is further usefully applied for a display as such as a backlight of a liquid crystal display.

In addition to these, listed is a wide range of applications such as a backlight of a watch, an advertising board, a signal, a light source of an optical memory medium, a light source of an electrophotographic copier, a light source of an optical telecommunication processor and a light source of an optical sensor, and further general home use electric instruments which require a display device.

EXAMPLES

In the following, this invention will be explained with reference to examples, however, is not limited thereto. The compounds employed in the examples are shown below.

Example 1

Preparation of Organic EL Element 1-1

After a substrate, in which ITO had been deposited at 150 nm on a glass plate as an anode (NA-45 produced by NH Techno Glass Co. Ltd.) was subjected to patterning, the transparent support substrate was washed with isopropyl alcohol by use of ultrasonic waves, followed by being dried with a dry nitrogen gas, and was subjected to UV ozone washing for 5 minutes. This transparent support substrate was fixed on a substrate holder of a vacuum evaporation system available on the market, and on the other hand, each of five resistance heating boats made of tantalum was charged with α-NPD, CBP, Ir-12, E-1 and Alq$_3$, respectively, which was attached in the vacuum evaporation system (in the first vacuum chamber).

Further, a resistance heating boat made of tantalum was charged with lithium fluoride and a resistance heating boat made of tungsten was charged with aluminum, respectively, and these boats were; attached in the second chamber of the vacuum evaporation system.

First, after the first vacuum chamber was evacuated down to $4\times10^{-4}$ Pa, the aforesaid heating boat charged with α-NPD was heated with an electric current to deposit α-NPD on a support substrate at a deposition rate of 0.1-0.2 nm/sec so as to make a layer thickness of 30 nm, whereby a positive hole injection/transport layer was formed.

Further, the aforesaid heating boat charged with CBP and the boat charged with Ir-12 were independently supplied with an electric current to deposit CBP as an emission host and Ir-12 as an emission dopant so as to make a layer thickness of 40 nm while adjusting the deposition rates thereof to 100:4, whereby an emission layer was formed.

Next, the aforesaid heating boat charged with E-1 was heated with an electric current to provide a positive hole inhibition layer having a layer thickness of 10 nm at a deposition rate of 0.1-0.2 nm/sec. Further, the aforesaid heating boat charged with Alq$_3$ was heated with an electric current to provide an electron transport layer having a layer thickness of 20 nm at a deposition rate of 0.1-0.2 nm/sec.

Next, after an element having been deposited with up to an electron injection layer as described before was transferred into the second vacuum chamber while keeping vacuum, a mask, which was made of stainless steel and had rectangular holes, was arranged on the electron injection layer by means of remote control from outside of the system.

After the second vacuum chamber was evacuated down to $2 \times 10^{-4}$ Pa, a boat charged with lithium fluoride was supplied with an electric current to provide a cathode buffer layer having a layer thickness of 0.5 nm at a deposition rate of 0.01-0.02 nm/sec, and then a boat, charged with aluminum was supplied with an electric current to provide a cathode having a layer thickness of 150 nm at a deposition rate of 1-2 nm/sec to obtain Organic EL Element 1-1.

<Preparation of Organic EL Elements 1-2 to 119>

Organic EL elements 1-2 to 1-19 each were prepared in a similar manner to preparation of organic EL element 1-1 described above, except that an emission host and an emission dopant were changed as shown in Table 1.

Comparison 1

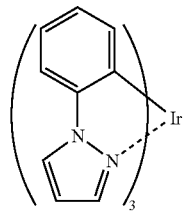

Comparison 2

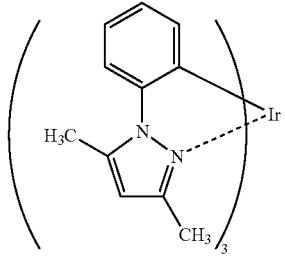

Comparison 3

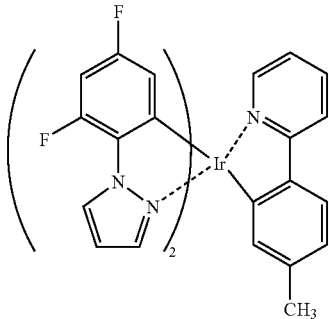

Comparison 4

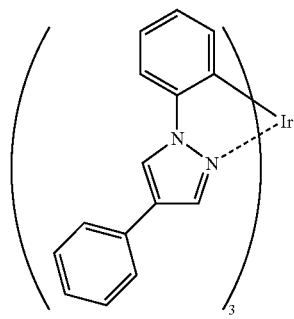

Comparison 5

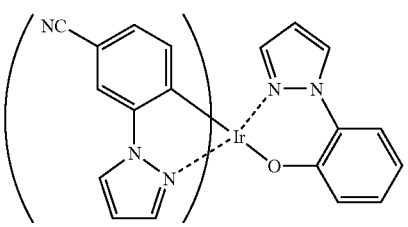

E-1

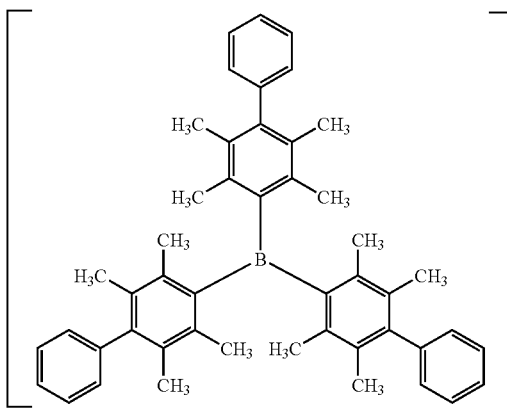

CBP

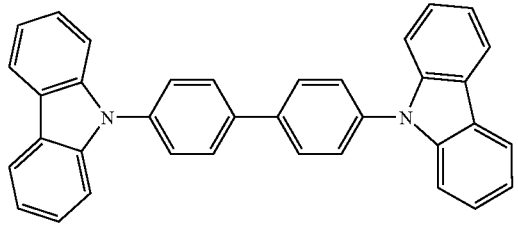

α-NPD

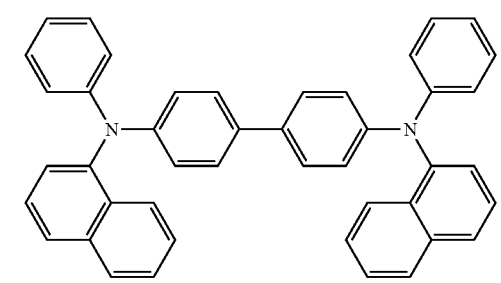

-continued

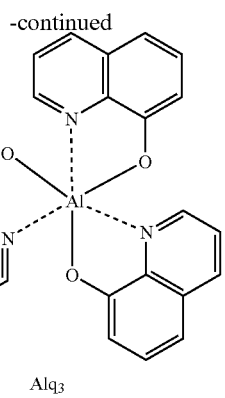

Alq3

<<Evaluation of Organic EL Elements>>

When resulting Organic EL Elements 1-1 to 1-19 were evaluated, after their preparation, the non-luminescent side was covered with a glass case, and a 300 μm thick glass substrate was employed as a sealing substrate. Further, an epoxy based radiation curable type adhesive (LAXTRACK C0629B, produced by TOAGOSEI Co., Ltd.) was applied to the periphery as a sealing agent. The resulting substrate was overlapped onto the above anode to come into close contact with the above transparent supporting substrate. Subsequently, UV radiation was exposed to the glass substrate side to result in curing and sealing. Thus, the lighting device as shown in FIGS. 5 and 6 was formed and evaluation was then carried out.

Figure 5:
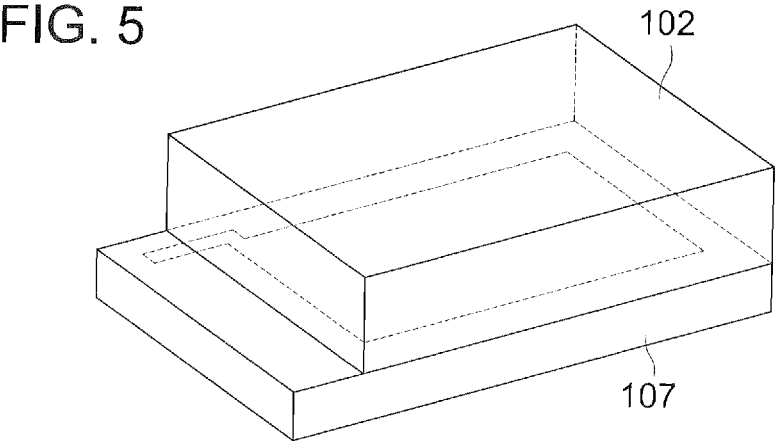
FIG. 5 is a schematic drawing of a lighting device.
Figure 6:
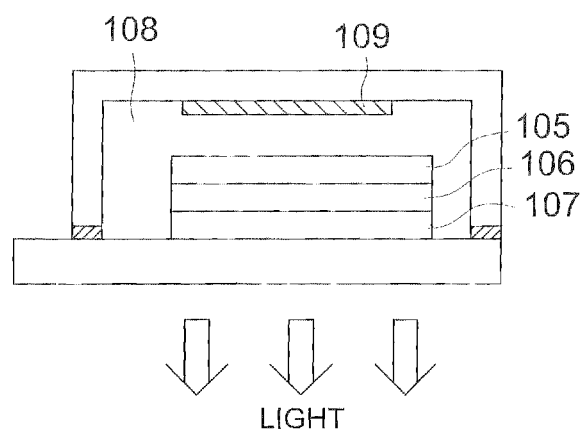
FIG. 6 is a schematic cross-sectional view of a lighting device.

FIG. 5 is a schematic view of a lighting device. Organic EL element 101 is covered with glass cover 102. Sealing operation employing the glass cover was carried out in a globe box (under an atmosphere of high purity nitrogen gas at a purity of at least 99.999%) without contact with atmospheric air. FIG. 6 is a sectional view of the lighting device, in which numeral 105 represents a cathode, 106 represents an organic EL layer, and 107 represents a glass substrate having a transparent electrode. Further, nitrogen gas 108 is fed into glass cover 102, and desiccant 109 is provided.

<Quantum Efficiency of Talking Out>

Each of organic EL elements was lighted under a constant current condition of 2.5 mA/cm$^2$ at room temperature (approximately 23-25° C.), and an emission luminance (L) [cd/m$^2$] immediately after turning on was measured, whereby a quantum efficiency of taking out (η) was calculated. Herein, CS-1000 (produced by Konica Minolta. Sensing Inc.) was utilized for measurement of emission luminance. Further, each of the quantum efficiency of taking out was expressed as a relative value when that of organic EL element 1-1 was set to 100.

<Emission Lifetime>

Each of organic EL elements was continuously lighted under a constant current condition of 2.5 mA/cm$^2$ at room temperature (approximately 23-25° C.), and time to reach a half of the initial luminance ($\tau_{1/2}$) was measured. Further, each emission lifetime was expressed as a relative value when that of organic EL element 1-1 was set to 100.

The obtained results are shown in Table 1.

TABLE 1

| Organic EL Element No. | Emission dopant | Taking-out Quantum Yield | Luminescent Lifetime ($\tau_{1/2}$) | Remarks |
|---|---|---|---|---|
| 1-1 | Ir-12 | 100 | 100 | Comp. |
| 1-2 | Comparison 1 | 5 | 615 | Comp. |
| 1-3 | Comparison 2 | 6 | 692 | Comp. |
| 1-4 | Comparison 3 | 70 | 538 | Comp. |
| 1-5 | Comparison 4 | 71 | 769 | Comp. |
| 1-6 | Comparison 5 | 67 | 1540 | Comp. |
| 1-7 | 1-11 | 125 | 8850 | Inv. |
| 1-8 | 1-43 | 163 | 8150 | Inv. |
| 1-9 | 2-13 | 150 | 8230 | Inv. |
| 1-10 | 2-34 | 150 | 8615 | Inv. |
| 1-11 | 3-1 | 138 | 8770 | Inv. |
| 1-12 | 3-57 | 150 | 8380 | Inv. |
| 1-13 | 4-22 | 125 | 9230 | Inv. |
| 1-14 | 4-30 | 175 | 7920 | Inv. |
| 1-15 | 5-13 | 150 | 8540 | Inv. |
| 1-16 | 6-1 | 175 | 8080 | Inv. |
| 1-17 | 7-16 | 188 | 7770 | Inv. |
| 1-18 | 7-23 | 125 | 9150 | Inv. |
| 1-19 | 7-49 | 188 | 7690 | Inv. |

Based on Table 1, it is clear that the organic EL elements prepared via the metal complexes according to the present invention attain high luminescent efficiency and extended luminescent lifetime, compared to the EL element of the Comparative Examples.

Example 2

Preparation of Organic EL Element 2-1

After a substrate, in which ITO had been deposited at 150 nm on a glass plate as an anode (NA-45 produced by NH Techno Glass Co. Ltd.) was subjected to patterning, the transparent support substrate was washed with isopropyl alcohol by use of ultrasonic waves, followed by being dried with a dry nitrogen gas, and was subjected to UV ozone washing for 5 minutes. This transparent support substrate was fixed on a substrate holder of a vacuum evaporation system available on the market, and on the other hand, each of five resistance heating boats made of tantalum was charged with α-NPD, H-1, Ir-12, E-2 and E-3, respectively, which was attached in the vacuum evaporation system (in the first vacuum chamber).

Further, a resistance heating boat made of tantalum was charged with lithium fluoride and a resistance heating boat made of tungsten was charged with aluminum, respectively, and these boats were attached in the second chamber of the vacuum evaporation system.

First, after the first vacuum chamber was evacuated down to 4×10$^{-4}$ Pa, the aforesaid heating boat charged with α-NPD was heated with an electric current to deposit α-NPD on a support substrate at a deposition rate of 0.1-0.2 nm/sec so as to make a layer thickness of 90 nm, whereby a positive hole injection/transport layer was formed.

Next, the aforesaid heating boat charged with H-1 was supplied with an electric current to deposit H-1 so as to make a layer thickness of 10 nm at a deposition rate of 0.1-0.2 nm/sec, whereby an inter layer was formed.

Further, the aforesaid heating boat charged with H-1 and the boat charged with Ir-12 were independently supplied with an electric current to deposit H-1 as an emission host and Ir-12 as an emission dopant so as to make a layer thickness of 40 nm while adjusting the deposition rates thereof to 100:6, whereby an emission layer was formed.

Next, the aforesaid heating boat charged with E-2 was heated with an electric current to provide a positive hole inhibition layer having a layer thickness of 10 nm at a deposition rate of 0.1-0.2 nm/sec. Further, the aforesaid heating boat charged with E-3 was heated with an electric current to provide an electron transport layer having a layer thickness of 20 nm at a deposition rate of 0.1-0.2 nm/sec.

Next, after an element having been deposited with up to an electron injection layer as described before was transferred into the second vacuum chamber while keeping vacuum, a mask, which was made of stainless steel and had rectangular holes, was arranged on the electron injection layer by means of remote control from outside of the system.

After the second vacuum chamber was evacuated down to $2 \times 10^{-4}$ Pa, a boat charged with lithium fluoride was supplied with an electric current to provide a cathode buffer layer having a layer thickness of 0.5 nm at a deposition rate of 0.01-0.02 nm/sec, and then a boat charged with aluminum was supplied with an electric current to provide a cathode having a layer thickness of 150 nm at a deposition rate of 1-2 nm/sec. Then, this element was transferred into in a globe box (under an atmosphere of high purity nitrogen gas at a purity of at least 99.999%) without contact with atmospheric air) and was sealed in the same manner as preparation of Organic EL Element 1-1 in Example 1 to obtain Organic EL Element 2-1.

<Preparation of Organic EL Elements 2-2 to 2-18>

Organic EL elements 2-2 to 2-18 each were prepared in a similar manner to preparation of organic EL element 2-1 described above, except that an emission dopant was changed as shown in Table 2.

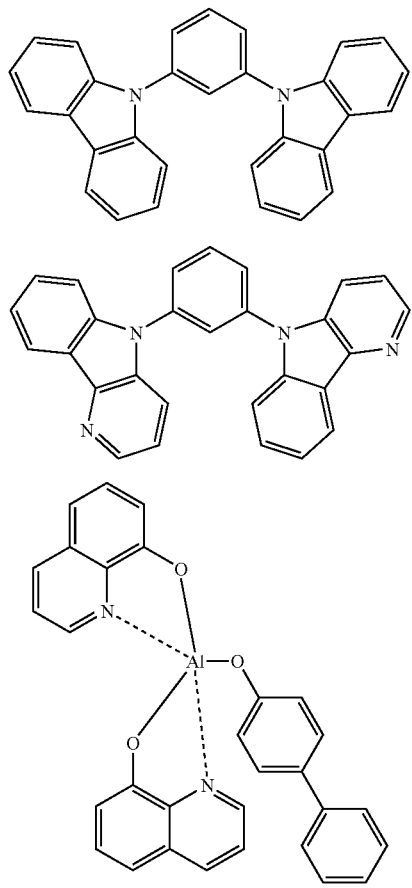

H-1

E-2

E-3

<<Evaluation of Organic EL Elements>>

Prepared Organic EL elements 2-1 to 2-18 were subjected to evaluations described below.

<Quantum Efficiency of Taking Out>

The evaluation was carried, out in the same manner as in Example 1. Each of the quantum efficiency of taking out was expressed as a relative value when that of organic EL element 2-1 was set to 100.

<Emission Lifetime>

The evaluation was carried out in the same manner as in Example 1. Each of the emission lifetimes was expressed as a relative value when that of organic EL element 2-1 was set to 100.

The obtained results are shown in Table 2.

TABLE 2

| Organic EL Element No. | Emission dopant | Taking-out Quantum Yield | Luminescent Lifetime ($\tau_{1/2}$) | Remarks |
|---|---|---|---|---|
| 2-1 | Ir-12 | 100 | 100 | Comp. |
| 2-2 | Comparison 1 | 6 | 167 | Comp. |
| 2-3 | Comparison 2 | 8 | 222 | Comp. |
| 2-4 | Comparison 3 | 100 | 83 | Comp. |
| 2-5 | Comparison 4 | 80 | 333 | Comp. |
| 2-6 | Comparison 5 | 80 | 361 | Comp. |
| 2-7 | 1-16 | 80 | 2260 | Inv. |
| 2-8 | 1-28 | 120 | 1580 | Inv. |
| 2-9 | 2-6 | 80 | 2070 | Inv. |
| 2-10 | 2-42 | 140 | 1500 | Inv. |
| 2-11 | 3-14 | 80 | 2170 | Inv. |
| 2-12 | 3-38 | 100 | 1970 | Inv. |
| 2-13 | 4-14 | 140 | 1420 | Inv. |
| 2-14 | 4-47 | 100 | 1850 | Inv. |
| 2-15 | 5-6 | 100 | 1740 | Inv. |
| 2-16 | 6-15 | 80 | 2000 | Inv. |
| 2-17 | 7-15 | 120 | 1570 | Inv. |
| 2-18 | 7-31 | 100 | 1780 | Inv. |

Based on Table 2, it is clear that the organic EL elements prepared via the metal complexes according to the present invention attain high luminescent efficiency and extended luminescent lifetime, compared to the EL element of the Comparative Examples.

Example 3

A cathode (at a thickness of 200 nm) composed of an indium tin oxide (ITO ah an indium/tin=95/5 mol ratio) was formed on a 25 mm×25 mm×0.5 mm glass substrate under application of a direct electric current, employing a sputtering method. The surface resistance of the resulting cathode was 10Ω/□. The above surface was coated with a dichloroethane solution, in which polyvinylcarbazole/Ir-13/2-(4-biphenylyl-5(4-t-butylphenyl)-1,3,4-oxazole=200/2/50 mole ratio were dissolved, employing a spin coater, whereby a 100 nm emission layer was prepared. On the resulting organic compound layer, a mask (being a mask resulting in a luminescent area of 5 mm×5 mm), which was subjected to patterning, was arranged and an anode was arranged in such a manner that in a vacuum evaporation device, 0.5 mm lithium fluoride was evaporated as an anode buffer layer and 150 nm aluminum as a cathode was evaporated. Then, this element was transferred into in a globe box (under an atmosphere of high purity nitrogen gas at a purity of at least 99.999%) without contact with atmospheric air) and was sealed in the same manner as preparation of Organic EL Element 1-1 in Example 1 to obtain Organic EL Element 3-1.

<Preparation of Organic EL Elements 3-2 to 3-9>

Organic EL Elements 3-2 to 3-9 were prepared in the same manner as Organic EL Element 3-1, except that the emission dopant was changed as described in Table 3.

<<Evaluation of Organic EL Elements>>

Obtained Organic EL Elements 3-1 to 3-9 were evaluated in the manner described below so as to measure luminance and luminescent efficiency (Luminance, and Luminescent Efficiency)

By employing SOURCE MAJOR UNIT Type 2400, produced by Toyo Technica Inc., DC voltage was applied to an organic EL element to result in luminescence. Luminance ($cd/m^2$) in the case in which 10 V DC voltage was applied, was determined and luminescent efficiency (lm/W). In the case in which an electric current of 2.5 $mA/cm^2$ was run, was also determined. Table 3 shows the results. Each of luminance and luminescent efficiency was expressed as a relative value when that of organic EL element 3-1 was set to 100.

TABLE 3

| Organic EL Element No. | Emission dopant | Luminance ($cd/m^2$) | Luminescent Efficiency (lm/W) | Remarks |
| --- | --- | --- | --- | --- |
| 3-1 | Ir-13 | 100 | 100 | Comparative Example |
| 3-2 | Comparison 4 | 60 | 75 | Comparative Example |
| 3-3 | 1-20 | 120 | 120 | Present Invention |
| 3-4 | 2-21 | 160 | 200 | Present Invention |
| 3-5 | 3-35 | 200 | 275 | Present Invention |
| 3-6 | 4-5 | 140 | 140 | Present Invention |
| 3-7 | 5-2 | 180 | 210 | Present Invention |
| 3-8 | 6-8 | 140 | 145 | Present Invention |
| 3-9 | 7-4 | 120 | 115 | Present Invention |

Based on Table 3, it is evident that the organic EL elements prepared by employing the metal complexes according to the present invention attained high luminescent efficiency and high luminance, compared to the EL element of the Comparative Example.

Example 4

Preparation of Full-Color Display Device>

(Preparation of Blue Emission Element)

Organic EL element 1-11 of Example 1 was utilized as a blue emission element.

(Preparation of Green Emission Element)

A green emission element was prepared by substituting Ir-12 used in Organic EL element 1-1 of Example 1 with Ir-1. This Organic EL element was utilized as a green emission element.

(Preparation of Red Emission Element)

A red emission element was prepared by substituting Ir-12 used in Organic EL element 1-1 of Example 1 with Ir-9. This Organic EL element was utilized as a red emission element.

Each of red, green and blue organic EL elements prepared above was arranged parallel on the same substrate to prepare an active matrix mode full-color display device having a form as described in FIG. 1.

Only display section A of said display device is schematically shown in FIG. 2. That is, a wiring section containing plural lines of scanning line 5 and data line 6, and plural pixels 3 (such as a pixel having an emission color of a red region, a pixel of a green region and a pixel of a blue region) arranged parallel are provided on the same substrate, and scanning lines 5 and data lines 6 in a wiring section, which are comprised of a conductive material, respectively, cross each other at a right angle in a grid form to be connected to pixels 3 at the right-angled crossing points (details being not shown in the drawing). The aforesaid plural pixels 3 each are operated in an active matrix mode, in which an organic EL element, a switching transistor and an operating transistor are provided corresponding to each emission color, and receive an image data signal from data line 6 when a scanning signal is applied from scanning line 5 to emit based on the received image data. Each red, green and blue pixel was appropriately arranged parallel in this manner, whereby a full-color display device was prepared.

It has been proved that a full-color moving image display device exhibiting a high luminance, a high durability and a highly visibility can be achieved by operating said full-color display.

Example 5

Preparation of White Emitting Element and White Lighting Device

A transparent electrode substrate of example 1 was subjected to patterning of an electrode having an area of 20 mm×20 mm, and α-NPD was deposited thereon at a layer thickness of 25 nm as a positive hole injection/transport layer in a similar manner to example 1; and further the aforesaid heating boat charged with CBP, boat containing Example compound (3-26) and boat containing Ir-9 were supplied with an electric current to deposit an emission layer having a layer thickness of 30 nm, while adjusting the evaporation rates of CBP as an emission host, Example compound (3-26) and Ir-9 as emission dopants to be 100:5:0.6.

Successively, BCP was deposited at 10 nm to provide a positive hole inhibition layer. Further, $Alq_3$ was deposited at 40 nm to provide an electron transport layer.

Next, similar to example 1, a mask with square holes having a shape nearly same as a transparent electrode made of stainless steel was arranged on an electron injection layer, and 0.5 nm of lithium fluoride as a cathode buffer layer and 150 nm of aluminum as a cathode were deposited.

This element was equipped with a sealed can, which had a similar structure and was prepared in a similar method to example 1, to prepare a lighting device (a flat lamp) shown in FIGS. 5 and 6. FIG. 5 shows a schematic view of a lighting device (a flat lamp), and FIG. 6 shows a cross-sectional view of a lighting device (a flat lamp).

Nearly white light was obtained when these lighting devices (flat lamps) were supplied with an electric current to prove that these can be utilized as a lighting device.

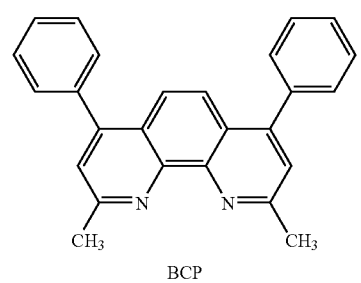

BCP

What is claimed is:

1. An organic electroluminescence element comprising at least an emission layer sandwiched between an anode and a cathode, wherein the emission layer comprises a metal complex having a partial structure represented by one of the following Formulas (1)-(3):

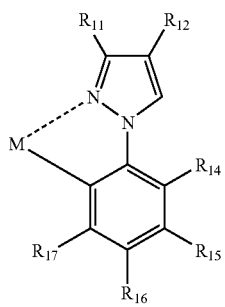

Formula (1)

wherein $R_{11}$ and $R_{12}$ each represent a substituent, provided that each of $R_{11}$ and $R_{12}$ may be the same or different from each other, and the substituent represented by each of $R_{11}$ and $R_{12}$ is one selected from the group consisting of an alkyl group, a cycloalkyl group, an alkenyl group, an alkynyl group, an aryl group, a heteroaryl group, a heterocyclic group, an alkoxy group, a cycloalkoxy group, an aryloxy group, an alkylthio group, a cycloalkylthio group, an arylthio group, an alkoxycarbonyl group, an aryloxycarbonyl group, a sulfamoyl group, an acyl group, an acyloxy group, an amido group, a carbamoyl group, a ureido group, an amino group, a halogen atom, a fluorinated hydrocarbon group, a cyano group, a nitro group, a hydroxyl group, mercapto group, and a silyl group;

$R_{14}$-$R_{17}$ each represent a hydrogen atom or a substituent, provided that each of $R_{14}$-$R_{17}$ may be the same or different from each other; and M represents a metal of the 8th-10th groups of the periodic table;

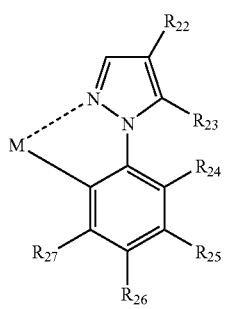

Formula (2)

wherein $R_{22}$ and $R_{23}$ each represent a substituent, provided that each of $R_{22}$ and $R_{23}$ may be the same or different from each other, and the substituent represented by each of $R_{22}$ and $R_{23}$ is one selected from the group consisting of an alkyl group, a cycloalkyl group, an alkenyl group, an alkynyl group, an aryl group, a heteroaryl group, a heterocyclic group, an alkoxy group, a cycloalkoxy group, an aryloxy group, an alkylthio group, a cycloalkylthio group, an arylthio group, an alkoxycarbonyl group, an aryloxycarbonyl group, a sulfamoyl group, an acyl group, an acyloxy group, an amido group, a carbamoyl group, a ureido group, an amino group, a halogen atom, a fluorinated hydrocarbon group, a cyano group, a nitro group, a hydroxyl group, a mercapto group, and a silyl group;

$R_{24}$-$R_{27}$ each represent a hydrogen atom or a substituent, provided that each $R_{24}$-$R_{27}$ may be the same or different from each other; and M represents a metal of the 8th-10th groups of the periodic table;

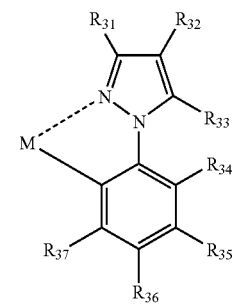

Formula (3)

wherein $R_{31}$-$R_{33}$ each represent a substituent, provided that each of $R_{31}$-$R_{33}$ may be the same or different from each other, and the substituent represented by each of $R_{31}$-$R_{33}$ is one selected from the group consisting of an alkyl group, a cycloalkyl group, an alkenyl group, an alkynyl group, an aryl group, a heteroaryl group, a heterocyclic group, an alkoxy group, cycloalkyoxy group, an aryloxy group, an alkylthio group, a cycloalkylthio group, an arylthio group, an alkoxycarbonyl group, an aryloxycarbonyl group, a sulfamoyl group, an acyl group, an acyloxy group, an amido group, a carbamoyl group, a ureido group, an amino group, a halogen atom, a fluorinated hydrocarbon group, a cyano group, nitro group, a hydroxyl group, a mercapto group, and a silyl group; $R_{34}$-$R_{37}$ each represent a hydrogen atom or a substituent, provided that each of $R_{34}$-$R_{37}$ may be the same or different from each other; and M represents a metal of the 8th-10th groups of the periodic table.

2. The organic electroluminescence element of claim 1 wherein the emission layer comprises a metal complex having a partial structure represented by Formula (2).

3. The organic electroluminescence element of claim 1 wherein the emission layer comprises a metal complex having a partial structure represented by Formula (3).

4. The organic electroluminescence element of claim 1, wherein the metal M represents iridium or platinum.

5. The organic electroluminescence element of claim 1, wherein the emission layer further comprises;

a carboline derivative; or a compound having a ring structure formed from a carboline ring, provided that at least one of carbon atoms constituting the carboline ring is replaced with a nitrogen atom.

6. The organic electroluminescence element of claim 1, wherein a positive hole inhibition layer is provided as a constituent layer between the emission layer and the cathode, provided that the positive hole inhibition layer incorporates a carboline derivative; or a compound having a ring structure formed from a carboline ring, provided that at least one of carbon atoms constituting the carboline ring is replaced with a nitrogen.

7. The organic electroluminescence element of claim 1, wherein a positive hole transport layer is provided as a constituent layer between the anode and the emission layer, and further an intermediate layer is provided between the positive hole transport layer and the emission layer.

8. The organic electroluminescence element of claim 7, wherein the emission layer comprises an emission host and the intermediate layer incorporates an emission host which is the same as the emission host in the emission layer.

9. A display device comprising the organic electroluminescence element of claim 1.

10. A lighting device comprising the organic electroluminescence element of claim 1.

11. The organic electroluminescence element of claim 1 wherein the emission layer comprises a metal complex having a partial structure represented by Formula (1).

12. The organic electroluminescence element of claim 1, wherein the substituent represented by each of $R_{14}$-$R_{17}$, $R_{24}$-$R_{27}$, and $R_{34}$-$R_{37}$ is one selected from the group consisting of an alkyl group, a cycloalkyl group, an alkenyl group, an alkynyl group, an aryl group, a heteroaryl group, a heterocyclic group, an alkoxy group, a cycloalkoxy group, an aryloxy group, an alkylthio group, a cycloalkylthio group, an arylthio group, an alkoxycarbonyl group, an aryloxycarbonyl group, a sulfamoyl group, an acyl group, an acyloxy group, an amido group, a carbamoyl group, a ureido group, an amino group, a halogen atom, a fluorinated hydrocarbon group, a cyano group, a nitro group, a hydroxyl group, a mercapto group, and a silyl group.

* * * * *